United States Patent
Liu et al.

(10) Patent No.: US 11,601,177 B2
(45) Date of Patent: Mar. 7, 2023

(54) CHANNEL STATE INFORMATION (CSI) REPORTING FOR FREQUENCY HOPPING IN UNLICENSED FREQUENCY BANDS

(71) Applicant: QUALCOMM Incorporated, San Diego, CA (US)

(72) Inventors: Chih-Hao Liu, San Diego, CA (US); Yisheng Xue, San Diego, CA (US); Xiaoxia Zhang, San Diego, CA (US); Jing Sun, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 17/109,412

(22) Filed: Dec. 2, 2020

(65) Prior Publication Data

US 2021/0218450 A1 Jul. 15, 2021

Related U.S. Application Data

(60) Provisional application No. 62/959,058, filed on Jan. 9, 2020.

(51) Int. Cl.
*H04B 7/06* (2006.01)
*H04L 5/00* (2006.01)
(Continued)

(52) U.S. Cl.
CPC ......... *H04B 7/0626* (2013.01); *H04B 1/7143* (2013.01); *H04L 5/0051* (2013.01);
(Continued)

(58) Field of Classification Search
CPC ... H04B 7/0626; H04B 1/7143; H04L 5/0051; H04L 5/0092; H04W 8/005; H04W 24/10; H04W 84/12
See application file for complete search history.

(56) References Cited

U.S. PATENT DOCUMENTS 7,974,237 B2 * 7/2011 Kattwinkel ........... H04W 72/02
370/332
11,431,527 B2 * 8/2022 Zhang ................... H04W 80/08
(Continued)

OTHER PUBLICATIONS

Partial International Search Report—PCT/US2020/062993—ISA/EPO—dated Mar. 30, 2021.
(Continued)

*Primary Examiner* — Deepa Belur
(74) *Attorney, Agent, or Firm* — Arun Swain; Holland & Hart LLP

(57) ABSTRACT

This disclosure provides systems, methods and apparatus for wireless communications in narrowband frequency bands using frequency hopping. In some implementations, a base station (BS) groups a plurality of hopping channels of a frequency hopping pattern into a number of groups based on a bandwidth part (BWP) hopping frequency of each hopping channel of the frequency hopping pattern. The BS transmits indications of the frequency hopping pattern and the grouping of hopping channels to user equipments (UEs). The BS transmits a channel state information reference signal (CSI-RS) on a first hopping channel, and receives channel state information (CSI) of the first hopping channel from one or more of the UEs. In some other implementations, a UE receives indications of the frequency hopping pattern and hopping channel groups, and determines CSI of the first hopping channel based on the received CSI-RS. The UE may transmit the CSI to the BS.

30 Claims, 26 Drawing Sheets

(51) Int. Cl.
  *H04B 1/7143*  (2011.01)
  *H04W 24/10*  (2009.01)
  *H04W 8/00*  (2009.01)
  *H04W 84/12*  (2009.01)

(52) U.S. Cl.
  CPC .......... *H04L 5/0092* (2013.01); *H04W 8/005* (2013.01); *H04W 24/10* (2013.01); *H04W 84/12* (2013.01)

(56) References Cited

U.S. PATENT DOCUMENTS

| | | | |
|---|---|---|---|
| 2016/0127936 A1* | 5/2016 | Chatterjee | H04W 4/70 370/252 |
| 2016/0227427 A1 | 8/2016 | Vajapeyam et al. | |
| 2016/0227428 A1* | 8/2016 | Novlan | H04L 5/0053 |
| 2016/0352482 A1* | 12/2016 | Sun | H04W 72/042 |
| 2018/0249321 A1* | 8/2018 | Haman | H04W 72/0413 |
| 2018/0309479 A1* | 10/2018 | Yerramalli | H04L 5/001 |
| 2018/0310341 A1* | 10/2018 | Yerramalli | H04W 74/0833 |
| 2019/0020424 A1 | 1/2019 | Yerramalli et al. | |
| 2019/0149190 A1 | 5/2019 | Liu et al. | |
| 2019/0166624 A1* | 5/2019 | Mohajer Hamidi | H04B 1/713 |
| 2019/0173521 A1 | 6/2019 | Liu et al. | |
| 2019/0222255 A1* | 7/2019 | Nammi | H04B 7/02 |
| 2020/0022127 A1* | 1/2020 | Li | H04W 72/0406 |
| 2020/0128579 A1* | 4/2020 | Talarico | H04W 4/70 |
| 2020/0177233 A1* | 6/2020 | Kneissl | H04B 1/7143 |
| 2020/0213161 A1* | 7/2020 | Zhang | H04L 5/0012 |

OTHER PUBLICATIONS

International Search Report and Written Opinion—PCT/US2020/062993—ISA/EPO—dated May 21, 2021.

\* cited by examiner

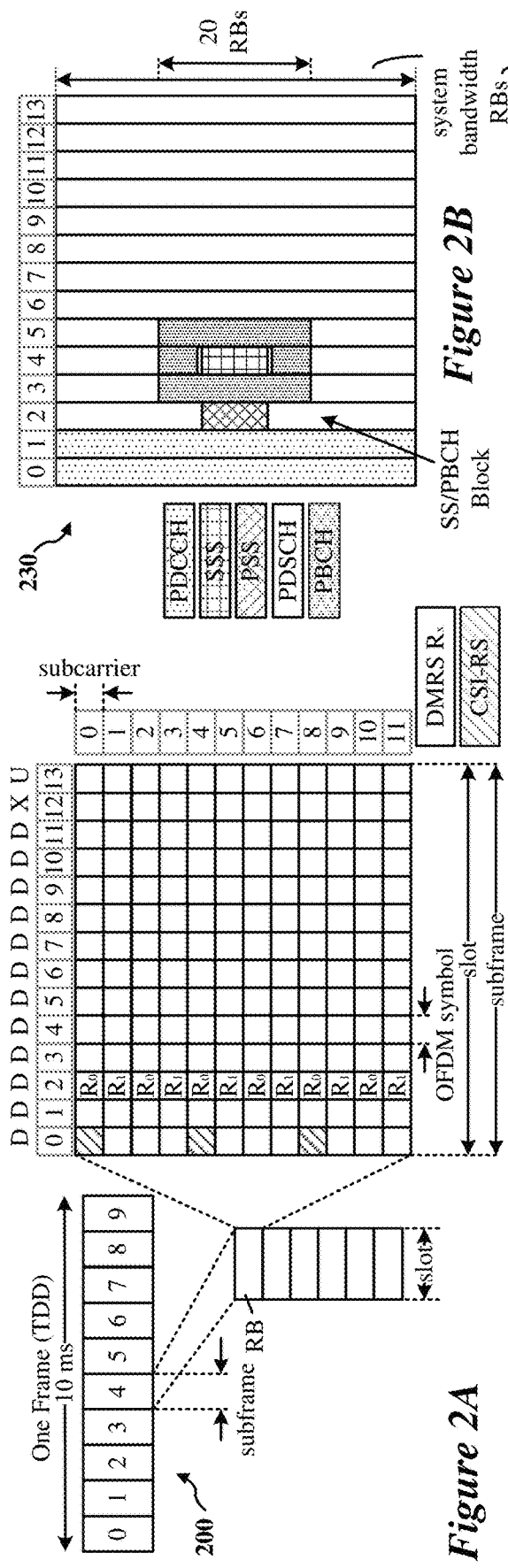
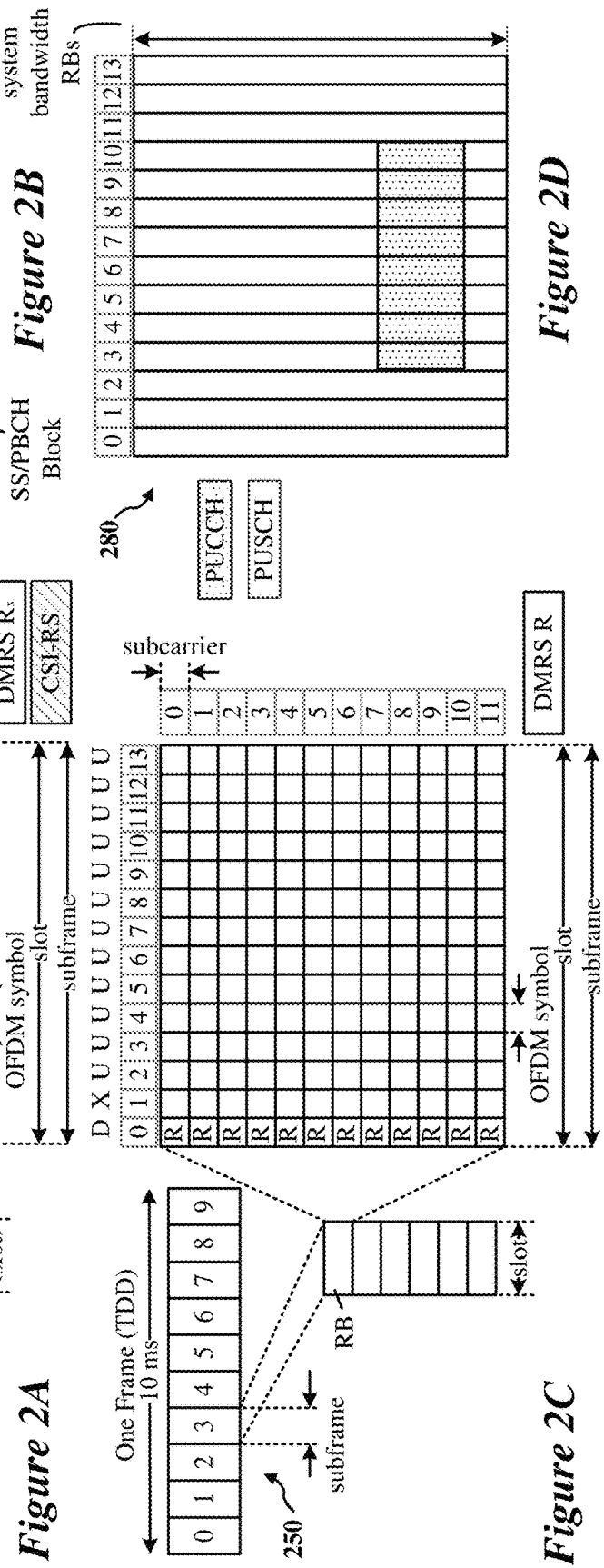
Figure 2A
Figure 2B
Figure 2C
Figure 2D

2300

2302

Transmit uplink (UL) data on the last hopping channel of the respective group of hopping channels concurrently with transmitting the indication of the group wideband CSI on the last hopping channel of the respective group of hopping channels.

Receive downlink (DL) data on a respective hopping channel concurrently with receiving the CSI-RS on the respective hopping channel.

*Figure 23B*

CHANNEL STATE INFORMATION (CSI) REPORTING FOR FREQUENCY HOPPING IN UNLICENSED FREQUENCY BANDS

CROSS-REFERENCE TO RELATED APPLICATIONS

This patent application claims priority to U.S. Provisional Patent Application No. 62/959,058 entitled "CHANNEL STATE INFORMATION (CSI) REPORTING FOR FREQUENCY HOPPING IN UNLICENSED FREQUENCY BANDS" and filed on Jan. 9, 2020, which is assigned to the assignee hereof. The disclosures of all prior applications are considered part of and are incorporated by reference in this patent application.

TECHNICAL FIELD

This disclosure relates generally to wireless communications and, more specifically, to wireless communications using frequency hopping techniques in unlicensed frequency bands.

DESCRIPTION OF THE RELATED TECHNOLOGY

Wireless communications systems are capable of supporting communications with multiple users by sharing portions of a system bandwidth using a multiple-access technology such as code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR). There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by an apparatus of a user equipment (UE), and may include receiving, over an anchor channel, a signal indicating a frequency hopping pattern. The method may include receiving an indication of a grouping of a plurality of hopping channels of the frequency hopping pattern into a number of groups. The method may include receiving a channel state information reference signal (CSI-RS) on a first hopping channel of the frequency hopping pattern. The method may include determining channel state information (CSI) of the first hopping channel based on the received CSI-RS. The method may include transmitting the CSI of the first hopping channel to a base station. In some implementations, the CSI may be transmitted on a physical uplink control channel (PUCCH) while the UE is on the first hopping channel. In some other implementations, the CSI may be transmitted on a physical uplink shared channel (PUSCH) when the UE has buffered UL data for transmission to the base station.

In some implementations, the signal may be a discovery reference signal (DRS) received over the anchor channel. In some instances, the UE may use the DRS to estimate channel conditions or interference on the anchor channel. In some instances, the grouping indication may be received in the DRS. In some other instances, the grouping indication may be received via a radio resource control (RRC) configuration. The grouping indication may be, or may indicate, at least one of the number of groups of hopping channels, a starting frequency of each group of hopping channels, or a frequency range of each group of hopping channels.

In some implementations, the hopping channels within each group of hopping channels may include adjacent bandwidth part (BWP) hopping frequencies that collectively span a frequency bandwidth of at least one channel of a wireless local area network (WLAN). In some instances, the BWP hopping frequencies associated with a first group of hopping channels may span a primary 20 MHz channel of the WLAN, and the BWP hopping frequencies associated with a second group of hopping channels may span a secondary 20 MHz channel of the WLAN. In some implementations, the plurality of hopping channels may be grouped into different groups of hopping channels based at least in part on one or more wireless channels of the WLAN. In addition, or in the alternative, the frequency hopping pattern may be based at least in part on the channel conditions on the one or more wireless channels of the WLAN.

In some implementations, the method also may include receiving a measurement request from the base station, and identifying the one or more channels of the WLAN in response to the measurement request. The method may include estimating channel conditions on each channel of the one or more identified channels of the WLAN. In some implementations, identifying the one or more channels of the WLAN may include receiving at least one beacon frame from an AP associated with the WLAN.

Another innovative aspect of the subject matter described in this disclosure can be implemented in a wireless communication device such as a UE. The wireless communication device may include an interface configured to obtain a signal indicating a frequency hopping pattern, and to obtain an indication of a grouping of a plurality of hopping channels of the frequency hopping pattern into a number of groups of hopping channels. The interface also may be configured to obtain a CSI-RS on a first hopping channel of the frequency hopping pattern. The wireless communication device also may include a processing system configured to determine CSI of the first hopping channel based on the received CSI-RS. In some implementations, the interface also may be configured to output the CSI of the first hopping channel for transmission to a base station. In some implementations, the CSI may be transmitted on the PUCCH while the UE is on the first hopping channel. In some other implementations, the CSI may be transmitted on a PUSCH when the UE has buffered UL data for transmission to the base station.

In some implementations, the signal may be a DRS received over the anchor channel. In some instances, the UE may use the DRS to estimate channel conditions or interference on the anchor channel. In some instances, the grouping indication may be received in the DRS. In some other instances, the grouping indication may be received via RRC configuration. The grouping indication may be, or may indicate, at least one of the number of groups of hopping channels, a starting frequency of each group of hopping channels, or a frequency range of each group of hopping channels.

In some implementations, the hopping channels within each group of hopping channels may include adjacent BWP hopping frequencies that collectively span a frequency bandwidth of at least one channel of a wireless local area network (WLAN). In some instances, the BWP hopping frequencies associated with a first group of hopping channels may span a primary 20 MHz channel of the WLAN, and the BWP hopping frequencies associated with a second group of hopping channels may span a secondary 20 MHz channel of the WLAN. In some implementations, the plurality of hopping channels may be grouped into different groups of hopping channels based at least in part on one or more wireless channels of the WLAN. In addition, or in the alternative, the frequency hopping pattern may be based at least in part on the channel conditions on the one or more wireless channels of the WLAN.

In some implementations, the interface also may be configured to receive a measurement request from the base station and to identify the one or more channels of the WLAN in response to the measurement request. The interface may be configured to estimate channel conditions on each channel of the one or more identified channels of the WLAN. In some implementations, identifying the one or more channels of the WLAN may include receiving at least one beacon frame from an AP associated with the WLAN.

Another innovative aspect of the subject matter described in this disclosure can be implemented as a method for wireless communication. The method may be performed by an apparatus of a base station, and may include grouping a plurality of hopping channels of a frequency hopping pattern into a number of groups based on a BWP hopping frequency of each hopping channel of the plurality of hopping channels. The method may include transmitting an indication of the frequency hopping pattern and an indication of the grouping of the plurality of hopping channels. The method may include transmitting a CSI-RS on a first hopping channel of the frequency hopping pattern. The method may include receiving CSI of the first hopping channel, where the CSI is based at least in part on the transmitted CSI-RS. In some implementations, the CSI may be received on the PUCCH while an intended receiving device (such as one or more UEs) is on the first hopping channel. In some other implementations, the CSI may be received on the PUSCH when the intended receiving device has buffered UL data for transmission to the base station.

In some implementations, the signal may be a DRS transmitted over the anchor channel. In some instances, one or more UEs may use the DRS to estimate channel conditions or interference on the anchor channel. In some instances, the grouping indication may be transmitted in the DRS. In some other instances, the grouping indication may be provided to UEs via a RRC configuration. The grouping indication may be, or may indicate, at least one of the number of groups of hopping channels, a starting frequency of each group of hopping channels, or a frequency range of each group of hopping channels.

In some implementations, the hopping channels within each group of hopping channels may include adjacent BWP hopping frequencies that collectively span a frequency bandwidth of at least one channel of a WLAN. In some instances, the BWP hopping frequencies associated with a first group of hopping channels may span a primary 20 MHz channel of the WLAN, and the BWP hopping frequencies associated with a second group of hopping channels may span a secondary 20 MHz channel of the WLAN. In some implementations, the plurality of hopping channels may be grouped into different groups of hopping channels based at least in part on one or more wireless channels of the WLAN. In addition, or in the alternative, the frequency hopping pattern may be based at least in part on the channel conditions on the one or more wireless channels of the WLAN.

In some implementations, the method also may include transmitting a measurement request to one or more UEs, and receiving a measurement report from the one or more UEs. In some instances, the measurement request may identify one or more wireless channels of a respective WLAN, and may include instructions for each of the one or more UEs to estimate channel conditions on each channel of a respective WLAN. The measurement report may include the estimated channel conditions for a respective WLAN. In some instances, the measurement request and the measurement response may be frames defined by one or more amendments to the IEEE 802.11 family of wireless communication standards.

Another innovative aspect of the subject matter described in this disclosure can be implemented in a base station. The base station may include a processing system configured to group a plurality of hopping channels of a frequency hopping pattern into a number of groups based on a BWP hopping frequency of each hopping channel of the plurality of hopping channels. The base station also may include an interface configured to output an indication of the frequency hopping pattern and an indication of the grouping of the plurality of hopping channels. The interface also may be configured to output a CSI-RS for transmission on a first hopping channel of the frequency hopping pattern, and obtain CSI of the first hopping channel, where the CSI is based at least in part on the transmitted CSI-RS. In some implementations, the CSI may be received on the PUCCH while an intended receiving device (such as one or more UEs) is on the first hopping channel. In some other implementations, the CSI may be received on the PUSCH when the intended receiving device has buffered UL data for transmission to the base station.

In some implementations, the signal may be a DRS transmitted over the anchor channel. In some instances, one or more UEs may use the DRS to estimate channel conditions or interference on the anchor channel. In some instances, the grouping indication may be transmitted in the DRS. In some other instances, the grouping indication may be provided to UEs via a RRC configuration. The grouping indication may be, or may indicate, at least one of the number of groups of hopping channels, a starting frequency of each group of hopping channels, or a frequency range of each group of hopping channels.

In some implementations, the hopping channels within each group of hopping channels may include adjacent BWP hopping frequencies that collectively span a frequency bandwidth of at least one channel of a WLAN. In some instances, the BWP hopping frequencies associated with a first group of hopping channels may span a primary 20 MHz channel of the WLAN, and the BWP hopping frequencies associated with a second group of hopping channels may span a secondary 20 MHz channel of the WLAN. In some implementations, the plurality of hopping channels may be grouped into different groups of hopping channels based at least in part on one or more wireless channels of the WLAN. In addition, or in the alternative, the frequency hopping pattern may be based at least in part on the channel conditions on the one or more wireless channels of the WLAN.

In some implementations, the wireless communication device may transmit a measurement request to one or more UEs, and may receive a measurement report from the one or more UEs. In some instances, the measurement request may identify one or more wireless channels of a respective WLAN, and may include instructions for each of the one or more UEs to estimate channel conditions on each channel of a respective WLAN. The measurement report may include the estimated channel conditions for a respective WLAN. In some instances, the measurement request and the measurement response may be frames defined by one or more amendments to the IEEE 802.11 family of wireless communication standards.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example of a first 5G/NR frame.

FIG. 2B shows example downlink (DL) channels within a 5G/NR slot.

FIG. 2C shows an example of a second 5G/NR frame.

FIG. 2D shows example uplink (UL) channels within a 5G/NR slot.

FIG. 23A shows a flowchart depicting another example operation for wireless communication that supports frequency hopping between a base station and a UE.

FIG. 23B shows a flowchart depicting another example operation for wireless communication that supports frequency hopping between a base station and a UE.

DETAILED DESCRIPTION

Figure 1:
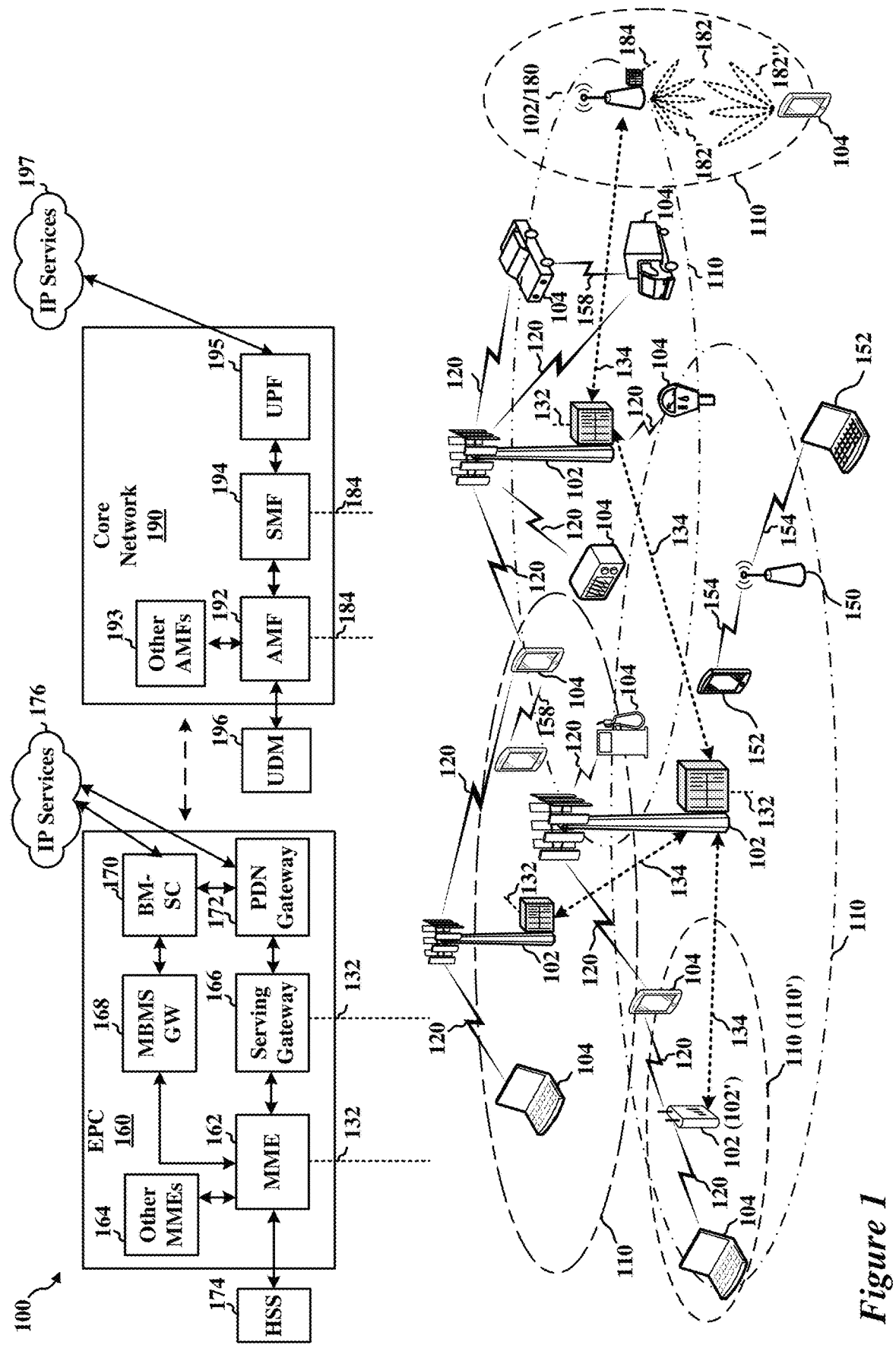
FIG. 1 shows a diagram illustrating an example wireless communications system and access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Implementations of the subject matter described in this disclosure may allow user equipments (UEs) and base stations (BSs) operating according to 5G NR protocols to exchange data and other information using narrowband communications with frequency hopping in one or more unlicensed frequency bands. In accordance with various aspects of the present disclosure, a base station and a UE may exchange communications with one another in one or more unlicensed frequency bands (or other suitable frequency bands) using a frequency hopping pattern including a plurality of hopping channels that can be grouped together based at least in part on the bandwidth part (BWP) hopping frequencies occupied by the plurality of hopping channels. In some implementations, the hopping channels within each group of hopping channels may have adjacent BWP hopping frequencies that span a continuous frequency range. The continuous frequency ranges spanned by the respective groups of hopping channels may be different from one another. For example, a first group of hopping channels may have adjacent BWP hopping frequencies that span a first channel of a wireless local area network (WLAN), a second group of hopping channels may have adjacent BWP hopping frequencies that span a second channel of the WLAN, a third group of hopping channels may have adjacent BWP hopping frequencies that span a third channel of the WLAN, and so on. In some instances, the adjacent BWP hopping frequencies of a first group of hopping channels may span a primary 20 MHz channel of a wireless network, and the adjacent BWP hopping frequencies of a second group of hopping channels may span a secondary 20 MHz channel of the wireless network.

The base station may use an anchor channel to transmit a discovery reference signal (DRS) indicating the frequency hopping pattern. The base station also may transmit an indication of the grouping of the hopping channels of the frequency hopping pattern to any number of UEs. The grouping indication may indicate at least one of the number of groups of hopping channels, a starting frequency of each group of hopping channels, or a frequency range of each group of hopping channels. The UE may determine the ordering, locations, and groupings of the hopping channels based on the indications. After transmission of the DRS, the base station and the UE may jump to the first hopping channel and exchange communications with each other over the first hopping channel.

In some implementations, the base station may transmit a channel state information reference signal (CSI-RS) on the first hopping channel. The UE may use the received CSI-RS to determine channel state information (CSI) of the first hopping channel. At the end of the first DRS period, the base station and the UE return to the anchor channel. The base station may transmit a second DRS to indicate the beginning of a second DRS period. After jumping to the second hopping channel, the base station may transmit a CSI-RS on the second hopping channel. The UE may use the received CSI-RS to determine the CSI of the second hopping channel. The base station and the UE may continue frequency hopping across the remaining hopping channels of the frequency hopping pattern, with the UE determining the CSI of each of the remaining hopping channels based on a CSI-RS received from the base station on the corresponding hopping channel. The UE may transmit the CSI of each hopping channel to the base station.

In some other implementations, the CSI determined for each of the hopping channels in a respective group of hopping channels may be combined to determine a group CSI for the respective group of hopping channels. In some instances, the hopping channels of a respective group of hopping channels may have adjacent BWP hopping frequencies that span a frequency range, and the group CSI may indicate channel information of the frequency range. The UE may transmit the group CSI to the base station on each of the hopping channels of the respective group, may transmit the group CSI to the base station on the last hopping channel of the respective group, or may transmit the group CSI to the base station on a selected number of the hopping channels of the respective group.

In some other implementations, the CSI determined for each of the hopping channels in a respective group of hopping channels may be used to estimate a wideband CSI, and the estimated wideband CSIs may be combined to form a group wideband CSI for the respective group of hopping channels. The UE may transmit an indication of the group wideband CSI to the base station on the last hopping channel of the respective group or on a hopping channel of another group of hopping channels.

Particular implementations of the subject matter described in this disclosure can be implemented to realize one or more of the following potential advantages. The ability of base stations and UEs to communicate with each other using narrowband communications in an unlicensed frequency band may improve channel access because there may be less contention on relatively small frequency bands (such as the hopping channels associated with a frequency hopping pattern) than on relatively large frequency bands (such as primary channels used in wideband communications). Unlicensed frequency bands may be more ubiquitous than licensed portions of the radio frequency (RF) spectrum, and therefore communications (such as narrowband communications) performed in one or more unlicensed frequency bands may provide better coverage for wireless communication devices (such as base stations and UEs) than communications performed solely on licensed portions of the RF spectrum. Although employing frequency hopping techniques in narrowband communications on one or more unlicensed frequency bands may reduce interference from other wireless communication devices by exploiting the frequency diversity of the unlicensed frequency bands, interference from these other wireless communication devices may degrade communications between the base station and one or more UEs.

The ability to obtain channel information of the hopping channels of a frequency hopping pattern may allow a base station to improve communications between the base station and UEs that employ frequency hopping techniques. Specifically, the base station may use channel information of the hopping channels to select or adjust one or more parameters of the frequency hopping pattern. In some implementations, the base station may adjust one or both of an ordering of the hopping channels of the frequency hopping pattern or a grouping of the hopping channels of the frequency hopping pattern based on the obtained channel information. In some other implementations, the base station may use estimated channel conditions of a nearby wireless network to selectively adjust the one or more parameters of the frequency hopping pattern in a manner that reduces or minimizes interference from the nearby wireless network.

In addition, the ability to group the hopping channels of a frequency hopping pattern based on their BWP hopping frequencies may allow channel conditions or CSI of a group of hopping channels to be inferred from the CSI of any one or more of the hopping channels in the group. In some implementations, the hopping channels of a frequency hopping pattern may be grouped into a number of groups such that the hopping channels within each group of the number of groups have adjacent BWP hopping frequencies. By exploiting the frequency correlation of interference, the CSI of one of the hopping channels in a respective group of hopping channels may be used as an indicator of channel conditions on a frequency band corresponding to the combined BWP hopping frequencies of the hopping channels in the respective group. In some instances, four narrowband hopping channels having adjacent BWP hopping frequencies may be grouped together such that their combined BWP hopping frequencies span a wideband wireless channel, thereby allowing channel conditions on the wideband wireless channel to be estimated based on the CSI determined for one of the narrowband hopping channels.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100 includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communications system 100 may utilize both licensed and unlicensed radio frequency spectrum bands. For example, the wireless system 100 may employ LTE License Assisted Access (LTE-LAA), LTE Unlicensed (LTE U) radio access technology, or 5G NR technology in an unlicensed radio band (such as the 5 GHz Industrial, Scientific, and Medical (ISM) band or the 6 GHz UNIT bands). When operating in unlicensed radio bands, wireless communication devices (such as the base stations 102 and UEs 104) may employ listen-before-talk (LBT) channel access mechanisms to ensure the channel is clear before transmitting data. In some instances, operations in unlicensed radio bands may be based on a carrier aggregation (CA) configuration in conjunction with component carriers (CCs) operating in a licensed band. Operations in unlicensed radio bands may include downlink transmissions, uplink transmissions, or both. Duplexing in unlicensed radio bands may be based on frequency division duplexing (FDD), time division duplexing (TDD) or a combination of both.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 microseconds (p) may be divided into 10 equally sized subframes each having a duration of 1 µs. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols per slot and $2\mu$ slots per subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz, and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 microseconds (p).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
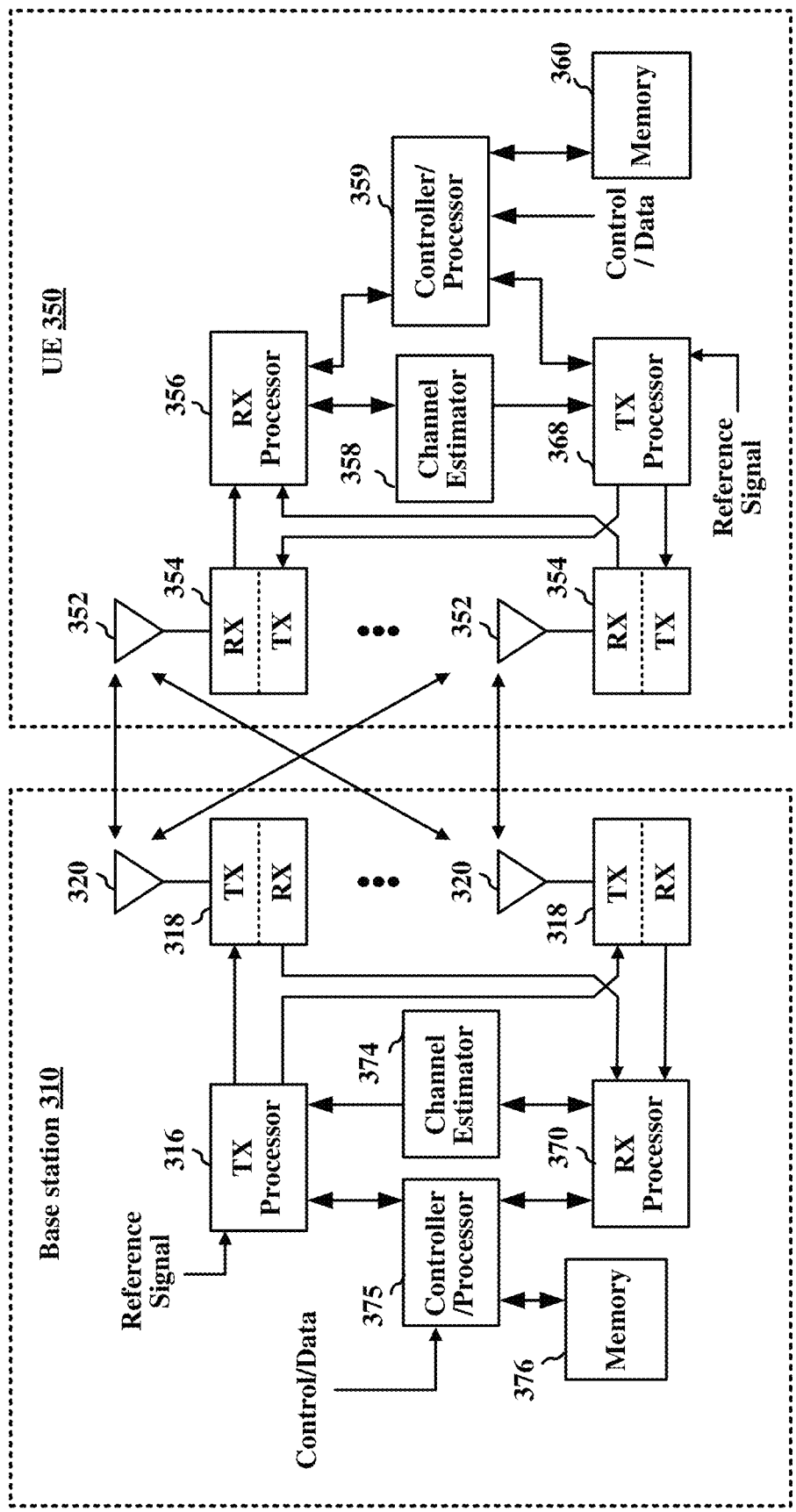
FIG. 3 shows a diagram illustrating an example base station (BS) and user equipment (UE) in an access network.

FIG. 3 shows a block diagram of an example base station 310 and UE 350 in an access network. In the DL, IP packets from the EPC 160 may be provided to a controller/processor 375 of the base station 310. The controller/processor 375 may implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 also may provide RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting. The controller/processor 375 also may provide PDCP layer functionality associated with header compression/decompression, security (such as ciphering, deciphering, integrity protection, integrity verification), and handover support functions. The controller/processor 375 also may provide RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs. The controller/processor 375 also may provide MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

In some implementations, controller/processor 375 may be a component of a processing system. A processing system may generally refer to a system or series of machines or components that receives inputs and processes the inputs to produce a set of outputs (which may be passed to other systems or components of, for example, the base station 310). For example, a processing system of the base station 310 may refer to a system including the various other components or subcomponents of the base station 310.

The processing system of the base station 310 may interface with other components of the base station 310, and may process information received from other components (such as inputs or signals), output information to other components, and the like. For example, a chip or modem of the base station 310 may include a processing system, a first interface to receive or obtain information, and a second interface to output, transmit or provide information. In some instances, the first interface may refer to an interface between the processing system of the chip or modem and a receiver, such that the base station 310 may receive information or signal inputs, and the information may be passed to the processing system. In some instances, the second interface may refer to an interface between the processing system of the chip or modem and a transmitter, such that the base station 310 may transmit information output from the chip or modem. A person having ordinary skill in the art will readily recognize that the second interface also may obtain or receive information or signal inputs, and the first interface also may output, transmit or provide information.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot signal) in the time or frequency domain, and combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 of the UE 350 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

In some implementations, the controller/processor 359 may be a component of a processing system. A processing system may generally refer to a system or series of machines or components that receives inputs and processes the inputs to produce a set of outputs (which may be passed to other systems or components of the UE 350). For example, a processing system of the UE 350 may refer to a system including the various other components or subcomponents of the UE 350.

The processing system of the UE 350 may interface with other components of the UE 350, and may process information received from other components (such as inputs or signals), output information to other components, and the like. For example, a chip or modem of the UE 350 may include a processing system, a first interface to receive or obtain information, and a second interface to output or transmit information. In some instances, the first interface may refer to an interface between the processing system of the chip or modem and a receiver, such that the UE 350 may receive information or signal inputs, and the information may be passed to the processing system. In some instances, the second interface may refer to an interface between the processing system of the chip or modem and a transmitter, such that the UE 350 may transmit information output from the chip or modem. A person having ordinary skill in the art will readily recognize that the second interface also may obtain or receive information or signal inputs, and the first interface also may output, transmit or provide information.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. In some other implementations, some UEs may have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Narrowband communications involve communicating with a limited frequency bandwidth (such as compared to wideband communications typically used by cellular and Wi-Fi devices), and may be implemented in one or both of a licensed frequency band and an unlicensed frequency band. An unlicensed frequency band may refer to a radio-frequency (RF) band that is open for shared use by any device that complies with regulatory agency rules for communicating via the RF band. In some implementations, the unlicensed frequency band may include one or more radio frequencies in the 5 GHz band (such as the UNIT frequency bands between approximately 5.15 GHz and approximately 5.825 GHz). In some other implementations, the unlicensed frequency band may include one or more radio frequencies in the 2.4 GHz band (such as radio frequencies between approximately 2.4 GHz and 2.48 GHz typically used by Wi-Fi devices and WLANs). In some other implementations, the unlicensed frequency band may include one or more radio frequencies in the 6 GHz band.

Figure 4:
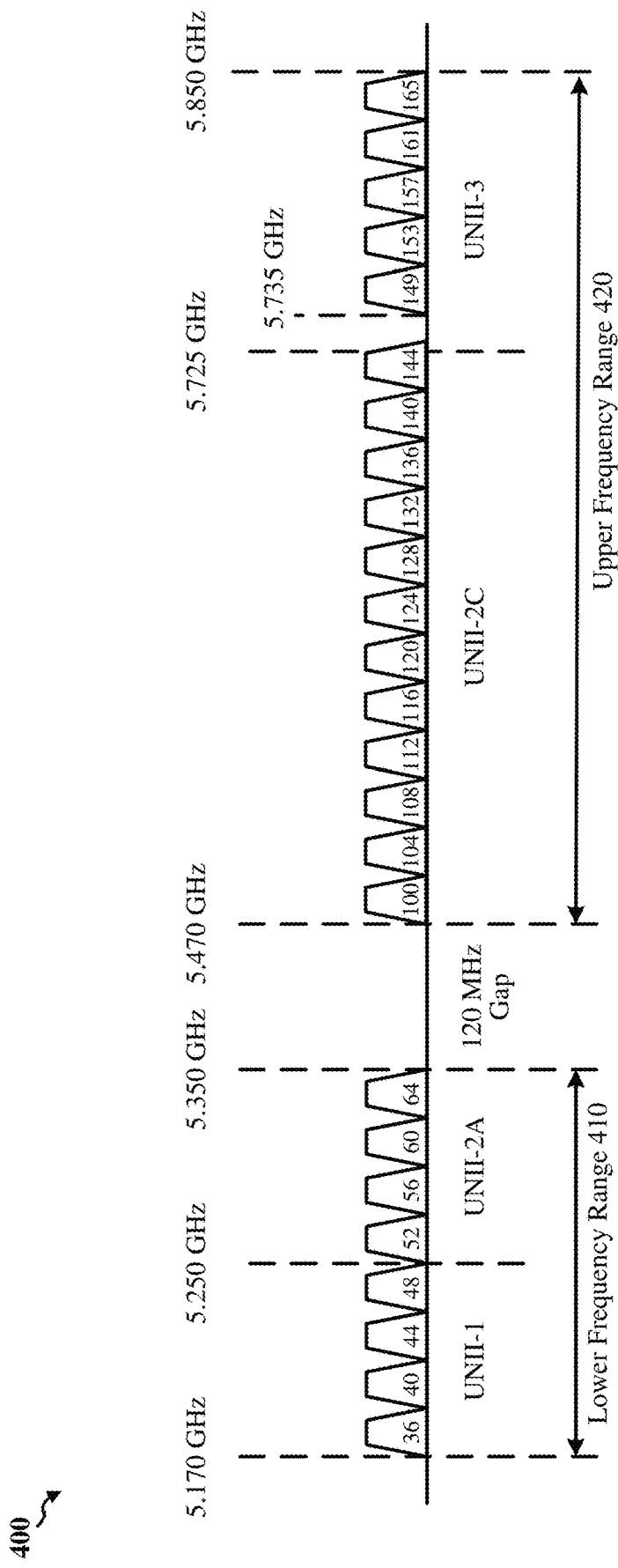
FIG. 4 shows a frequency spectrum diagram depicting an example 5 GHz frequency band.

FIG. 4 shows a frequency spectrum diagram 400 depicting an example 5 GHz frequency band. The 5 GHz frequency band may range from 5.15 GHz to 5.85 GHz, and may be subdivided into a number of UNIT radio sub-bands. The usable sub-bands in the 5 GHz frequency band may include a UNII-1 sub-band (such as between 5.15-5.25 GHz), a UNII-2A sub-band (such as between 5.25-5.35 GHz), a UNII-2C sub-band (such as between 5.470-5.725 GHz), and a UNII-3 sub-band (such as between 5.725-5.850 GHz).

Each of the sub-bands includes a number of 20 MHz channels (such as channels 36-64 and 100-177). The 20 MHz channels may be grouped or paired with one another to form 40 MHz channels. The 40 MHz channels also may be grouped or paired with one another to form 80 MHz channels, and the 80 MHz channels may be further grouped or paired with one another to form a 160 MHz channel. A 120 MHz wide frequency band or gap exists between the UNII-2A sub-band and the UNII-2C sub-band (such as between 5.35-5.47 GHz), dividing the 5 GHz frequency band into a lower frequency range 410 (such as between 5.17-5.35 GHz) and an upper frequency range 420 (such as between 5.47-5.85 GHz). Wireless communications may be restricted in the 120 MHz wide region. The UNII-1 sub-band may allow channel widths of up to 100 MHz, with a maximum transmit power of 50 milliwatts (mW). The UNII-2A sub-band may allow channel widths of up to 100 MHz, with a maximum transmit power of 250 mW. The UNII-2C sub-band may allow channel widths of up to 255 MHz, with a maximum transmit power of 250 mW. The UNII-3 sub-band may allow channel widths of up to 125 MHz, with an unspecified maximum transmit power.

In contrast to most licensed RF bands, users of unlicensed frequency bands typically do not have regulatory protection against radio interference from devices of other users, and may be subject to radio interference caused by other devices that use the unlicensed frequency band. Because unlicensed frequency bands may be shared by devices operating according to different communication protocols (such as the 3GPP standards for LTE and 5G NR devices and the IEEE 802.11 standards for Wi-Fi devices), a device operating in an unlicensed frequency band typically contends with other nearby devices for medium access before transmitting data on the unlicensed frequency band.

When communicating in an unlicensed frequency band, a UE or base station may need to coexist or share the unlicensed frequency band with other devices. One way to promote coexistence with other devices is to use a listen-before-talk or listen-before-transmit (LBT) procedure to determine that the shared wireless medium has been idle for a duration before attempting transmissions on the shared wireless medium. In some implementations, LBT procedures may be used with frequency hopping techniques to increase the likelihood of finding a clear channel for communication.

The European Telecommunications Standards Institute (ETSI) EN 301-893 standards define channel access mechanisms to be used by wireless devices for transmissions on the UNII-1 and UNII-2 radio bands. For example, the ETSI EN 301-893 standards define a LBT channel access protocol to be used by wireless devices (including IEEE 802.11-compliant wireless devices and LAA-compliant wireless devices) for gaining medium access on the UNII-1 and UNII-2 radio bands. This channel access mechanism, which may be referred to as a category-2 LBT channel access protocol, includes a mechanism by which wireless devices perform a Clear Channel Assessment (CCA) to ensure that wireless channel is idle before transmitting data on the wireless channel.

Figure 5:
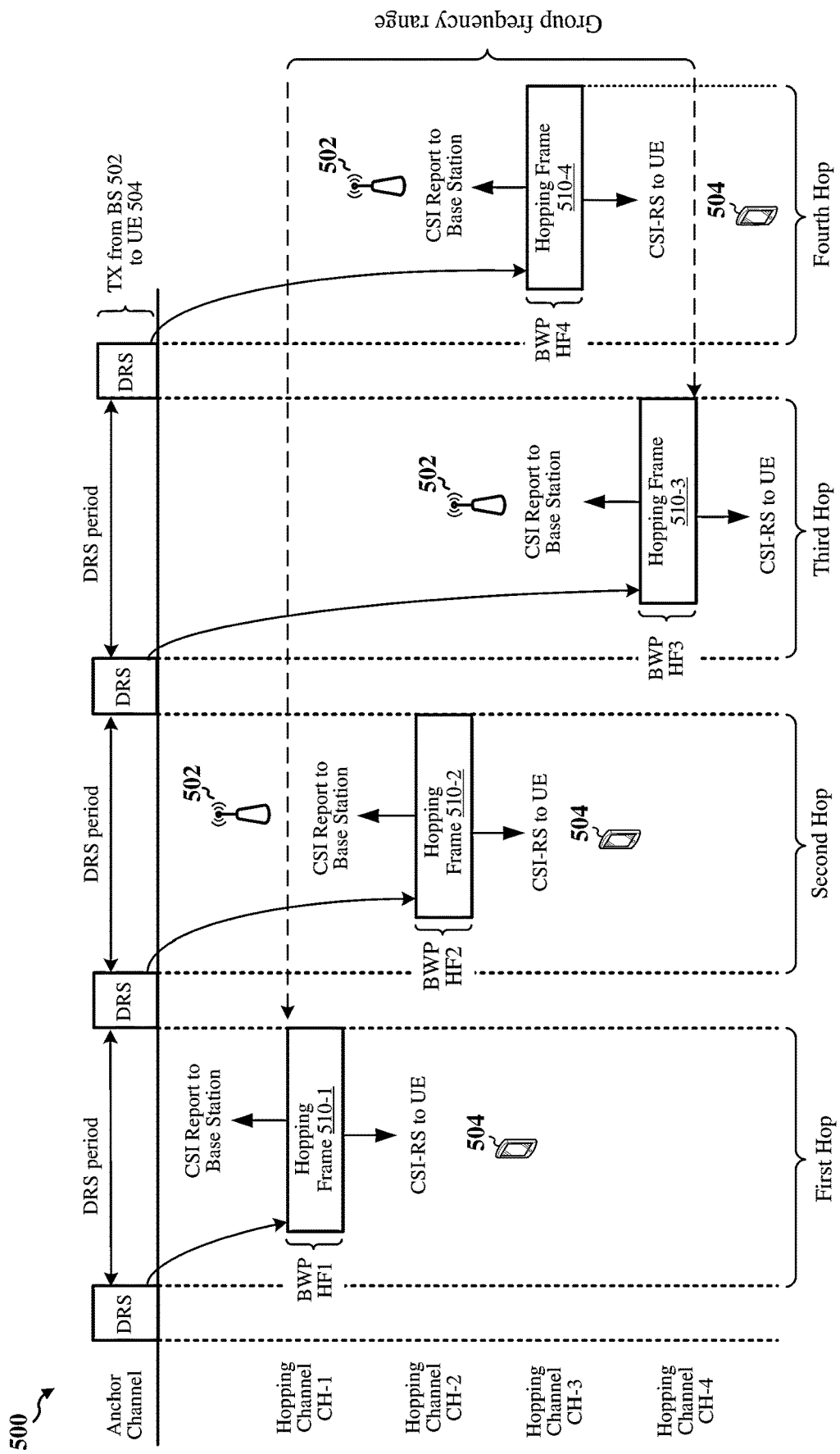
FIG. 5 shows an example frequency hopping pattern that may be used for communications between a base station and a UE.

FIG. 5 shows an example frequency hopping pattern 500 that may be used for narrowband communications between a base station (BS) 502 and a UE 504 in a radio access network (RAN). The base station 502 may be one example of the base station 102 of FIG. 1 or the base station 310 of FIG. 3, the UE 504 may be one example of the UE 104 of FIG. 1 or the UE 350 of FIG. 3, and the radio access network may be any suitable RAN including, for example, a 5G NR access network. In some implementations, the communications 500 may be narrowband communications in an unlicensed frequency band.

The frequency hopping pattern 500 includes a plurality of hopping channels across which the base station 502 and the UE 504 frequency hop in an order indicated by the frequency hopping pattern. For some implementations in which the base station 502 and the UE 504 communicate with each other using narrowband communications in the 2.4 GHz frequency spectrum, the frequency hopping pattern 500 may include N=15 different hopping channels, the dwell time on each hopping channel may be approximately 80 milliseconds (ms), and each of the plurality of hopping channels may have a bandwidth not greater than 5 MHz. Although only four hopping channels CH-1 to CH-4 are shown in the example of FIG. 5, the frequency hopping pattern 500 may include any suitable number of hopping channels. As a non-limiting example, in some implementations, the frequency hopping pattern 500 may include 15 or more different hopping channels.

Each of the hopping channels of the frequency hopping pattern 500 may be associated with a corresponding one of hopping frames 510-1 to 510-4 that can be used for DL and UL communications between the base station 502 and the UE 504. In the example of FIG. 5, the first hopping channel CH-1 is associated with the first hopping frame 510-1 and has a BWP hopping frequency denoted as BWP HF1, the second hopping channel CH-2 is associated with the second hopping frame 510-2 and has a BWP hopping frequency denoted as BWP HF2, the third hopping channel CH-3 is associated with the third hopping frame 510-3 and has a BWP hopping frequency denoted as BWP HF3, and the fourth hopping channel CH-4 is associated with the fourth hopping frame 510-4 and has a BWP hopping frequency denoted as BWP HF4. Although other hopping channels are not shown in FIG. 5 for simplicity, the four hopping channels CH-1 to CH-4 may form one group of hopping channels of a number of groups of hopping channels of a frequency hopping pattern.

The base station 502 and the UE 504 initially tune to the anchor channel, and the base station 502 transmits a discovery reference signal (DRS) that indicates a first DRS period during which the base station 502 and the UE 504 may exchange communications on the first hopping channel CH-1 using the first hopping frame 510-1. In some implementations, the DRS may include or indicate the frequency hopping pattern, one or more frequency hopping parameters, and system information. The frequency hopping pattern may indicate a location of each hopping channel of the plurality of hopping channels, an order in which the UE 504 is to frequency hop across the plurality of hopping channels, and the dwell time on each of the plurality of hopping channels. The frequency hopping information may indicate a duration of hopping frames associated with the plurality of hopping channels, a duration of one or both DL and UL transmissions, and other information. The system information may include one or more of a primary synchronization signal (PSS), a secondary synchronization signal (SSS), a physical broadcast channel (PBCH), a system information block (SIB), or a slot format indicator (SFI).

The base station 502 also may transmit a grouping indication indicating at least one of the number of groups of hopping channels, a starting frequency of each group of hopping channels, or a frequency range of each group of hopping channels. In some aspects, the grouping indication also may include or indicate the BWP hopping frequencies associated with each group of hopping channels. In some implementations, the grouping indication may be transmitted to the UE 504 in the DRS. In some other implementations, the grouping indication may be provided to the UE 504 via RRC configuration.

The UE 504 determines the ordering and locations of the plurality of hopping channels based on the frequency hopping pattern indication, and determines the groups of hopping channels based on the grouping indication. After transmission of the DRS, the base station 502 and the UE 504 frequency hop to the first hopping channel CH-1. The base station 502 transmits a CSI-RS to the UE 504 on the first hopping channel CH-1. The UE 504 may use the received CSI-RS to determine CSI of the first hopping channel CH-1. In some instances, the UE 504 may transmit the CSI of the first hopping channel to the base station 502 while operating on the first hopping channel CH-1. In some other instances, the UE 504 may transmit the CSI of the first hopping channel to the base station 502 while operating on another hopping channel of the frequency hopping pattern.

The base station 502 and the UE 504 return to the anchor channel at the end of the first DRS period. The base station 502 transmits a second DRS indicating a second DRS period during which the base station 502 and the UE 504 may exchange communications on the second hopping channel CH-2 using the second hopping frame 510-2. After jumping to the second hopping channel CH-2, the base station 502 transmits a CSI-RS to the UE 504 on the second hopping channel CH-2. The UE 504 may use the received CSI-RS to determine the CSI of the second hopping channel. In some instances, the UE 504 may transmit the CSI of the second hopping channel to the base station 502 while operating on the second hopping channel CH-2. In some other instances, the UE 504 may transmit the CSI of the second hopping channel to the base station 502 while operating on another hopping channel of the frequency hopping pattern.

The base station 502 and the UE 504 return to the anchor channel at the end of the second DRS period, and may perform similar operations on the third hopping channel CH-3 and the fourth hopping channel CH-4 of the group of hopping channels to determine the CSI of the third hopping channel and the CSI of fourth hopping channel, respectively. In some instances, the UE 504 may transmit the CSI of the third hopping channel to the base station 502 while operating on the third hopping channel CH-3, and may transmit the CSI of the fourth hopping channel to the base station 502 while operating on the fourth hopping channel CH-4. In some other instances, the UE 504 may transmit the CSIs of the third or fourth hopping channels to the base station 502 while operating on one or more other hopping channels of the frequency hopping pattern.

The CSIs determined for each of the hopping channels CH-1 to CH-4 may be combined to determine a group CSI for the group of hopping channels. When the hopping channels CH-1 to CH-4 have adjacent BWP hopping frequencies that span a frequency range, the group CSI may indicate channel information of the frequency range. The UE 504 may transmit the group CSI to the base station 502 on each of the hopping channels CH-1 to CH-4, may transmit the group CSI to the base station 502 on the last hopping channel CH-4 of the group of hopping channels, or may transmit the group CSI to the base station 502 on a selected number (N) of the hopping channels of the group of hopping channels. In some instances, the group CSI may be a moving average of the CSIs determined for each of one or more last hopping channels of the respective group, and may be expressed as:

$$\sum_{i=0}^{N-1} \alpha_i f(10 \cdot \log_{10}(SINR_i)),$$

where $\sum_{i}^{N-1}\alpha_i=1$, f is the average constraint capacity, $\alpha_i$ is the weighting factor for the $i^{th}$ hopping channel of the number N of most recently visited hopping channels, and $f(10 \cdot \log_{10}(SINR_i))$ is the constraint capacity for the $i^{th}$ hopping channel of the number N of most recently visited hopping channels.

In some other instances, the group CSI may be an average of the CSIs determined for each of the hopping channels of the respective group, and may be expressed as:

$$\alpha \cdot f_j(10 \cdot \log_{10}(SINR(n))) + (1-\alpha) \cdot f_j(10 \cdot \log_{10}(SINR(n-1))),$$

where f is the average constraint capacity, $\alpha_i$ is the weighting factor for the $i^{th}$ hopping channel within the respective group of hopping channels, $f(10 \cdot \log_{10}(SINR_i))$ is the constraint capacity for the $i^{th}$ hopping channel within the respective group of hopping channels, and f(SINR(i)) is the CSI estimated for the $i^{th}$ hopping channel.

In some other implementations, the CSI determined for each of the hopping channels CH-1 to CH-4 may be used to estimate a wideband CSI indicative of wideband channel conditions. The estimated wideband CSIs may be combined to form a group wideband CSI for the group of hopping channels CH-1 to CH-4, and an indication of the group wideband CSI may be transmitted to the base station 502. In some instances, the UE 504 may transmit the indication of the group wideband CSI on the last hopping channel CH-1 of the group. In some other instances, the UE 504 may transmit the indication of the group wideband CSI on a hopping channel of another group of hopping channels.

In some other implementations, the UE 504 may determine a CSI difference value between the group wideband CSI and each of the CSIs estimated for the hopping channels CH-1 to CH-4 of the group. In some instances, the UE 504 may transmit one or more of the CSI difference values to the base station 502 in one or more uplink control information (UCI) messages.

Figure 6:
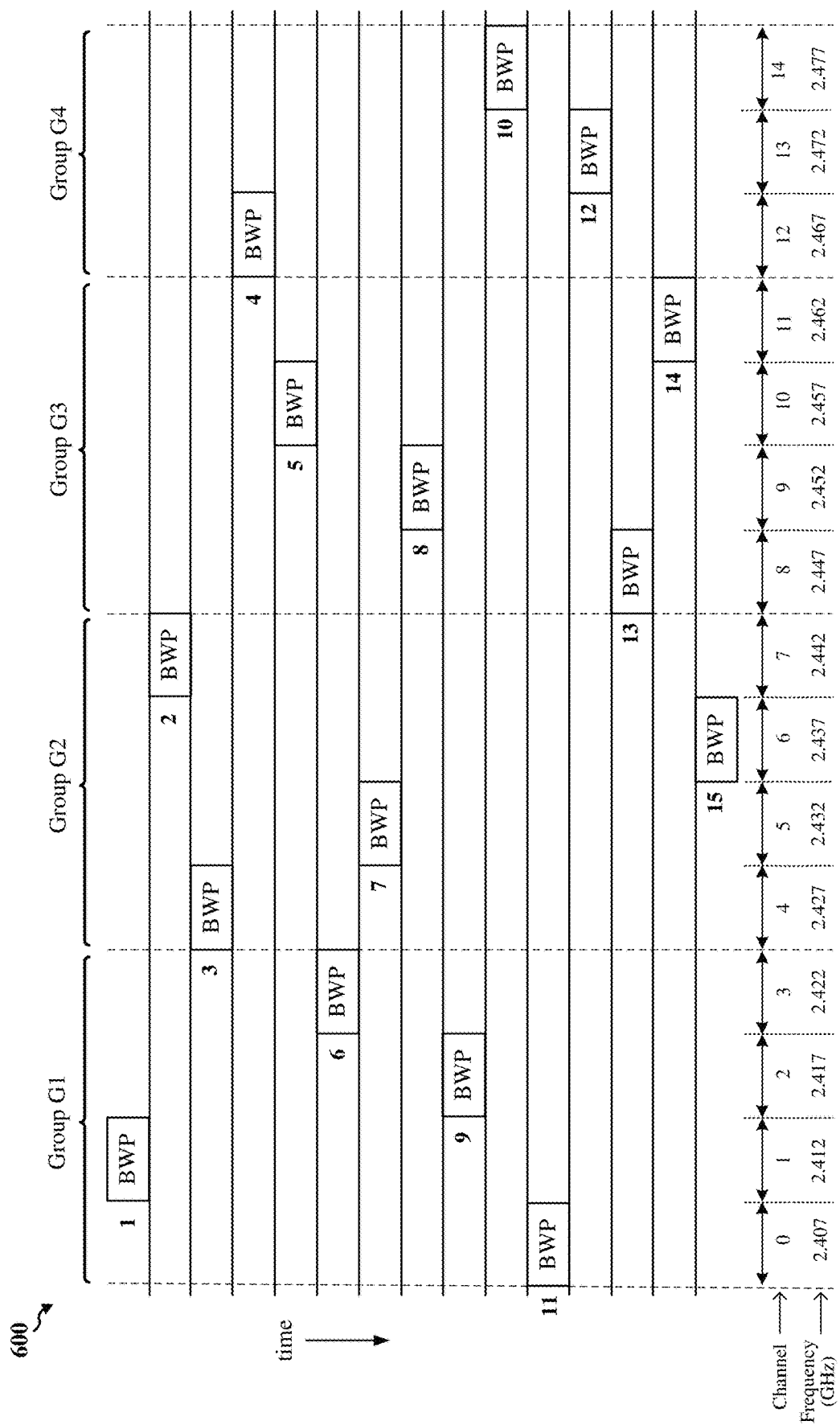
FIG. 6 shows an example grouping of a plurality of hopping channels of a frequency hopping pattern into groups of hopping channels.

FIG. 6 shows an example grouping 600 of a plurality of hopping channels of a frequency hopping pattern. The frequency hopping pattern includes 15 different hopping channels across which a base station and a UE can frequency hop to exchange communications. The hopping channels are denoted as 1-15 based on an ordering of the hopping channels. In some implementations, each of the hopping channels may be a narrowband channel having a bandwidth less than approximately 5 MHz, and may be grouped with other hopping channels having adjacent BWP hopping frequencies to form a group of hopping channels that span or occupy a wideband channel. In some instances, the wideband channel occupied by a respective group of hopping channels may correspond to a 20 MHz channel of a wireless local area network (WLAN).

For the grouping 600 of FIG. 6, the 15 hopping channels are grouped into 4 groups G1-G4. The first group G1 of hopping channels includes four hopping channels having adjacent BWP hopping frequencies that span a first continuous frequency range corresponding to Wi-Fi channels 0 to 3 in the 2.4 GHz frequency band. The second group G2 of hopping channels includes four hopping channels having adjacent BWP hopping frequencies that span a second continuous frequency range corresponding to Wi-Fi channels 4 to 7 in the 2.4 GHz frequency band. The third group G3 of hopping channels includes four hopping channels having adjacent BWP hopping frequencies that span a third continuous frequency range corresponding to Wi-Fi channels 8 to 11 in the 2.4 GHz frequency band. The fourth group G4 of hopping channels includes three hopping channels having adjacent BWP hopping frequencies that span a fourth continuous frequency range corresponding to Wi-Fi channels 12 to 15 in the 2.4 GHz frequency band.

In some implementations, the frequency correlation of interference may be exploited such that channel information determined for one of the hopping channels in a respective group of hopping channels may be used to estimate channel conditions on the continuous frequency range corresponding to the respective group. Specifically, channel state information (CSI) determined for any one of the hopping channels 1, 6, 9, or 11 of the first group G1 may be used to determine CSI for a 20 MHz wireless channel between approximately 2.405 and 2.425 GHz, the CSI determined for any one of the hopping channels 2, 3, 7, or 15 of the second group G2 may be used to determine CSI for a 20 MHz wireless channel between approximately 2.425 and 2.445 GHz, the CSI determined for any one of the hopping channels 5, 8, 13, or 14 of the third group G3 may be used to determine CSI for a 20 MHz wireless channel between approximately 2.445 and 2.465 GHz, and the CSI determined for any one of the hopping channels 4, 10, or 12 of the fourth group G4 may be used to determine CSI for a 20 MHz wireless channel between approximately 2.465 and 2.485 GHz. Accordingly, by grouping the hopping channels of the frequency hopping pattern of FIG. 6 based on the example groupings 600, a base station can estimate channel conditions of a wideband wireless channel (such as a 20 MHz Wi-Fi channel) based on channel conditions determined for a narrowband wireless channel (such as one of the hopping channels).

Figure 7A:
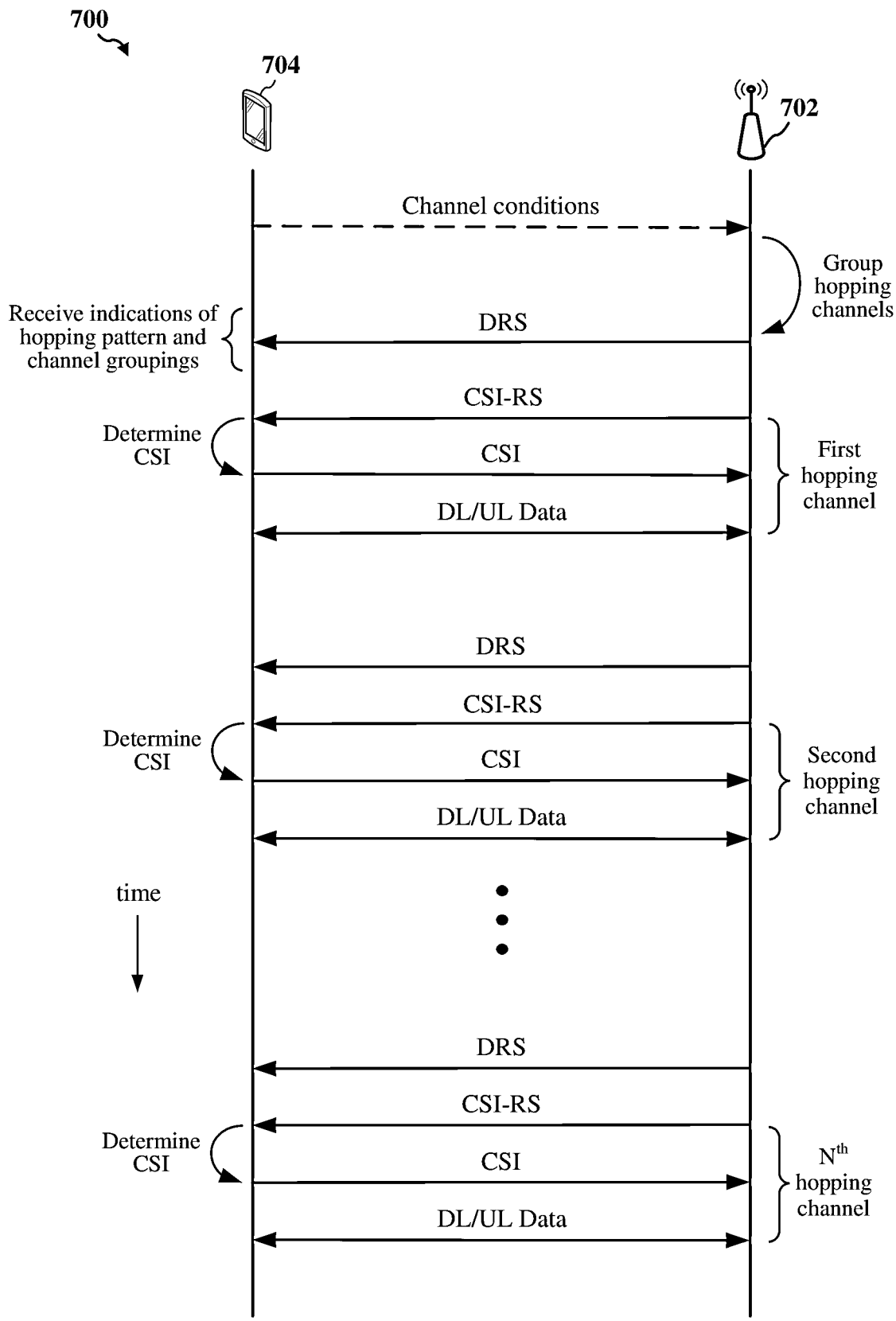
FIG. 7A shows an example sequence diagram for wireless communication that supports frequency hopping between a base station and a UE.

FIG. 7A shows a sequence diagram 700 depicting communications between a base station 702 and a UE 704. The base station 702 may be one example of the base station 102 of FIG. 1, the base station 310 of FIG. 3, or the base station 502 of FIG. 5. The UE 704 may be one example of the UE 104 of FIG. 1, the UE 350 of FIG. 3, or the UE 504 of FIG. 5. The communications may be transmitted using any suitable radio access network (RAN) including, for example, a 5G NR access network. In some implementations, the communications may be narrowband communications in an unlicensed frequency band (such as unlicensed portions of the 2.4 GHz frequency band, one or more of the UNIT bands in the 5 GHz frequency band, unlicensed portions of the 6 GHz frequency band, or other unlicensed frequency bands).

The base station 702 and UE 704 may use frequency hopping to exploit the frequency diversity in unlicensed frequency bands. In some implementations, the base station 702 may select or derive a frequency hopping pattern that includes a plurality of hopping channels upon which the base station 702 and the UE 704 may frequency hop. Each hopping channel of the plurality of hopping channels may be associated with one or more corresponding hopping frames with which the base station 702 and the UE 704 may exchange communications. For example, the base station 702 may transmit system information, DL reference signals, DL data, and other DL communications to the UE 704 on DL hopping frames, and the UE 704 may transmit reports, UL reference signals, UL data, and other UL communications to the base station 702 on UL hopping frames.

The base station 702 may group the plurality of hopping channels into different groups based on the BWP hopping frequencies of the hopping channels. In some implementations, a set of hopping channels having adjacent BWP hopping frequencies may be assigned to a group such that the combined BWP hopping frequencies of the group correspond to a channel of a wireless network. The channel conditions of one or more nearby wireless networks also may be used to group the plurality of hopping channels into groups. In some implementations, the base station 702 may request the UE 704 to determine the channel conditions of a nearby wireless network, and to report the determined channel conditions to the base station 702. Specifically, the base station 702 may transmit a Wi-Fi measurement request that instructs the UE 704 to determine or estimate channel conditions of one or more identified wireless networks. The UE 704 may use any suitable mechanism to determine or obtain the requested channel conditions, and may transmit the determined channel conditions to the base station 702 in a measurement report.

In some implementations, the UE 704 may include a Wi-Fi chipset that can be used to exchange communications with Wi-Fi devices (such as APs and STAs) using communication protocols and signaling techniques adopted by one or more versions of the IEEE 802.11 family of standards. As such, the UE 704 may participate in channel sounding operations with one or more APs of an associated wireless network to determine channel conditions of the associated wireless network, or may at least receive sounding frames or sounding sequences (such as a null data packet (NDP)) from which channel conditions of the wireless network can be estimated. In some implementations, the UE 704 may identify the wireless channels upon which a nearby wireless network operates based on beacon frames or other broadcast frames associated with the nearby wireless network. In some instances, the UE 704 may identify the wireless channels by decoding channel information contained in one or more of the beacon frames. In some other instances, the UE 704 may identify the wireless channels based on a presence (or absence) of beacon frames transmitted on the wireless channels.

The base station 702 may transmit a discovery reference signal (DRS) indicating a first DRS period during which the base station 702 and the UE 704 may exchange communications on the first hopping channel of the frequency hopping pattern. The DRS may be transmitted on an anchor channel, may include or indicate the frequency hopping pattern, and may include grouping information of the hopping channels. In some instances, the DRS also may include system information. The frequency hopping pattern may indicate a location of each hopping channel of the plurality of hopping channels, an order in which the UE 704 is to frequency hop across the plurality of hopping channels, and the dwell time on each of the plurality of hopping channels. The frequency hopping pattern also may indicate a duration of hopping frames associated with the plurality of hopping channels, a duration of one or both DL and UL transmissions, and other information. The system information may include one or more of a primary synchronization signal (PSS), a secondary synchronization signal (SSS), a physical broadcast channel (PBCH), a system information block (SIB), or a slot format indicator (SFI). The UE 704 may use the PSS to determine subframe or symbol timing and a physical layer identity, and may use the SSS to determine a physical layer cell identity group number and radio frame timing.

The grouping indication may indicate at least one of the number of groups of hopping channels, a starting frequency of each group of hopping channels, or a frequency range of each group of hopping channels. In some aspects, the grouping indication also may include or indicate the BWP hopping frequencies associated with each group of hopping channels. In some implementations, the grouping indication may be transmitted to the UE 704 in the DRS. In some other implementations, the grouping indication may be provided to the UE 704 via RRC configuration.

The UE 704 may identify the ordering and the locations of the plurality of hopping channels based on the frequency hopping information contained in the DRS, and may identify the groups of hopping channels based on the grouping indication. After transmission of the DRS, the base station 702 and the UE 704 frequency hop to the first hopping channel of the frequency hopping pattern. In some implementations, the base station 702 may contend for channel access to the hopping channels using a CCA-based channel access mechanism, and the UE 704 may access the hopping channels without using an LBT channel access mechanism. The base station 702 may obtain access to the first hopping channel for a channel occupancy time (COT) based on the CCA-based channel access mechanism, and may transmit a signal informing the UE 704 of the obtained COT on the first hopping channel (the signal is not shown in FIG. 7A for simplicity). The signal may be one or more of system information channel occupancy time (SI-COT), a group-common physical downlink control channel (GC-PDCCH), or a common transmit preamble.

The base station 702 may transmit DL reference signals, DL data, UL/DL grants, and other information on the first hopping channel. The UE 704 may monitor the first hopping channel for the DL reference signals, DL data, UL/DL grants, and other information. Specifically, the base station 702 may transmit a channel state information reference signal (CSI-RS) on the first hopping channel. In some implementations, the base station 702 may transmit the CSI-RS concurrently with transmitting the DL data to the UE 704 (such as by using the same channel resources to transmit the DL data and the CSI-RS). In some other implementations, the base station 702 may transmit the DL data and the CSI-RS to the UE 704 at different times during the first DRS period.

The UE 704 may use the CSI-RS received on the first hopping channel to determine channel state information (CSI) of the first hopping channel, and may transmit the determined CSI as a CSI report to the base station 702 on the first hopping channel. In some other implementations, the UE 704 may transmit the CSI report of the first hopping channel to the base station 702 on another hopping channel of the frequency hopping pattern. In some instances, the UE 704 may transmit the CSI report of the first hopping channel to the base station 702 on a last hopping channel of the group that includes the first hopping channel. In some other instances, the UE 704 may transmit the CSI report of the first hopping channel to the base station 702 on a designated hopping channel of the group that includes the first hopping channel.

When the UE 704 does not have buffered UL data, the UE 704 may transmit the CSI report to the base station 702 on the PUCCH. When the UE 704 has buffered UL data, the UE 704 may transmit the CSI report on the PUSCH along with the UL data. In some implementations, the UE 704 may be configured to operate as a full-duplex device, and may receive DL data on the first hopping channel from the base station 702 concurrently with transmitting UL data on the first hopping channel to the base station 702. In some other implementations, the UE 704 may be configured to operate as half-duplex device, and may receive DL data and transmit UL data at different times during the first DRS period.

The base station 702 and the UE 704 may return to the anchor channel at the end of the first DRS period. The base station 702 may transmit a second DRS indicating a second DRS period during which the base station 702 and the UE 704 may exchange communications using the second hopping channel of the frequency hopping pattern. After transmission of the second DRS, the base station 702 and the UE 704 may frequency hop to the second hopping channel, and the base station 702 transmits a second CSI-RS on the second hopping channel. In some implementations, the base station 702 may transmit the second CSI-RS concurrently with transmitting DL data to the UE 704. In some other implementations, the base station 702 may transmit the DL data and the second CSI-RS to the UE 704 at different times during the second DRS period.

The UE 704 may use the CSI-RS received on the second hopping channel to determine CSI of the second hopping channel. The UE 704 may transmit the determined CSI as a CSI report to the base station 702 on the second hopping channel. In some other implementations, the UE 704 may transmit the CSI report of the second hopping channel to the base station 702 on another hopping channel of the frequency hopping pattern. In some instances, the UE 704 may transmit the CSI report of the second hopping channel to the base station 702 on a last hopping channel of the group that includes the second hopping channel. In some other instances, the UE 704 may transmit the CSI report of the first hopping channel to the base station 702 on a designated hopping channel of the group that includes the second hopping channel.

When the UE 704 does not have buffered UL data, the UE 704 may transmit the CSI report to the base station 702 on the PUCCH. When the UE 704 has buffered UL data, the UE 704 may transmit the CSI report on the PUSCH along with the UL data.

The base station 702 and the UE 704 may frequency hop across the remaining hopping channels of the plurality of hopping channels in a manner similar to that described with reference to the first and second hopping channels. After sequencing through the frequency hopping pattern, the base station 702 may have CSI for each of the plurality of hopping channels of the frequency hopping pattern. In some implementations, the channel information obtained for a frequency hopping pattern may be used to selectively change the groupings of hopping channels of the frequency hopping pattern.

As described, the UE 704 may transmit the CSI reports to the base station 702 on each hopping channel of the plurality of hopping channels of the frequency hopping pattern. In some instances, the channel information provided to the base station 702 for a respective hopping channel may be stale when the base station 702 and the UE 704 re-visit the respective hopping channel. For example, when a frequency hopping pattern including 15 hopping channels and having a channel dwell time of approximately 80 ms is used by the base station 702 and the UE 704, the duration between visits to a respective hopping channel is approximately 15×80 ms=1.2 seconds, which may be a sufficiently long duration for channel conditions on the respective hopping channel to change. As such, the base station 502 may benefit from determining (or at least infer) channel information of the hopping channels earlier.

Figure 7B:
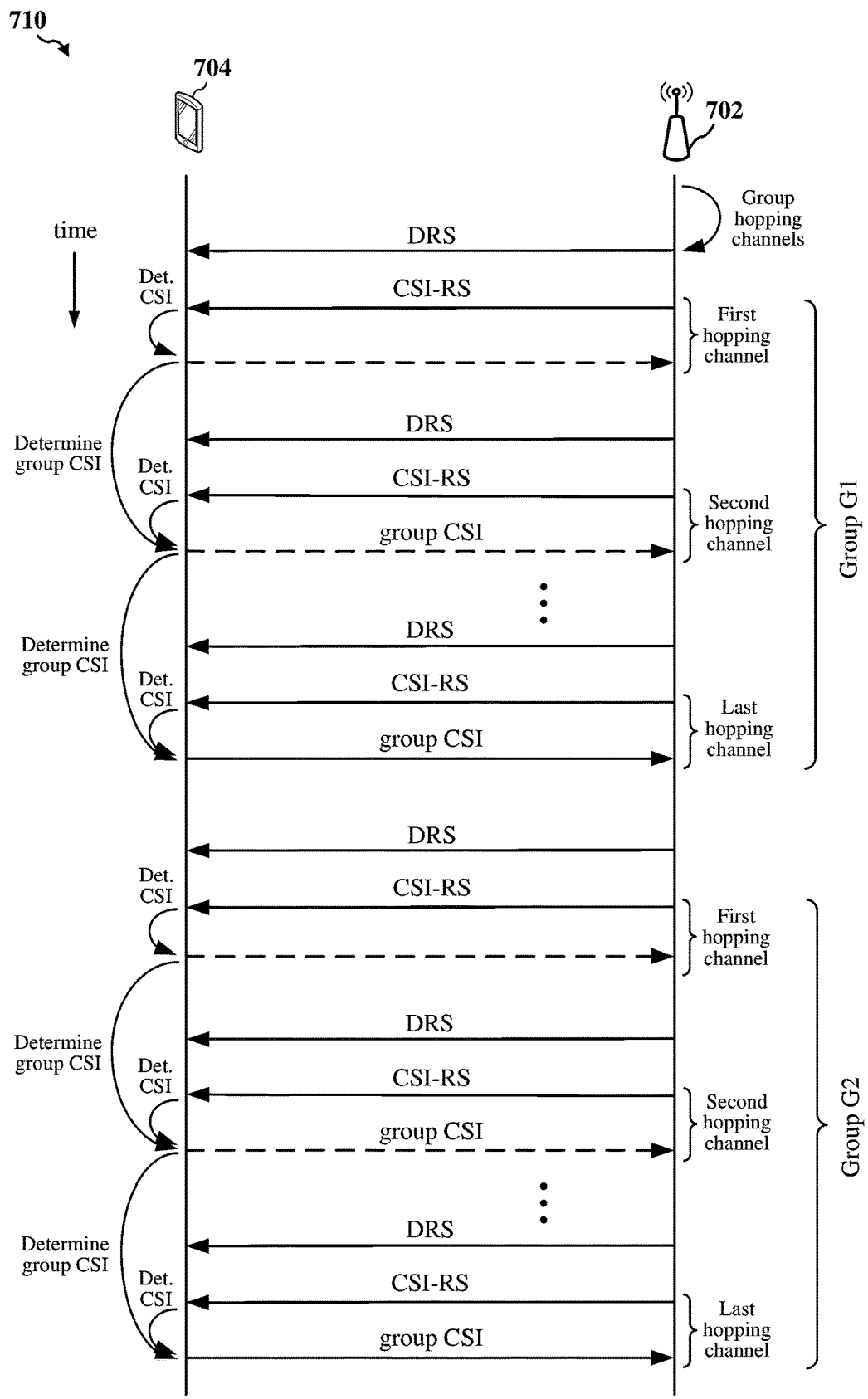
FIG. 7B shows another example sequence diagram for wireless communication that supports frequency hopping between a base station and a UE.

FIG. 7B shows a sequence diagram 710 depicting communications between the base station 702 and the UE the UE 704. The base station 702 may be one example of the base station 102 of FIG. 1, the base station 310 of FIG. 3, or the base station 502 of FIG. 5. The UE 704 may be one example of the UE 104 of FIG. 1, the UE 350 of FIG. 3, or the UE 504 of FIG. 5. The communications may be transmitted using any suitable radio access network (RAN) including, for example, a 5G NR access network. In some implementations, the communications may be narrowband communications in an unlicensed frequency band (such as unlicensed portions of the 2.4 GHz frequency band, one or more of the UNIT bands in the 5 GHz frequency band, unlicensed portions of the 6 GHz frequency band, or other unlicensed frequency bands).

In some implementations, the base station 702 may group a plurality of hopping channels of a frequency hopping pattern into a number of groups based on the BWP hopping frequencies of the plurality of hopping channels. In the example of FIG. 7B, a plurality of hopping channels are grouped into a first group G1 and a second group G2. The first group G1 of hopping channels and the second group G2 of hopping channels may be part of a frequency hopping pattern used for communications between the base station 702 and the UE 704.

The base station 702 may transmit a DRS to the UE 704 at the beginning of each DRS period. The DRS may include or indicate the frequency hopping pattern, the grouping indication, and system information. In some implementations, the grouping indication may indicate at least one of the number of groups of hopping channels, a starting frequency of each group of hopping channels, or a frequency range of each group of hopping channels. The one or more grouping parameters also may indicate the BWP hopping frequencies associated with each group of hopping channels.

After transmission of the DRS, the base station 702 and the UE 704 may jump to the first hopping channel of the first group G1. The base station 702 may transmit a CSI-RS on the first hopping channel. The UE 704 may determine CSI for the first hopping channel based on the received CSI-RS. The base station 702 may transmit DL data, DL reference signals, UL/DL grants, and other information on the first hopping channel. The UE 704 may be configured to receive DL data, DL reference signals, UL/DL grants, and other information from the base station 702 on the first hopping channel. In some implementations, the UE 704 may receive DL data on the first hopping channel concurrently with receiving the CSI-RS on the first hopping channel.

The base station 702 and the UE 704 may jump to the second hopping channel of the first group G1 after a number of DRS periods. The base station 702 may transmit a CSI-RS on the second hopping channel, and the UE 704 may determine CSI for the second hopping channel based on the received CSI-RS. The base station 702 also may transmit DL data, DL reference signals, UL/DL grants, and other information on the second hopping channel. The 704 may be configured to receive DL data, DL reference signals, UL/DL grants, and other information from the base station 702 on the second hopping channel. In some implementations, the UE 704 may receive DL data on the second hopping channel concurrently with receiving the CSI-RS on the second hopping channel.

The base station 702 and the UE 704 may jump to the third hopping channel of the first group G1 after a number of DRS periods, and may perform similar operations to determine the CSI of each of the remaining hopping channels of the first group G1. The CSIs determined for each of the hopping channels of the first group G1 may be combined to determine a group CSI for the first group G1 of hopping channels. When the hopping channels of the first group G1 have adjacent BWP hopping frequencies that span a frequency range, the group CSI may indicate channel information of the frequency range. The UE 704 may transmit the group CSI to the base station 702 on each of the hopping channels of the first group G1 or may transmit the group CSI to the base station 702 on the last hopping channel of the first group G1. In some instances, the group CSI may be a moving average of the CSIs determined for each of one or more last hopping channels of the respective group. In some other instances, the group CSI may be an average of the CSIs determined for each of the hopping channels of the respective group.

The base station 702 and the UE 704 may jump to the first hopping channel of the second group G2 of hopping channels, and may perform operations similar to the operations described with reference to the first group G1 of hopping channels to determine the CSI of each of the hopping channels of the second group G2. The CSIs determined for each of the hopping channels of the second group G2 may be combined to determine a group CSI for the second group G2 of hopping channels. When the hopping channels of the first second group G2 have adjacent BWP hopping frequencies that span a frequency range, the group CSI may indicate channel information of the frequency range. The UE 704 may transmit the group CSI to the base station 702 on each of the hopping channels of the second group G2 or may transmit the group CSI to the base station 702 on the last hopping channel of the second group G2. In some instances, the group CSI may be a moving average of the CSIs determined for each of one or more last hopping channels of the respective group. In some other instances, the group CSI may be an average of the CSIs determined for each of the hopping channels of the respective group.

Figure 7C:
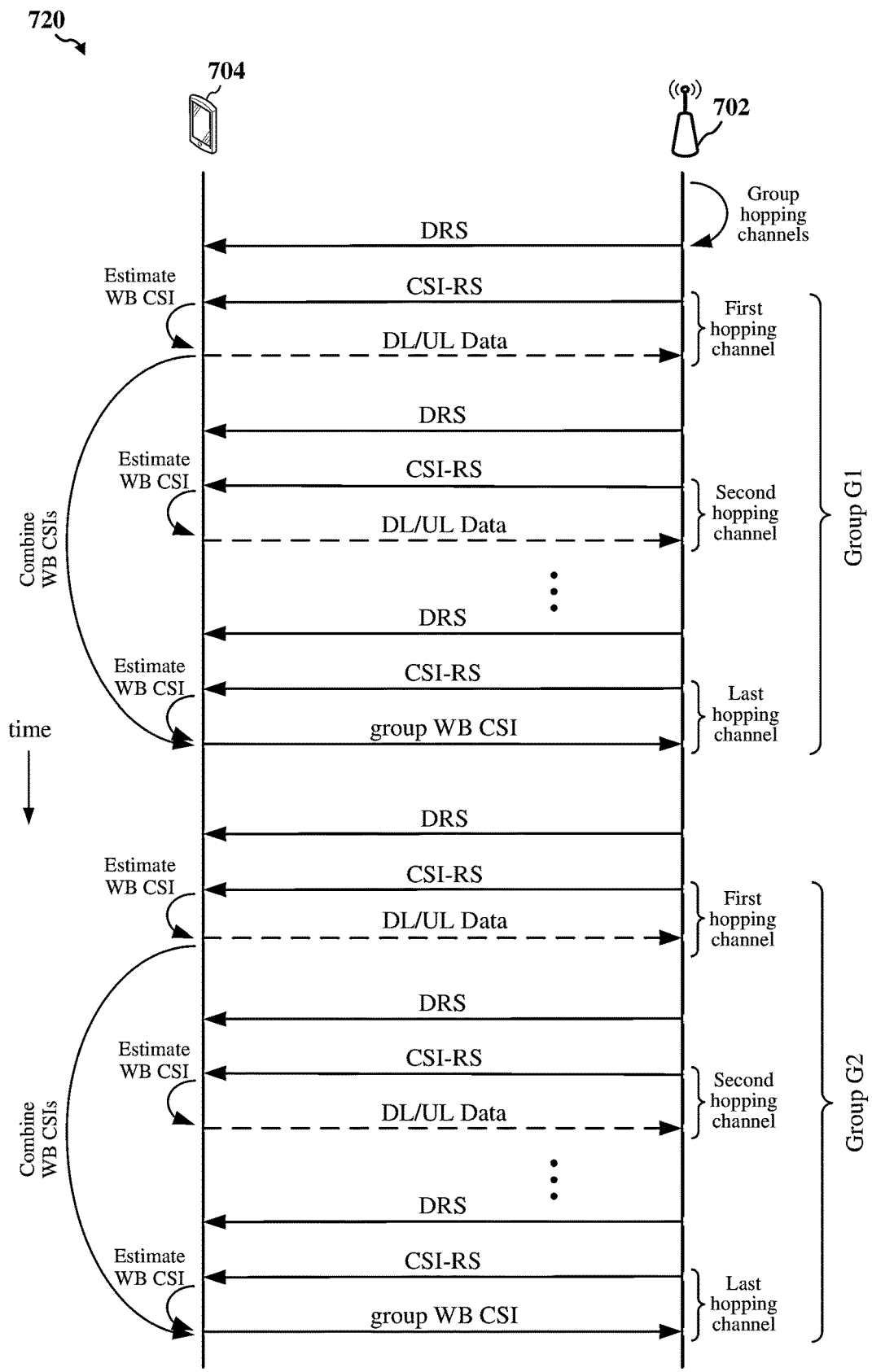
FIG. 7C shows another sequence diagram for wireless communication that supports frequency hopping between a base station and a UE.

FIG. 7C shows a sequence diagram 720 depicting communications between the base station 702 and the UE 704. The base station 702 may be one example of the base station 102 of FIG. 1, the base station 310 of FIG. 3, or the base station 502 of FIG. 5. The UE 704 may be one example of the UE 104 of FIG. 1, the UE 350 of FIG. 3, or the UE 504 of FIG. 5. The communications may be transmitted using any suitable radio access network (RAN) including, for example, a 5G NR access network. In some implementations, the communications may be narrowband communications in an unlicensed frequency band (such as unlicensed portions of the 2.4 GHz frequency band, one or more of the UNIT bands in the 5 GHz frequency band, unlicensed portions of the 6 GHz frequency band, or other unlicensed frequency bands).

In some implementations, the base station 702 may group a plurality of hopping channels of a frequency hopping pattern into different groups based on the BWP hopping frequencies of the plurality of hopping channels. In the example of FIG. 7C, a plurality of hopping channels are grouped into a first group G1 and a second group G2. The first group G1 and the second group G2 of hopping channels may be part of a frequency hopping pattern used for communications between the base station 702 and the UE 704.

The base station 702 may transmit a DRS to the UE 704 at the beginning of each DRS period. The DRS may include or indicate the frequency hopping pattern, the grouping indication, and system information. In some implementations, the grouping indication may indicate at least one of the number of groups of hopping channels, a starting frequency of each group of hopping channels, or a frequency range of each group of hopping channels. The grouping indication also may indicate the BWP hopping frequencies associated with each group of hopping channels.

After transmission of the DRS, the base station 702 and the UE 704 may jump to the first hopping channel of the first group G1. The base station 702 may transmit a CSI-RS on the first hopping channel, and the UE 704 may estimate a wideband (WB) channel state information (CSI) of the first hopping channel based on the received CSI-RS. In some implementations, the estimated WB CSI may indicate channel conditions of a corresponding wideband channel. The base station 702 may transmit DL data, DL reference signals, UL/DL grants, and other information on the first hopping channel. The UE 704 may be configured to receive DL data, DL reference signals, UL/DL grants, and other information from the base station 702 on the first hopping channel. In some implementations, the UE 704 may receive DL data on the first hopping channel concurrently with receiving the CSI-RS on the first hopping channel.

The base station 702 and the UE 704 may jump to the second hopping channel of the first group G1 after a number of DRS periods. The base station 702 may transmit a CSI-RS on the second hopping channel, and the UE 704 may estimate a WB CSI of the second hopping channel based on the received CSI-RS. In some implementations, the estimated WB CSI may indicate channel conditions of a corresponding wideband channel. The base station 702 also may transmit DL data, DL reference signals, UL/DL grants, and other information on the second hopping channel. The UE 704 may be configured to receive DL data, DL reference signals, UL/DL grants, and other information from the base station 702 on the second hopping channel. In some implementations, the UE 704 may receive DL data on the second hopping channel concurrently with receiving the CSI-RS on the second hopping channel.

The base station 702 and the UE 704 may jump to the third hopping channel of the first group G1 after a number of DRS periods, and may perform similar operations to estimate the WB CSI of each of the remaining hopping channels of the first group G1. The WB CSIs determined for each of the hopping channels of the first group G1 may be combined to determine a group WB CSI for the first group G1 of hopping channels. The UE 704 may transmit the group WB CSI to the base station 702 on each of the hopping channels of the first group G1 or may transmit the group WB CSI to the base station 702 on the last hopping channel of the first group G1.

The base station 702 and the UE 704 may jump to the first hopping channel of the second group G2 of hopping channels, and may perform operations similar to the operations described with reference to the first group G1 of hopping channels to determine the WB CSI of each of the hopping channels of the second group G2. The WB CSI's determined for each of the hopping channels of the second group G2 may be combined to determine a group WB CSI for the second group G2 of hopping channels. The UE 704 may transmit the group WB CSI to the base station 702 on each of the hopping channels of the second group G2 or may transmit the group WB CSI to the base station 702 on the last hopping channel of the second group G2.

In some other implementations, the UE 704 may receive a CSI-RS on each of the hopping channels of the first group G1, and may estimate the WB CSI of each hopping channel of a number (N) of the hopping channels of the first group G1 based on the received CSI-RSs. In some instances, the estimated wideband CSI of any one or more hopping channels of the first group G1 of hopping channels may indicate channel conditions of a wideband channel corresponding to the first group G1 of hopping channels. In some other implementations, the UE 704 may determine a CSI difference value between the group WB CSI and each of the CSIs estimated for the hopping channels of the first group G1. In some instances, the UE 704 may transmit one or more of the CSI difference values to the base station 702 in one or more uplink control information (UCI) messages.

Similarly, the UE 704 may receive a CSI-RS on each of the hopping channels of the second group G2, and may estimate the WB CSI of each hopping channel of a N of the hopping channels of the second group G2 based on the received CSI-RSs. In some instances, the estimated wideband CSI of any one or more hopping channels of the second group G2 of hopping channels may indicate channel conditions of a wideband channel corresponding to the second group G2 of hopping channels. In some other implementations, the UE 704 may determine a CSI difference value between the group WB CSI and each of the CSIs estimated for the hopping channels of the second group G2. In some instances, the UE 704 may transmit one or more of the CSI difference values to the base station 702 in one or more UCI messages.

Figure 8:
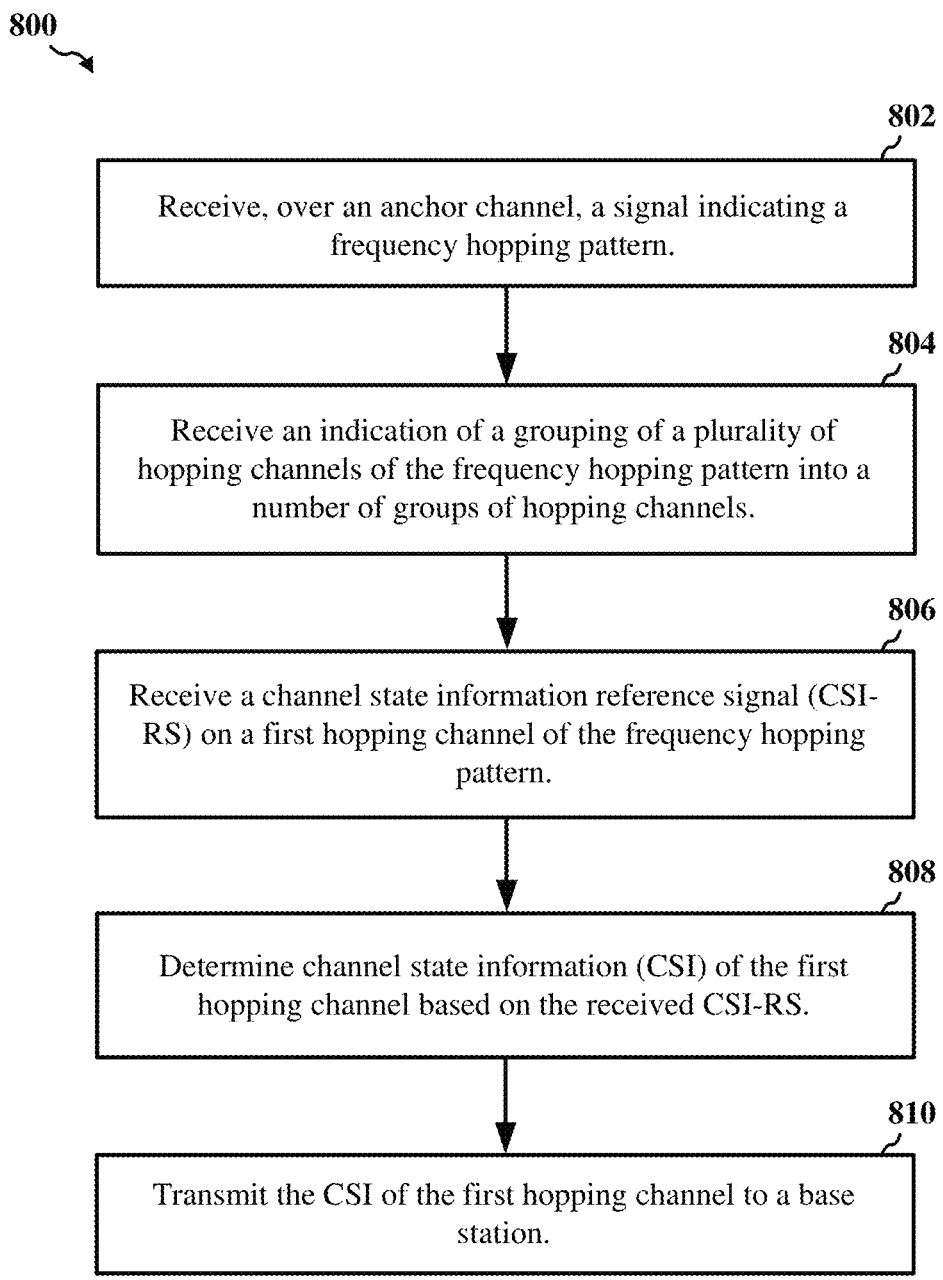
FIG. 8 shows a flowchart depicting an example operation for wireless communication that supports frequency hopping between a base station and a UE.

FIG. 8 shows a flowchart depicting an example operation 800 for wireless communication that supports frequency hopping between a BS and a UE. The operation 800 may be performed by an apparatus of a wireless communication device such as the UE 104 of FIG. 1, the UE 350 of FIG. 3, or the UEs 704 of FIGS. 7A-7C. At block 802, the UE receives, over an anchor channel, a signal indicating a frequency hopping pattern. At block 804, the UE receives an indication of a grouping of a plurality of hopping channels of the frequency hopping pattern into a number of groups of hopping channels. At block 806, the UE receives a channel state information reference signal (CSI-RS) on a first hopping channel of the frequency hopping pattern. At block 808, the UE determines channel state information (CSI) of the first hopping channel based on the received CSI-RS. At block 810, the UE transmits the CSI of the first hopping channel to the BS.

In some implementations, the signal may be a DRS received over the anchor channel. In some instances, the grouping indication may be received in the DRS. In some other instances, the grouping indication may be received via RRC configuration. The grouping indication may be, or may indicate, at least one of the number of groups of hopping channels, a starting frequency of each group of hopping channels, or a frequency range of each group of hopping channels.

In some implementations, the CSI may be transmitted on a physical uplink control channel (PUCCH) when the UE is on the first hopping channel, and may be transmitted on a physical uplink shared channel (PUSCH) when the UE has buffered UL data for transmission to the BS. In some instances, the UE may transmit the CSI on the PUSCH concurrently with transmitting UL data on the PUSCH.

In some implementations, the grouping of the plurality of hopping channels may be based at least in part on channel conditions on one or more wireless channels of a wireless local area network (WLAN). In addition, or in the alternative, the frequency hopping pattern may be based at least in part on channel conditions on the one or more wireless channels of the WLAN. In some implementations, the hopping channels within each group of hopping channels may include adjacent BWP hopping frequencies that collectively span a frequency bandwidth of at least one channel of a WLAN. In some instances, the BWP hopping frequencies associated with a first group of hopping channels may span a primary 20 MHz channel of the WLAN, and the BWP hopping frequencies associated with a second group of hopping channels may span a secondary 20 MHz channel of the WLAN.

Figure 9:
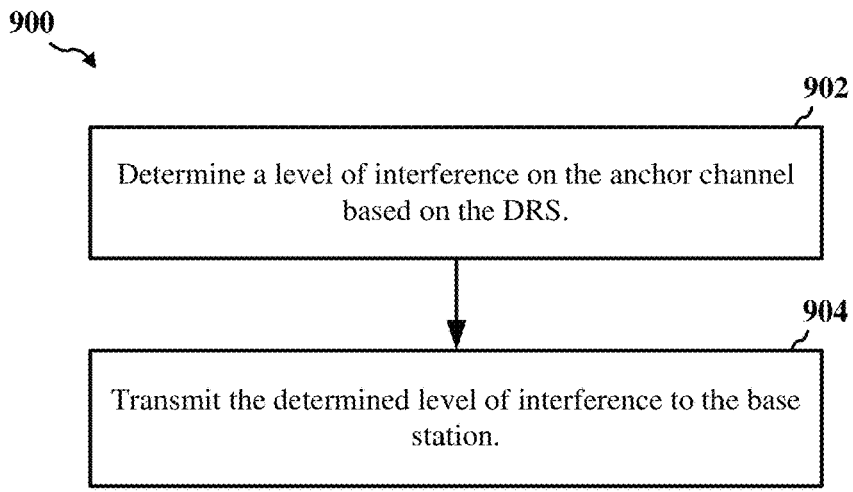
FIG. 9 shows a flowchart depicting an example operation for wireless communication that supports frequency hopping between a base station and a UE.

FIG. 9 shows a flowchart depicting an example operation 900 for wireless communication that supports frequency hopping between a BS and a UE. The operation 900 may be performed by an apparatus of a wireless communication device such as the UE 104 of FIG. 1, the UE 350 of FIG. 3, or the UEs 704 of FIGS. 7A-7C. In some instances, the operation 900 may be performed before the operation 800 of FIG. 8. In some other instances, the operation 900 may be performed during the operation 800 of FIG. 8. In some other instances, the operation 900 may be performed after the operation 800 of FIG. 8. For example, at block 902, the UE determines a level of interference on the anchor channel based on the DRS. At block 904, the UE transmits the determined level of interference to the BS.

In some implementations, the first hopping channel may be a narrowband channel that at least partially overlaps a channel (such as a primary channel or one or more secondary channels) of a wireless network, and the CSI may be indicative of channel conditions or interference on the channel of the wireless network. For example, in some instances, the first hopping channel may belong to a first group of hopping channels having frequency bands that at least partially overlap the channel of the wireless network. In some other instances, the hopping channels within a particular group of hopping channels may have adjacent BWP hopping frequencies that collectively span a frequency bandwidth of a corresponding channel of a wireless network. For example, in some implementations, the BWP hopping frequencies associated with a first group of hopping channels span a primary 20 MHz channel of the wireless network, and the BWP hopping frequencies associated with a second group of hopping channels span a secondary 20 MHz channel of the wireless network.

Figure 10:
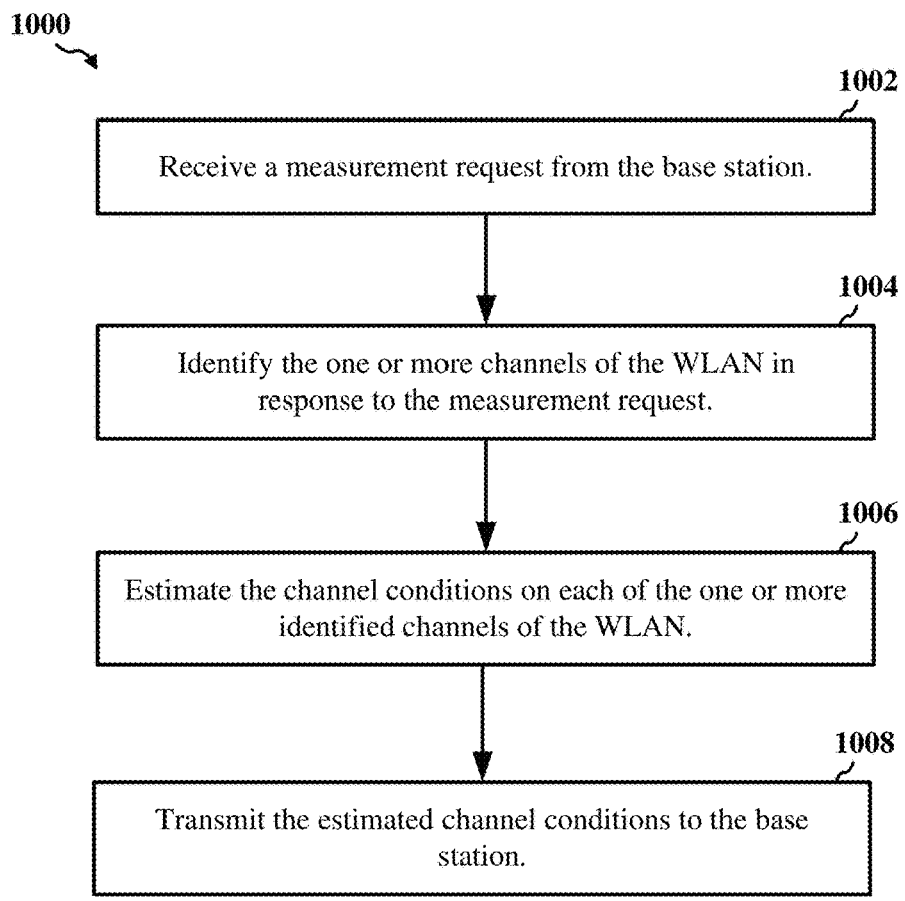
FIG. 10 shows a flowchart depicting an example operation for wireless communication that supports frequency hopping between a base station and a UE.

FIG. 10 shows a flowchart depicting an example operation 1000 for wireless communication that supports frequency hopping between a BS and a UE. The operation 1000 may be performed by an apparatus of a wireless communication device such as the UE 104 of FIG. 1, the UE 350 of FIG. 3, or the UEs 704 of FIGS. 7A-7C. In some implementations, the operation 1000 may begin before the operation 800 of FIG. 8. For example, in block 1002, the UE receives a measurement request from the BS. At block 1004, the UE identifies the one or more channels of the WLAN in response to the measurement request. At block 1006, the UE estimates the channel conditions on each of the one or more identified channels of the WLAN. At block 1008, the UE transmits the estimated channel conditions to the BS.

In some implementations, the measurement request may instruct one or more UEs to determine or estimate channel conditions of one or more identified wireless channels of wireless networks. The UEs may use any suitable mechanism to determine or obtain the requested channel conditions, and may transmit the determined channel conditions to the BS in a measurement report. In some instances, the measurement request and the measurement report may be frames defined by one or more amendments of the IEEE 802.11 family of wireless communications standards.

As discussed, hopping channels having adjacent BWP hopping frequencies can be grouped together such that the frequency range spanned by the BWP hopping frequencies of the hopping channels in a given group occupies the same or similar frequency range as a particular channel (such as the primary 20 MHz channel) of a wireless network. For example, a number (N) of hopping channels belonging to the same group and having adjacent BWP hopping frequencies that collectively span a primary 20 MHz channel of a wireless network can be associated with the primary 20 MHz channel of the wireless network. In this way, channel conditions and state information determined or estimated for the group of hopping channels may be used as an indication of the channel conditions of the primary channel of the wireless network.

Figure 11A:
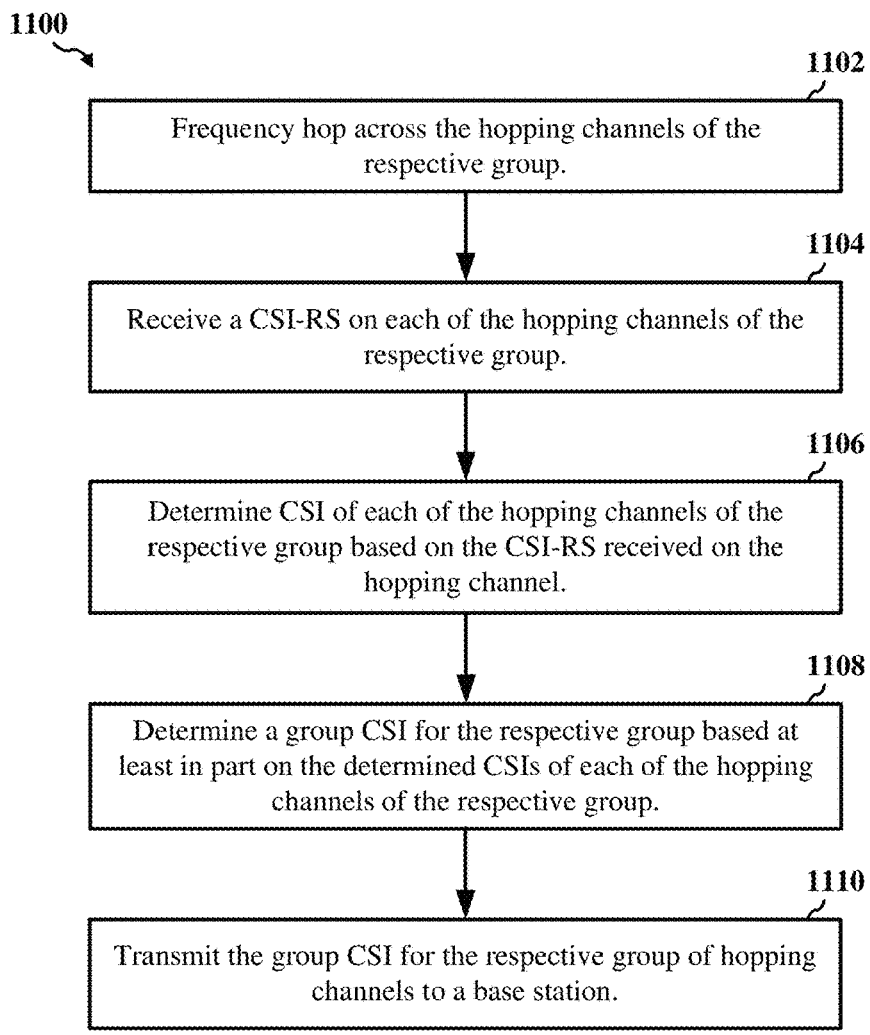
FIG. 11A shows a flowchart depicting an example operation for wireless communication that supports frequency hopping between a base station and a UE.

FIG. 11A shows a flowchart depicting an example operation 1100 for wireless communication that supports frequency hopping between a BS and a UE. The operation 1100 may be performed by an apparatus of a wireless communication device such as the UE 104 of FIG. 1, the UE 350 of FIG. 3, or the UE 704 of FIG. 7B. In some implementations, the operation 1100 may be one example of one or more of the operations described in blocks 806, 808, or 810 of FIG. 8. For example, at block 1102, the UE frequency hops across the hopping channels of a respective group of hopping channels. At block 1104, the UE receives a CSI-RS on each of the hopping channels of the respective group. At block 1106, the UE determines CSI of each of the hopping channels of the respective group based on the CSI-RS received on the respective hopping channel of the group. At block 1108, the UE determines a group CSI for the respective group based at least in part on the determined CSIs of each of the hopping channels of the respective group. At block 1110, the UE transmits the group CSI for the respective group of hopping channels to a BS.

In some implementations, the group CSI may be a moving average of the CSIs determined for a last number (N) of the hopping channels of the respective group, where N is an integer greater than one. In some instances, the moving average may be transmitted to the BS on each hopping channel of the last number N of the hopping channels of the respective group. In some other implementations, the group CSI may be an average of the CSIs determined for each of the hopping channels of the respective group, and the average CSI may be transmitted to the BS on each hopping channel of the respective group.

Figure 11B:
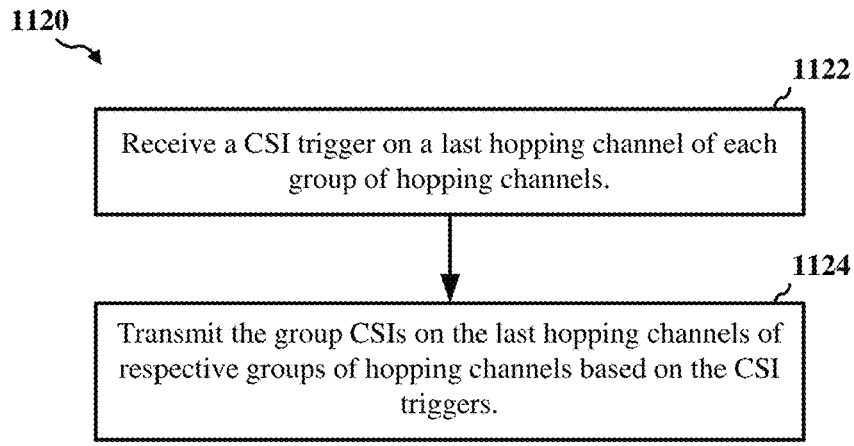
FIG. 11B shows a flowchart depicting an example operation for wireless communication that supports frequency hopping between a base station and a UE.

FIG. 11B shows a flowchart depicting an example operation 1120 for wireless communication that supports frequency hopping between a BS and a UE. The operation 1120 may be performed by an apparatus of a wireless communication device such as the UE 104 of FIG. 1, the UE 350 of FIG. 3, or the UE 704 of FIG. 7B. In some implementations, the operation 1120 may be one example of transmitting the group CSI in block 1110 of FIG. 11A. For example, at block 1122, the UE receives a CSI trigger on a last hopping channel of each group of hopping channels. At block 1124, the UE transmits the group CSIs on the last hopping channels of respective groups of hopping channels based on the CSI triggers. That is, rather than transmitting CSI on every hopping channel of a frequency hopping pattern, the UE may transmit CSI for all hopping channels in a group while dwelling on the last hopping channel of the frequency hopping pattern. In this way, implementations of the subject matter disclosed herein may reduce power consumption of the UEs, and also may reduce latencies on one or more wireless channels, by transmitting group CSI of a respective group of hopping channels to the BS over one hopping channel of the respective group.

Figure 12:
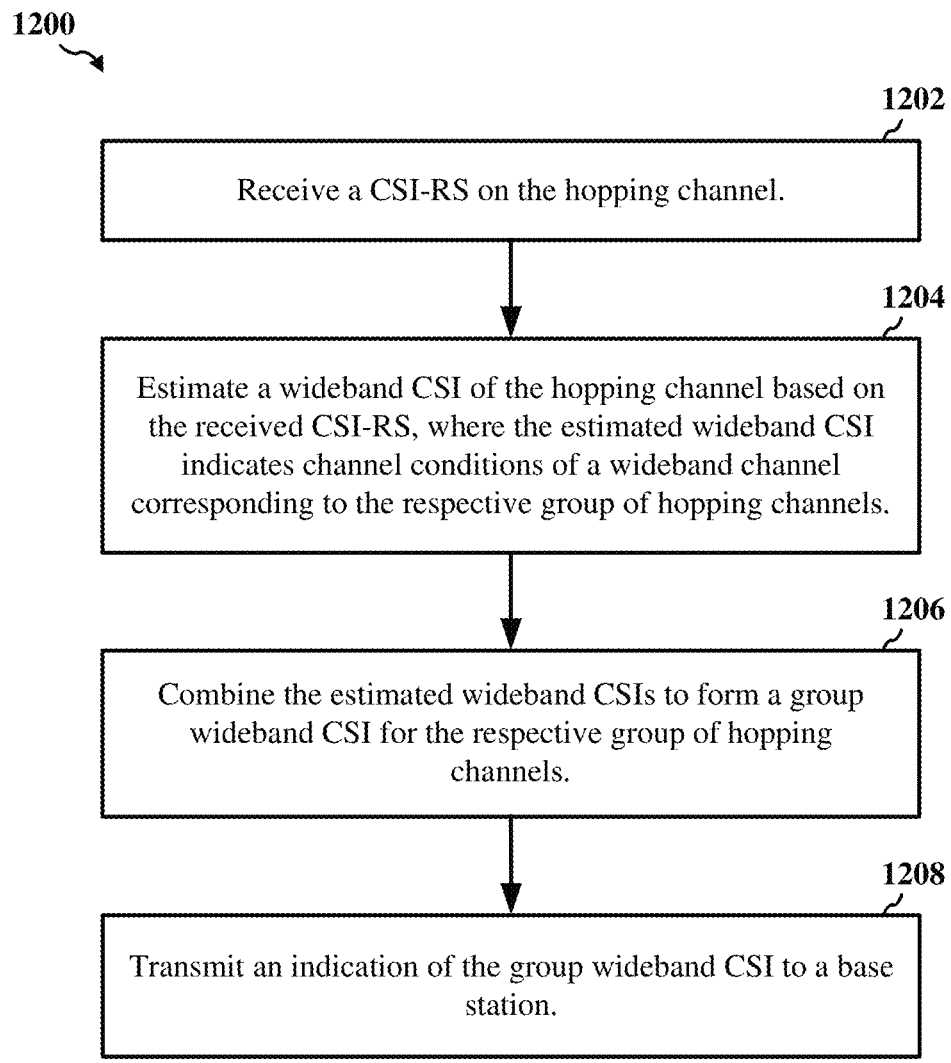
FIG. 12 shows a flowchart depicting an example operation for wireless communication that supports frequency hopping between a base station and a UE.

FIG. 12 shows a flowchart depicting an example operation 1200 for wireless communication that supports frequency hopping between a BS and a UE. The operation 1200 may be performed by an apparatus of a wireless communication device such as the UE 104 of FIG. 1, the UE 350 of FIG. 3, or the UE 704 of FIG. 7B. In some implementations, the operation 1200 may be one example of one or more of the operations described in blocks 806, 808, or 810 FIG. 8. For example, at block 1202, the UE receives a CSI-RS on the hopping channel. At block 1204, the UE estimates a wideband CSI of the hopping channel based on the received CSI-RS. At block 1206, the UE combines the estimated wideband CSIs of the hopping channels in a group to form a group wideband CSI for the respective group of hopping channels. At block 1208, the UE transmits an indication of the group wideband CSI to a BS. In some implementations, the estimated wideband CSI may indicate channel conditions of a wideband channel corresponding to the respective group of hopping channels.

As discussed, the CSIs determined for each of the hopping channels in a respective group may be combined to determine a group CSI for the respective group of hopping channels. In some implementations, a respective group of hopping channels may have adjacent BWP hopping frequencies that collectively span a frequency range, and the determined group CSI may indicate channel information of the spanned frequency range. In some instances, the group CSI may be transmitted on the PUCCH while the UE is on a particular hopping channel. In some other instances, the CSI may be transmitted on the PUSCH when the UE has buffered UL data for transmission to the BS.

Figure 13:
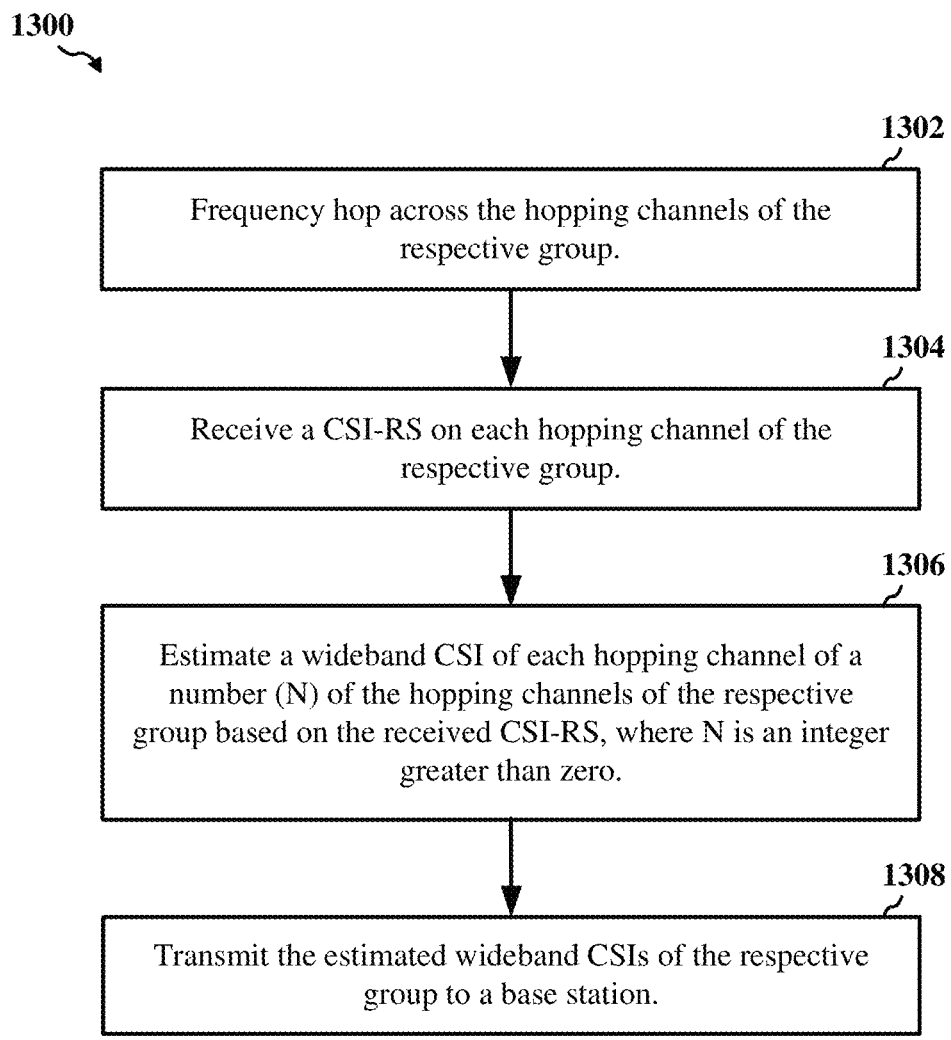
FIG. 13 shows a flowchart depicting an example operation for wireless communication that supports frequency hopping between a base station and a UE.

FIG. 13 shows a flowchart depicting an example operation 1300 for wireless communication that supports frequency hopping between a BS and a UE. The operation 1300 may be performed by an apparatus of a wireless communication device such as the UE 104 of FIG. 1, the UE 350 of FIG. 3, or the UE 704 of FIG. 7B. In some implementations, the operation 1300 may be one example of one or more of the operations described in blocks 806, 808, or 810 of FIG. 8. For example, at block 1302, the UE frequency hops across the hopping channels of a respective group of hopping channels. At block 1304, the receives a CSI-RS on each hopping channel of the respective group. At block 1306, the UE estimates a wideband CSI of each hopping channel of a number (N) of the hopping channels of the respective group based on the received CSI-RS, where N is an integer greater than zero. At block 1308, the UE transmits the estimated wideband CSIs of the respective group to the BS.

The estimated wideband CSI may indicate channel conditions of a wideband channel corresponding to the respective group of hopping channels. In some implementations, the indication of the group wideband CSI may be transmitted to the BS on CSI resources of the PUCCH. In some instances, the indication of the group wideband CSI may be transmitted on a last hopping channel of the respective group of hopping channels. In some other instances, the indication of the group wideband CSI may be transmitted on a hopping channel of another group of hopping channels.

Figure 14:
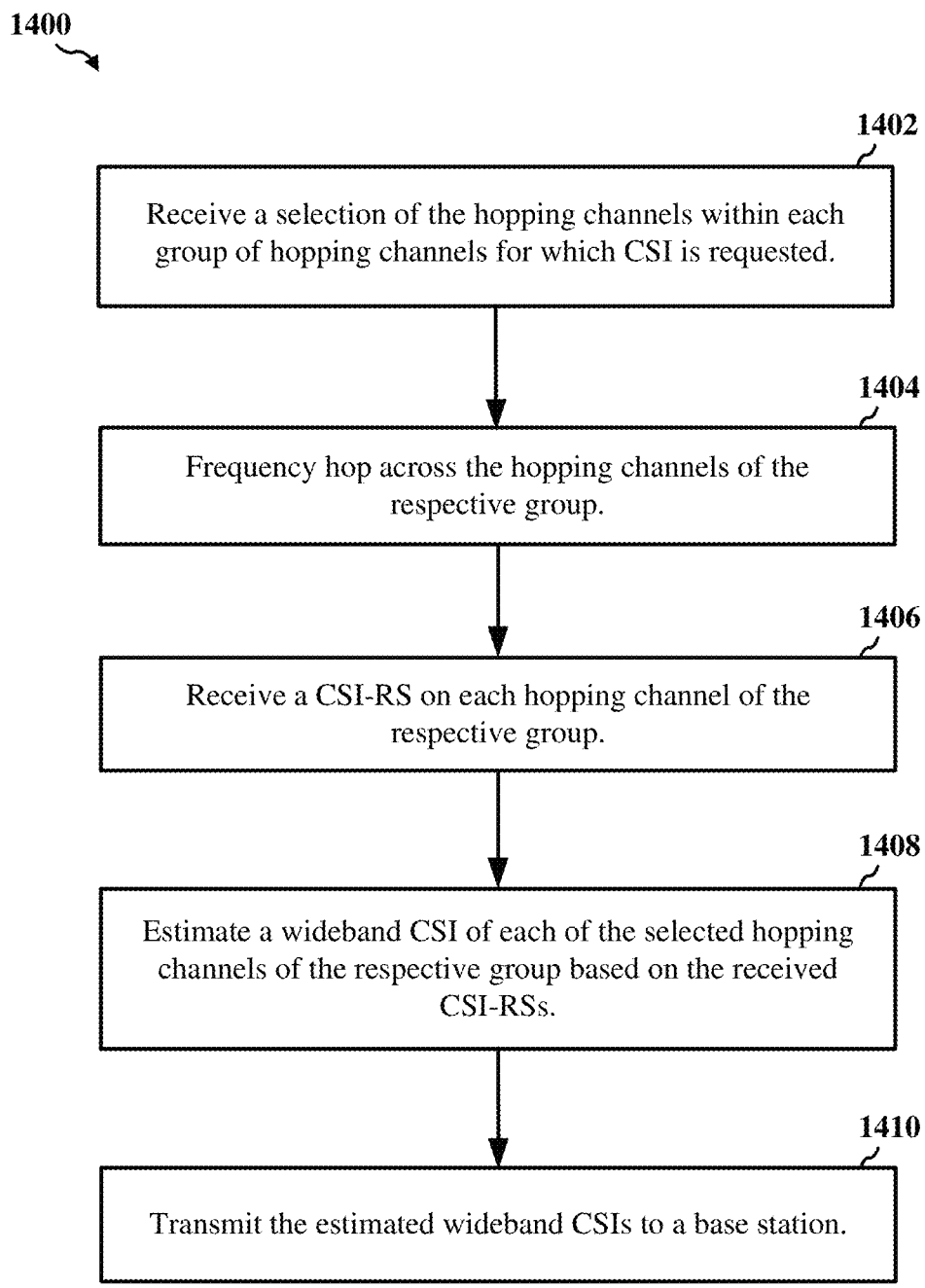
FIG. 14 shows a flowchart depicting an example operation for wireless communication that supports frequency hopping between a base station and a UE.

FIG. 14 shows a flowchart depicting an example operation 1400 for wireless communication that supports frequency hopping between a BS and a UE. The operation 1400 may be performed by an apparatus of a wireless communication device such as the UE 104 of FIG. 1, the UE 350 of FIG. 3, or the UE 704 of FIG. 7C. In some implementations, the operation 1400 may be one example of one or more of the operations described in blocks 806, 808, or 810 of FIG. 8. For example, at block 1402, the UE receives a selection of the hopping channels within each group of hopping channels for which CSI is requested. At block 1404, the UE frequency hops across the hopping channels of a respective group of hopping channels. At block 1406, the UE receives a CSI-RS on each hopping channel of the respective group. At block 1408, the UE estimates a wideband CSI of each of the selected hopping channels based on the received CSI-RSs. At block 1410, the UE transmits the estimated wideband CSIs to the BS.

The estimated wideband CSI may indicate channel conditions of a wideband channel corresponding to the respective group of hopping channels. In some implementations, the indication of the group wideband CSI may be transmitted on CSI resources of the PUCCH. In some instances, the indication of the group wideband CSI may be transmitted on a last hopping channel of the respective group of hopping channels. In some other instances, the indication of the group wideband CSI may be transmitted on a hopping channel of another group of hopping channels.

Figure 15:
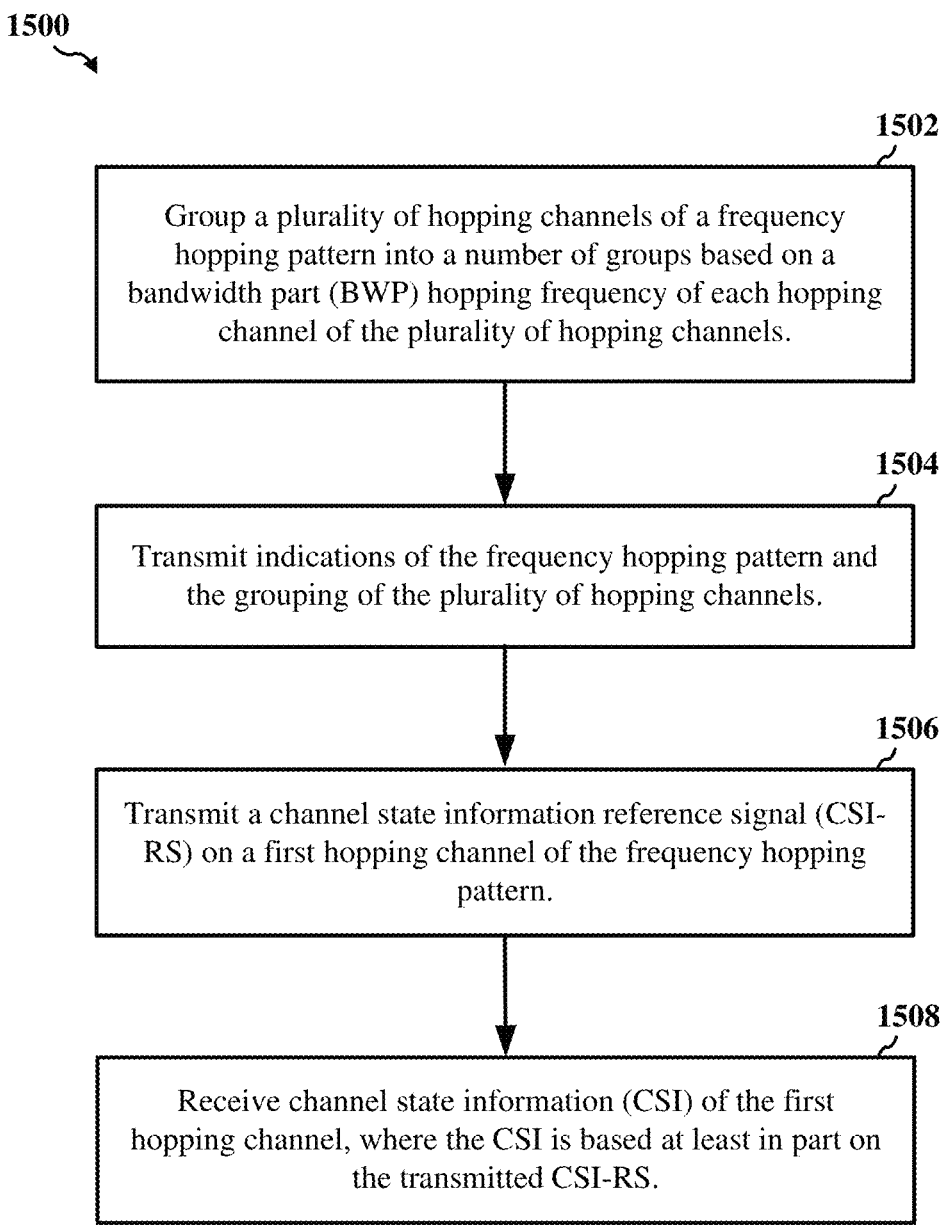
FIG. 15 shows a flowchart depicting an example operation for wireless communication that supports frequency hopping between a base station and a UE.

FIG. 15 shows a flowchart depicting an example operation 1500 for wireless communication that supports frequency hopping between a BS and a UE. The operation 1500 may be performed by an apparatus of a wireless communication device such as the BS 102 of FIG. 1, the BS 310 of FIG. 3, or the BSs 702 of FIGS. 7A-7C. At block 1502, the BS groups a plurality of hopping channels of a frequency hopping pattern into a number of groups based on a BWP hopping frequency of each respective hopping channel of the plurality of hopping channels. At block 1504, the BS transmits indications of the frequency hopping pattern and the grouping of the plurality of hopping channels. At block 1506, the BS transmits a CSI-RS on a first hopping channel of the frequency hopping pattern. At block 1508, the BS receives channel state information (CSI) of the first hopping channel. In some instances, the CSI may be based at least in part on the transmitted CSI-RS.

In some implementations, the signal may be a DRS transmitted over the anchor channel. In some instances, one or more UEs may use the received DRS to estimate channel conditions or state information of the anchor channel. In some instances, the grouping indication may be received in the DRS. In some other instances, the grouping indication may be received via a RRC configuration. The grouping indication may be, or may indicate, at least one of the number of groups of hopping channels, a starting frequency of each group of hopping channels, or a frequency range of each group of hopping channels.

In some implementations, the grouping of the plurality of hopping channels may be based at least in part on channel conditions on one or more wireless channels of a nearby WLAN or other wireless network. The frequency hopping pattern also may be based at least in part on the channel conditions on the one or more wireless channels of the nearby WLAN. In some other implementations, the hopping channels within each group of hopping channels may include adjacent BWP hopping frequencies that collectively span a frequency bandwidth of at least one channel of a wireless network. In some instances, the BWP hopping frequencies associated with a first group of hopping channels may span a primary 20 MHz channel of the wireless network, and the BWP hopping frequencies associated with a second group of hopping channels may span a secondary 20 MHz channel of the wireless network.

In some implementations, the CSI may be received on the PUCCH when the UE is on the first hopping channel. In some other implementations, the CSI may be received on the PUSCH when the UE has buffered UL data for transmission to the BS. In some instances, the UE may transmit the CSI on the PUSCH concurrently with transmitting UL data on the PUSCH.

Figure 16:
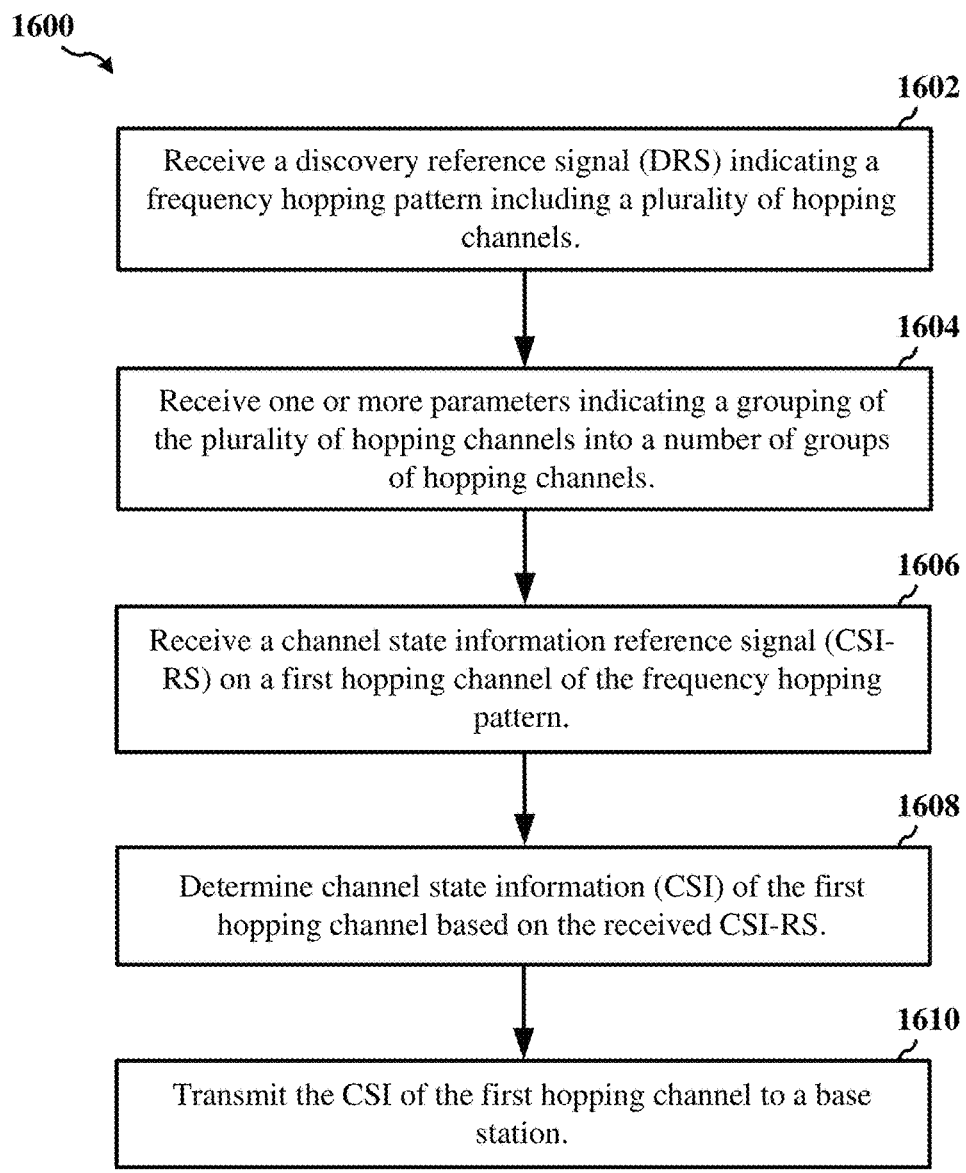
FIG. 16 shows a flowchart depicting another example operation for wireless communication that supports frequency hopping between a base station and a UE.

FIG. 16 shows a flowchart depicting an example operation 1600 for wireless communication that supports frequency hopping between a BS and a UE. The operation 1600 may be performed by an apparatus of a wireless communication device such as the UE 104 of FIG. 1, the UE 350 of FIG. 3, or the UE 704 of FIG. 7A. At block 1602, the UE receives a DRS indicating a frequency hopping pattern including a plurality of hopping channels ordered in a sequence. At block 1604, the UE receives one or more parameters indicating a grouping of the plurality of hopping channels into a number of groups of hopping channels. At block 1606, the UE receives a CSI-RS on a first hopping channel of the frequency hopping pattern. At block 1608, the UE determines channel state information (CSI) of the first hopping channel based on the received CSI-RS. At block 1610, the UE transmits the CSI to a BS.

The one or more parameters may indicate at least one of the number of groups of hopping channels, a starting frequency of each group of hopping channels, and a frequency range of each group of hopping channel. In some implementations, the one or more parameters may be included in the DRS. In some other implementations, the one or more parameters may be received in an RRC configuration.

In some implementations, the first hopping channel may be a narrowband channel that at least partially overlaps a channel of a wireless network, and the CSI may be indicative of channel conditions or interference on the channel of the wireless network. The first hopping channel may belong to a first group of hopping channels having frequency bands that at least partially overlap the channel of the wireless network. In some implementations, the hopping channels within each group of hopping channels may have adjacent BWP hopping frequencies, and the BWP hopping frequencies associated with each group of hopping channels may collectively span a frequency bandwidth of a corresponding channel of a wireless network.

The CSI may be transmitted on the PUCCH while the UE is on the first hopping channel, and may be transmitted on the PUSCH when the UE has buffered UL data for transmission to the BS. In some implementations, the UE may transmit the CSI on the PUSCH concurrently with transmitting UL data on the PUSCH.

Figure 17A:
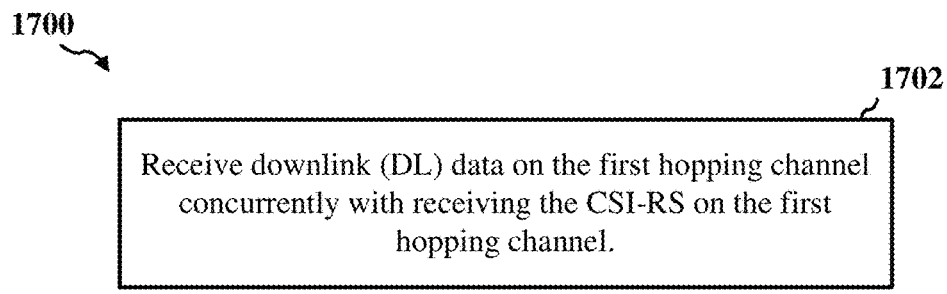
FIG. 17A shows a flowchart depicting another example operation for wireless communication that supports frequency hopping between a base station and a UE.

FIG. 17A shows a flowchart depicting an example operation 1700 for wireless communication that supports frequency hopping between a BS and a UE. The operation 1700 may be performed by an apparatus of a wireless communication device such as the UE 104 of FIG. 1, the UE 370 of FIG. 3, or the UE 704 of FIG. 7A. In some implementations, the operation 1700 is one example of receiving the CSI-RS in block 1606 of FIG. 16. For example, at block 1702, the UE receives DL data on the first hopping channel concurrently with receiving the CSI-RS on the first hopping channel.

Figure 17B:
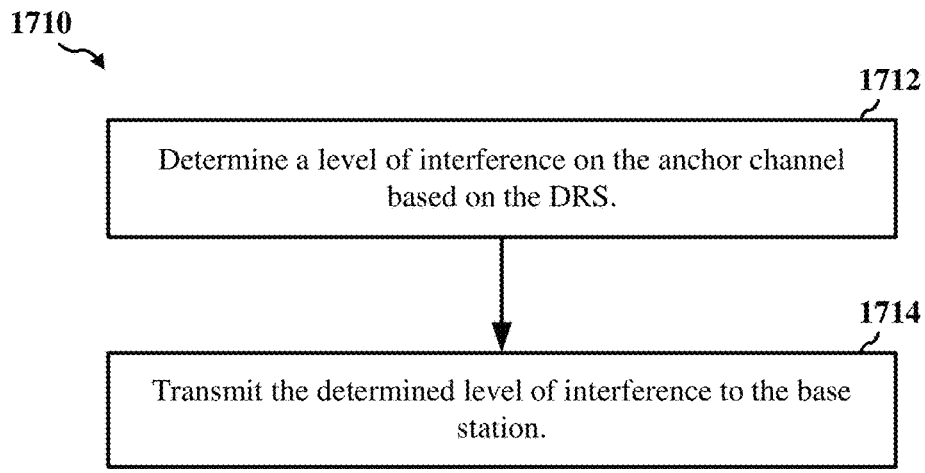
FIG. 17B shows a flowchart depicting another example operation for wireless communication that supports frequency hopping between a base station and a UE.

FIG. 17B shows a flowchart depicting an example operation 1710 for wireless communication that supports frequency hopping between a BS and a UE. The operation 1710 may be performed by an apparatus of a wireless communication device such as the UE 104 of FIG. 1, the UE 350 of FIG. 3, or the UE 704 of FIG. 7A. In some implementations, the operation 1710 begins after the UE receives the DRS in block 1602 of FIG. 16. For example, in block 1712, the UE determines a level of interference on the anchor channel based on the DRS. At block 1714, the UE transmits the determined level of interference to the BS.

Figure 17C:
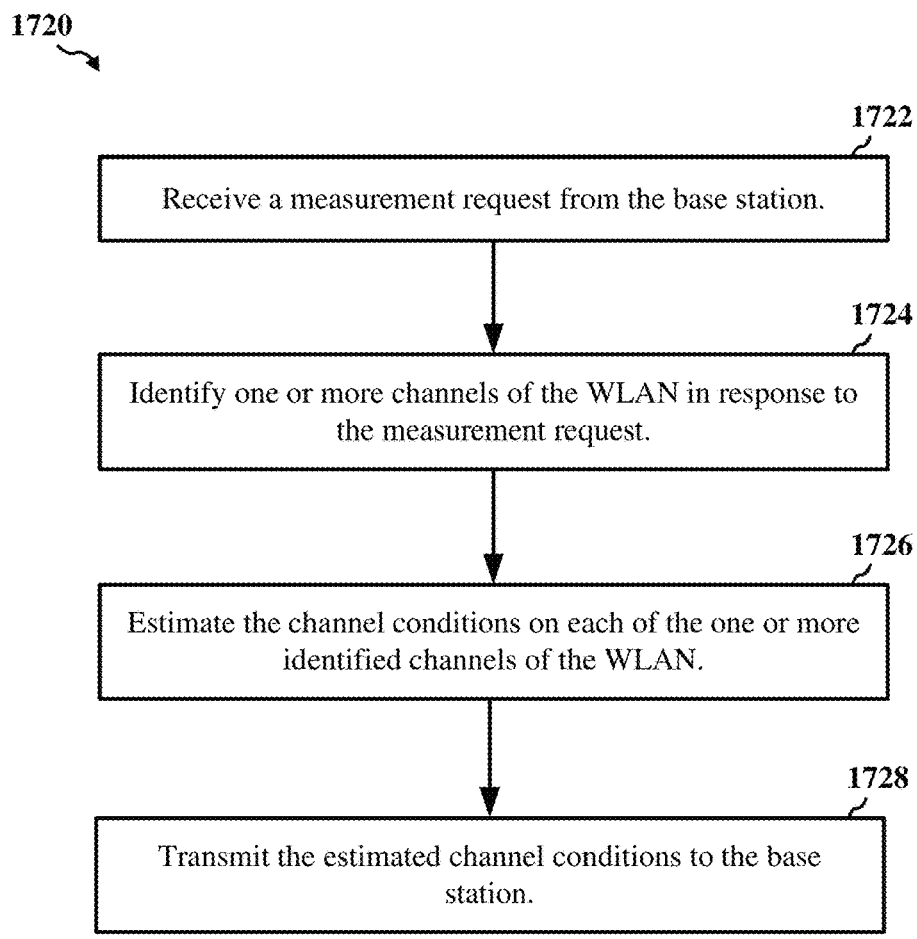
FIG. 17C shows a flowchart depicting another example operation for wireless communication that supports frequency hopping between a base station and a UE.

FIG. 17C shows a flowchart depicting an example operation 1720 for wireless communication that supports frequency hopping between a BS and a UE. The operation 1720 may be performed by an apparatus of a wireless communication device such as the UE 104 of FIG. 1, the UE 350 of FIG. 3, or the UE 704 of FIG. 7A. In some implementations, the operation 1720 begins before the operation 1600 of FIG. 16. In some other implementations, the operation 1720 begins after the operation 1600 of FIG. 16. In some other implementations, the operation 1720 may be performed concurrently with one or more of the processes performed in the operation of FIG. 16. For example, in block 1722, the UE receives a Wi-Fi measurement request from the BS. At block 1724, the UE identifies one or more channels of the WLAN in response to the measurement request. At block 1726, the UE estimates the channel conditions on each of the one or more identified channels of the WLAN. At block 1728, the UE transmits the estimated channel conditions to the BS.

In some implementations, the BS may transmit a Wi-Fi measurement request that instructs the one or more UEs to determine or estimate channel conditions of one or more identified wireless networks. The UE may use any suitable mechanism to determine or obtain the requested channel conditions, and may transmit the determined channel conditions to the BS in a measurement report. The estimated channel conditions received from one or more UEs may be used to group the plurality of hopping channels into different groups.

Figure 18:
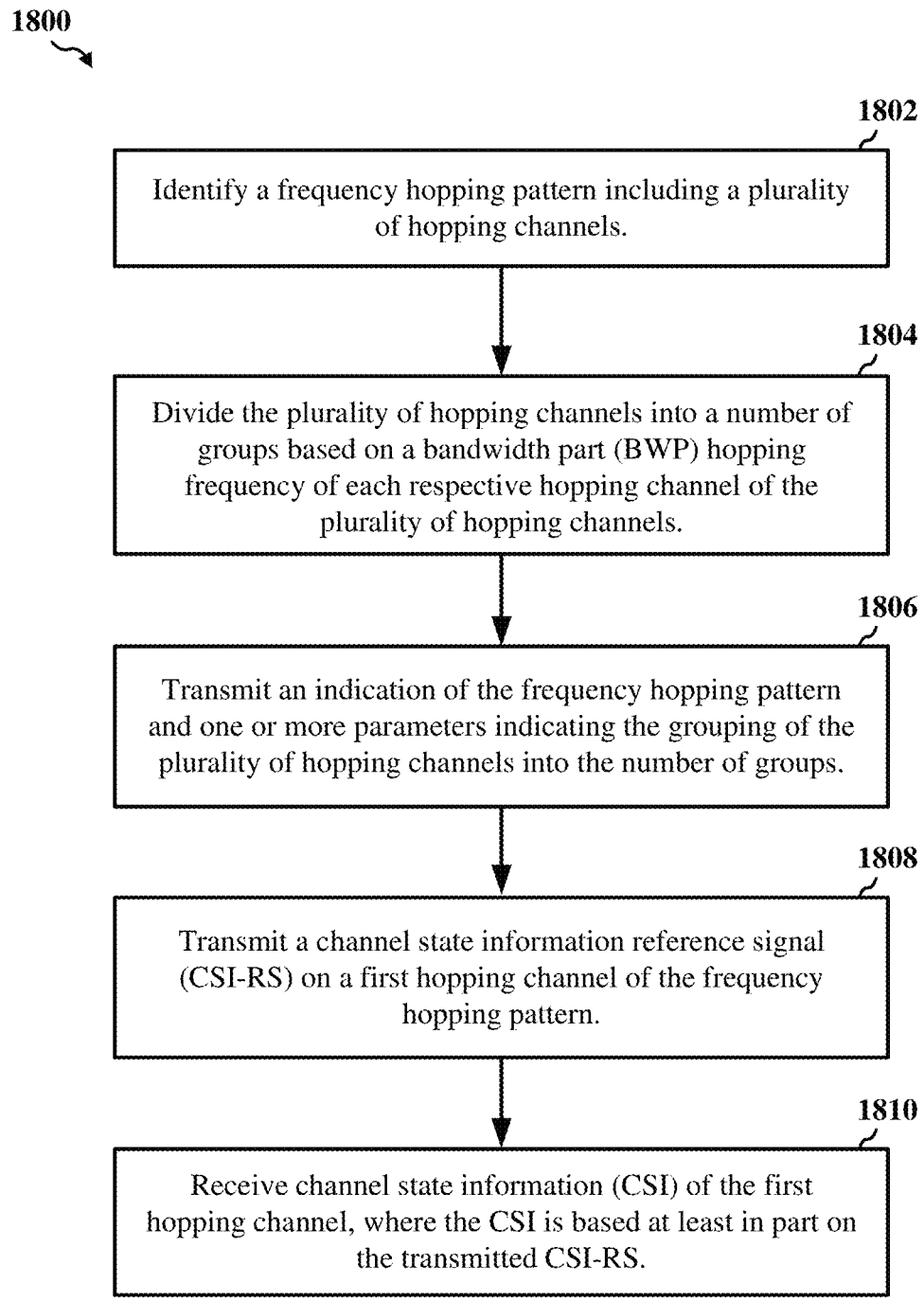
FIG. 18 shows a flowchart depicting another example operation for wireless communication that supports frequency hopping between a base station and a UE.

FIG. 18 shows a flowchart depicting an example operation 1800 for wireless communication that supports frequency hopping between a BS and a UE. The operation 1800 may be performed by an apparatus of a wireless communication device such as the BS 102 of FIG. 1, the BS 310 of FIG. 3, or the BS 702 of FIG. 7A. At block 1802, the BS identifies a frequency hopping pattern including a plurality of hopping channels. At block 1804, the BS groups the plurality of hopping channels into a number of groups based on a BWP hopping frequency of each hopping channel of the plurality of hopping channels. At block 1806, the BS transmits an indication of the frequency hopping pattern and one or more parameters indicating the grouping of the plurality of hopping channels. At block 1808, the BS transmits a CSI-RS on a first hopping channel of the frequency hopping pattern. At block 1810, the BS receives channel state information (CSI) of the first hopping channel, where the CSI is based at least in part on the transmitted CSI-RS.

The one or more parameters may include at least one of the number of groups of hopping channels, a starting frequency of each group of hopping channels, and a frequency range of each group of hopping channels. In some implementations, the indication may be transmitted in a DRS. In some other implementations, the indication may be transmitted in the DRS, and the one or more parameters are transmitted in an RRC message.

In some implementations, the first hopping channel may be a narrowband channel that at least partially overlaps a channel of a wireless network, and the CSI is indicative of channel conditions or interference on the channel of the wireless network. The first hopping channel may belong to a first group of hopping channels having frequency bands that at least partially overlap the channel of the wireless network. In some implementations, the hopping channels within each group of hopping channels may have adjacent BWP hopping frequencies, and the BWP hopping frequencies associated with each group of hopping channels may collectively span a frequency bandwidth of a corresponding channel of a wireless network.

The CSI may be transmitted on the PUCCH while the UE is on the first hopping channel, and may be transmitted on the PUSCH when the UE has buffered UL data for transmission to the BS. In some implementations, the UE may transmit the CSI on the PUSCH concurrently with transmitting UL data on the PUSCH.

Figure 19A:
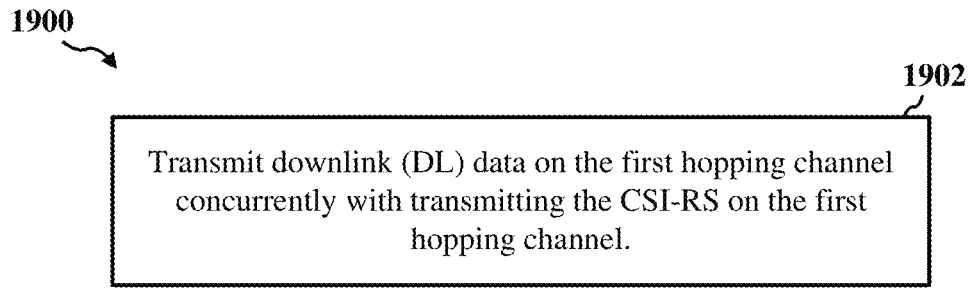
FIG. 19A shows a flowchart depicting another example operation for wireless communication that supports frequency hopping between a base station and a UE.

FIG. 19A shows a flowchart depicting an example operation 1900 for wireless communication that supports frequency hopping between a BS and a UE. The operation 1900 may be performed by an apparatus of a wireless communication device such as the BS 102 of FIG. 1, the BS 310 of FIG. 3, or the BS 702 of FIG. 7A. In some implementations, the operation 1900 may be performed concurrently with the BS transmitting the CSI-RS in block 1808 of FIG. 18. For example, at block 1902, the BS transmits DL data on the first hopping channel concurrently with transmitting the CSI-RS on the first hopping channel.

Figure 19B:
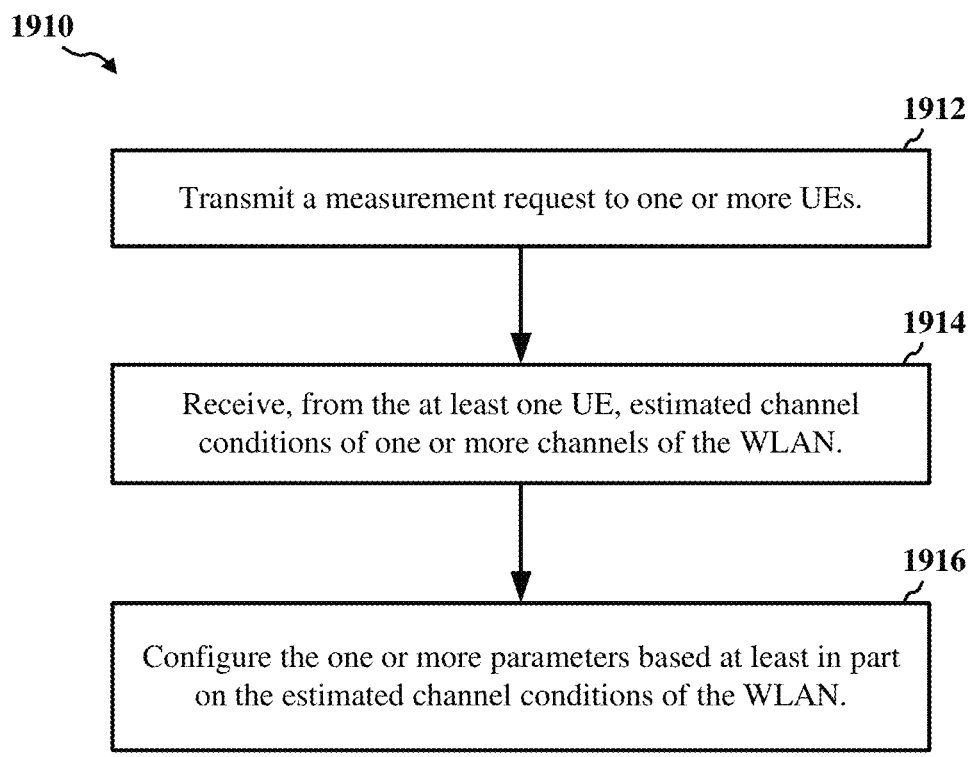
FIG. 19B shows a flowchart depicting another example operation for wireless communication that supports frequency hopping between a base station and a UE.

FIG. 19B shows a flowchart depicting an example operation 1910 for wireless communication that supports frequency hopping between a BS and a UE. The operation 1910 may be performed by an apparatus of a wireless communication device such as the BS 102 of FIG. 1, the BS 310 of FIG. 3, or the BS 702 of FIG. 7A. In some implementations, the operation 1910 begins before the operation 1800 of FIG. 18. In some other implementations, the operation 1910 begins after the operation 1800 of FIG. 18. In some other implementations, the operation 1910 may be performed concurrently with one or more of the processes performed in the operation of FIG. 18. For example, in block 1912, the BS transmits a measurement request to one or more UEs. At block 1914, the BS receives, from the at least one UE, estimated channel conditions of one or more channels of the WLAN. At block 1916, the BS configures the one or more parameters based at least in part on the estimated channel conditions of the WLAN.

In some implementations, the BS may transmit a Wi-Fi measurement request that instructs the one or more UEs to determine or estimate channel conditions of one or more identified wireless networks. The UE may use any suitable mechanism to determine or obtain the requested channel conditions, and may transmit the determined channel conditions to the BS in a measurement report. The estimated channel conditions received from one or more UEs may be used to group the plurality of hopping channels into different groups.

Figure 20:
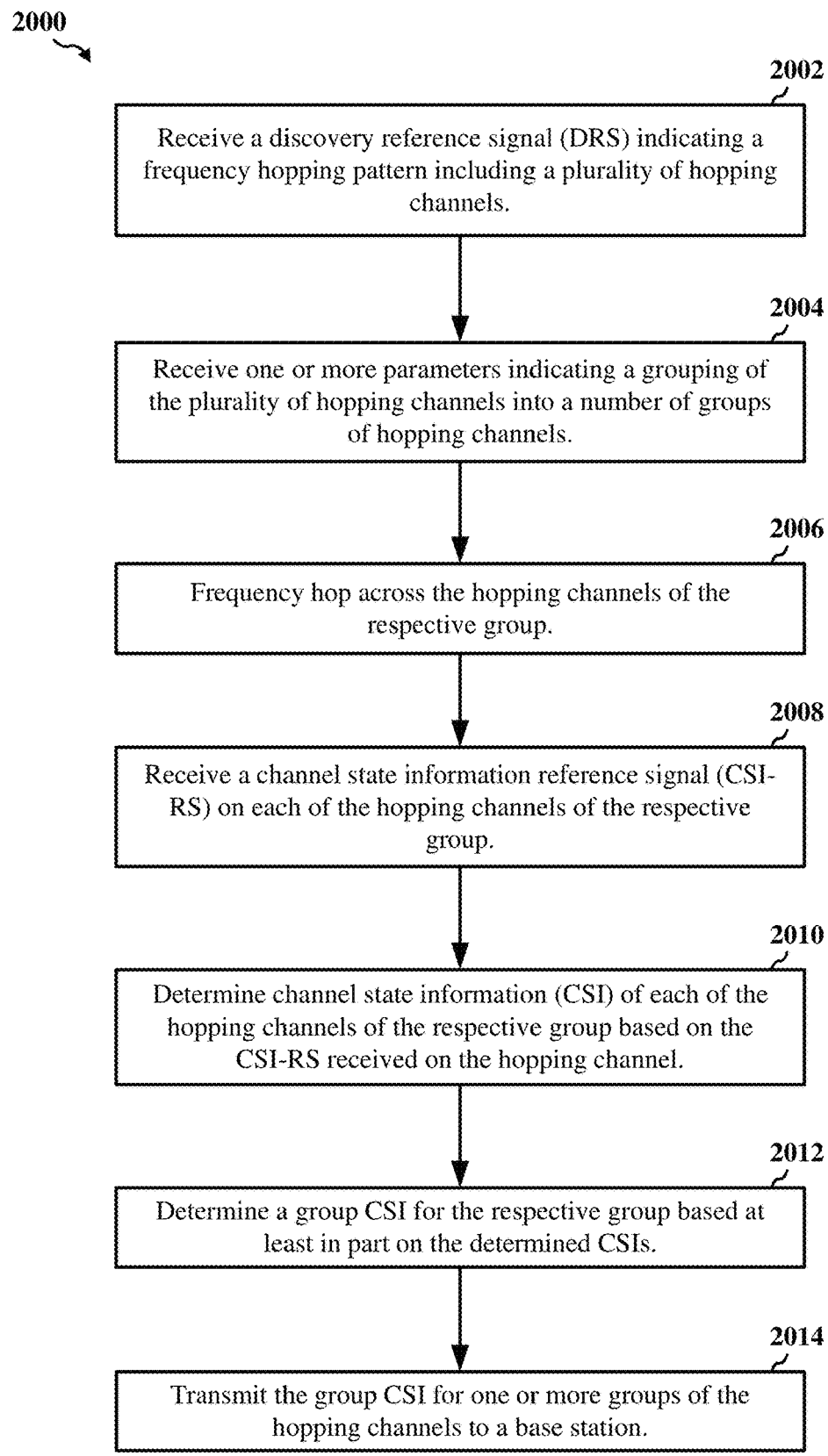
FIG. 20 shows a flowchart depicting another example operation for wireless communication that supports frequency hopping between a base station and a UE.

FIG. 20 shows a flowchart depicting an example operation 2000 for wireless communication that supports frequency hopping between a BS and a UE. The operation 2000 may be performed by an apparatus of a wireless communication device such as the UE 104 of FIG. 1, the UE 350 of FIG. 3, or the UE 704 of FIG. 7B. At block 2002, the UE receives a DRS indicating a frequency hopping pattern including a plurality of hopping channels. At block 2004, the UE receives one or more parameters indicating a grouping of the plurality of hopping channels into a number of groups of hopping channels. At block 2006, the UE frequency hops across the hopping channels of the respective group. At block 2008, the UE receives a CSI-RS on each of the hopping channels of the respective group. At block 2010, the UE determines channel state information (CSI) of each of the hopping channels of the respective group based on the CSI-RS received on the hopping channel. At block 2012, the UE determines a group CSI for the respective group based at least in part on the determined CSIs. At block 2014, the UE transmits the group CSI for one or more groups of the hopping channels to the BS.

The one or more parameters may indicate at least one of the number of groups of hopping channels, a starting frequency of each group of hopping channels, and a frequency range of each group of hopping channels. In some instances, the one or more parameters may be included in the DRS. In some other instances, the one or more parameters may be received in an RRC configuration.

In some implementations, the group CSI may be a moving average of the CSIs determined for a last number (N) of the hopping channels of the respective group, and the moving average may be transmitted to the BS on each hopping channel of the last number N of the hopping channels of the respective group. In some other implementations, the group CSI may be an average of the CSIs determined for each of the hopping channels of the respective group, and the average CSI may be transmitted to the BS on each hopping channel of the respective group. In some instances, the group CSI may be transmitted on the PUCCH while the UE is on a particular hopping channel. In some other instances, the CSI may be transmitted on the PUSCH when the UE has buffered UL data for transmission to the BS.

Figure 21A:
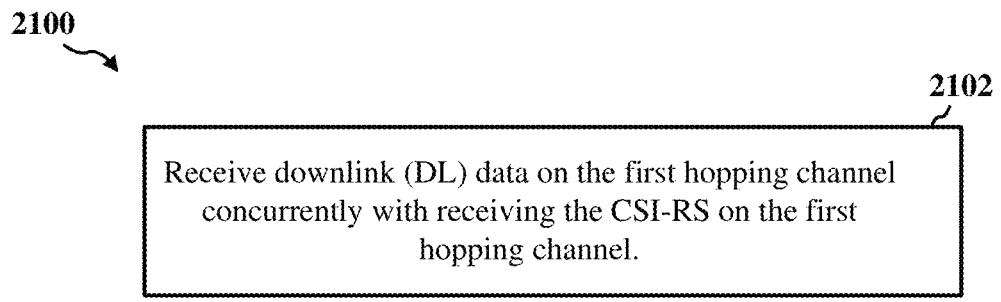
FIG. 21A shows a flowchart depicting another example operation for wireless communication that supports frequency hopping between a base station and a UE.

FIG. 21A shows a flowchart depicting an example operation 2100 for wireless communication that supports frequency hopping between a BS and a UE. The operation 2100 may be performed by an apparatus of a wireless communication device such as the UE 104 of FIG. 1, the UE 350 of FIG. 3, or the UE 704 of FIG. 7B. In some implementations, the operation 2100 may be performed concurrently with the UE receiving the CSI-RS in block 2008 of FIG. 20. For example, at block 2102, the UE receives DL data on the first hopping channel concurrently with receiving the CSI-RS on the first hopping channel.

Figure 21B:
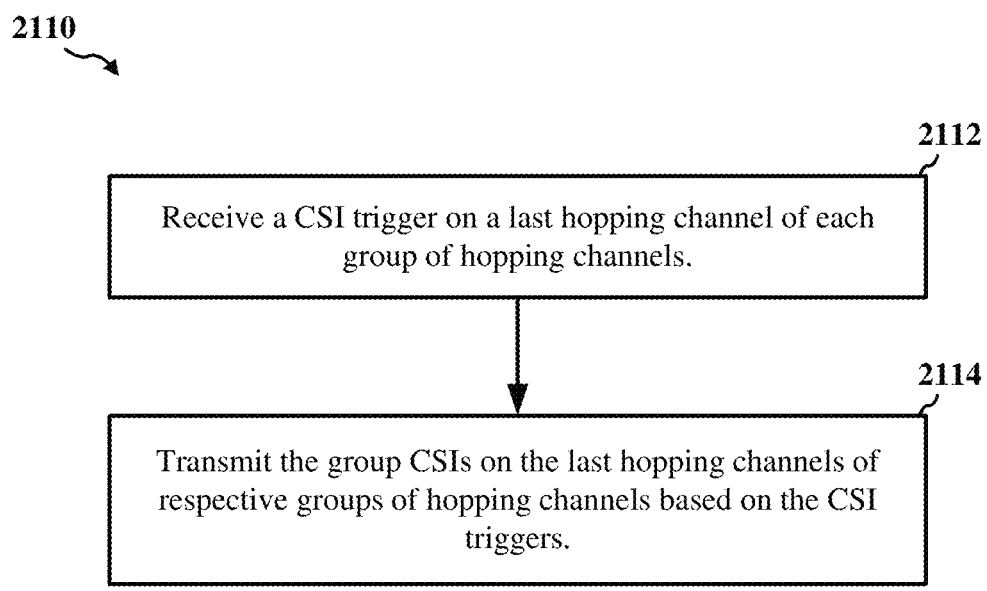
FIG. 21B shows a flowchart depicting another example operation for wireless communication that supports frequency hopping between a base station and a UE.

FIG. 21B shows a flowchart depicting an example operation 2110 for wireless communication that supports frequency hopping between a BS and a UE. The operation 2110 may be performed by an apparatus of a wireless communication device such as the UE 104 of FIG. 1, the UE 350 of FIG. 3, or the UE 704 of FIG. 7B. In some implementations, the operation 2110 begins after the UE receives the CSI-RS in block 2008 of FIG. 20. For example, at block 2112, the UE receives a CSI trigger on a last hopping channel of each group of hopping channels. At block 2114, the UE transmits the group CSIs on the last hopping channels of respective groups of hopping channels based on the CSI triggers.

Figure 22:
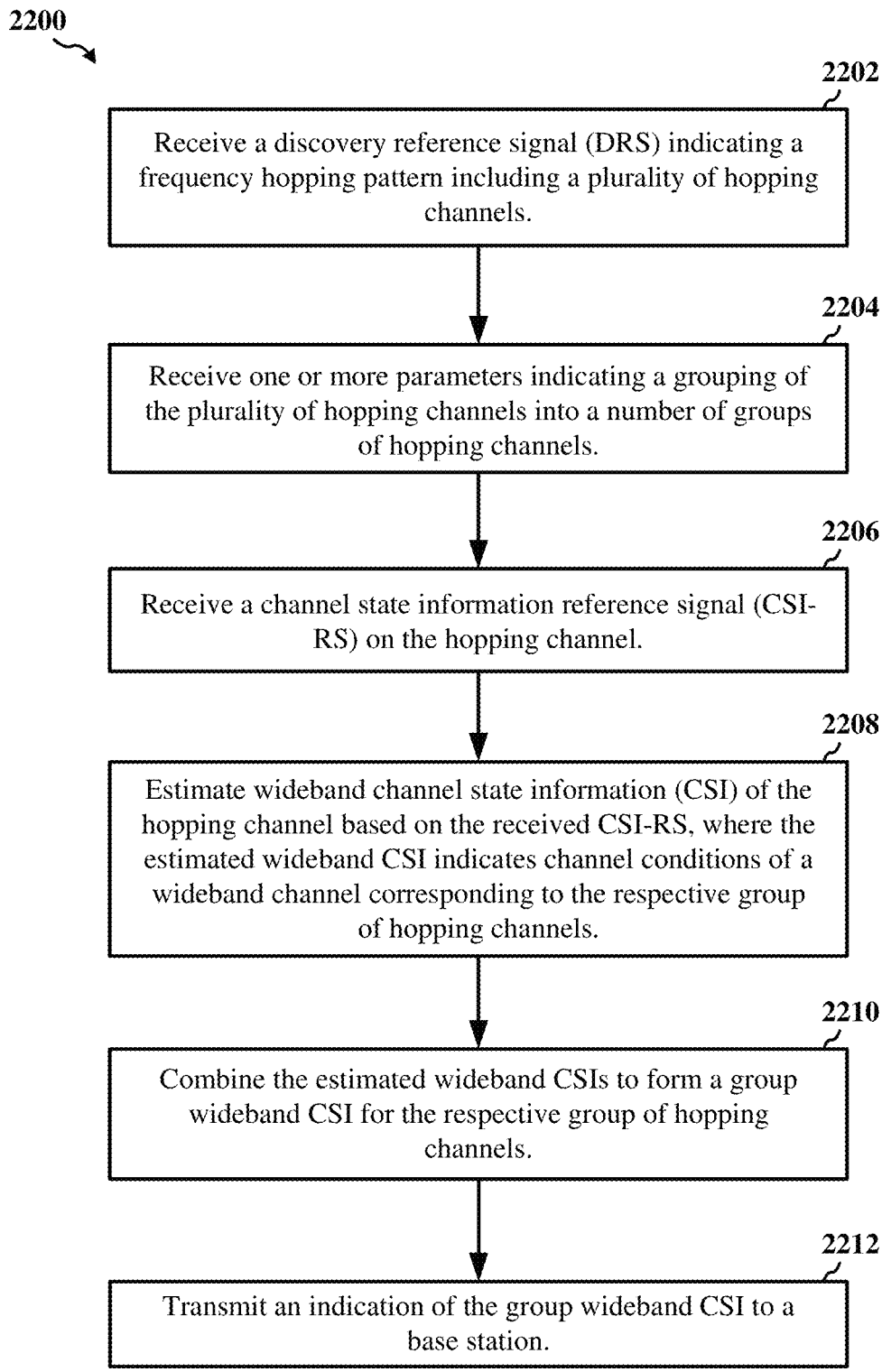
FIG. 22 shows a flowchart depicting another example operation for wireless communication that supports frequency hopping between a base station and a UE.

FIG. 22 shows a flowchart depicting an example operation 2200 for wireless communication that supports frequency hopping between a BS and a UE. The operation 2200 may be performed by an apparatus of a wireless communication device such as the UE 104 of FIG. 1, the UE 350 of FIG. 3, or the UE 704 of FIG. 7C. At block 2202, the UE receives a DRS indicating a frequency hopping pattern including a plurality of hopping channels. At block 2204, the UE receives one or more parameters indicating a grouping of the plurality of hopping channels into a number of groups of hopping channels. At block 2206, the UE receives a CSI-RS on the hopping channel. At block 2208, the UE estimates wideband channel state information (CSI) of the hopping channel based on the received CSI-RS. At block 2210, the UE combines the estimated wideband CSIs to form a group wideband CSI for the respective group of hopping channels. At block 2212, the UE transmits an indication of the group wideband CSI to the BS.

The one or more parameters may indicate at least one of the number of groups of hopping channels, a starting frequency of each group of hopping channels, and a frequency range of each group of hopping channels. In some implementations, the one or more parameters may be included in the DRS. In some other implementations, the one or more parameters may be received in an RRC configuration. The estimated wideband CSI may indicate channel conditions of a wideband channel corresponding to the respective group of hopping channels, and the indication of the group wideband CSI may be transmitted on CSI resources of the PUCCH. In some implementations, the indication of the group wideband CSI may be transmitted on a last hopping channel of the respective group of hopping channels. In some other implementations, the indication of the group wideband CSI may be transmitted on a hopping channel of another group of hopping channels.

In some implementations, the hopping channels of at least one group of hopping channels may be adjacent narrowband channels that at least partially overlap a channel of a wireless network (such as a WLAN). In some other implementations, the BWP hopping frequencies of the hopping channels of the respective group of hopping channels may collectively span a frequency bandwidth of a channel of a wireless network (such as a WLAN). In some other implementations, the BWP hopping frequencies of the hopping channels of the respective group of hopping channels may collectively span a frequency bandwidth of a Wi-Fi channel in one or more UNIT radio bands.

FIG. 23A shows a flowchart depicting an example operation 2300 for wireless communication that supports frequency hopping between a BS and a UE. The operation 2300 may be performed by an apparatus of a wireless communication device such as the UE 104 of FIG. 1, the UE 350 of FIG. 3, or the UE 704 of FIG. 7C. In some implementations, the operation 2300 may be performed concurrently with the UE transmitting the indication of the group wideband CSI in block 2212 of FIG. 22. For example, at block 2302, the UE transmits UL data on the last hopping channel of the respective group of hopping channels concurrently with transmitting the indication of the group wideband CSI on the last hopping channel of the respective group of hopping channels.

FIG. 23B shows a flowchart depicting an example operation 2310 for wireless communication that supports frequency hopping between a BS and a UE. The operation 2310 may be performed by an apparatus of a wireless communication device such as the UE 104 of FIG. 1, the UE 350 of FIG. 3, or the UE 704 of FIG. 7C. In some implementations, the operation 2310 may be performed concurrently with the UE receiving the CSI-RS in block 2206 of FIG. 22. For example, at block 2312, the UE receives DL data on a respective hopping channel concurrently with receiving the CSI-RS on the respective hopping channel.

Figure 24:
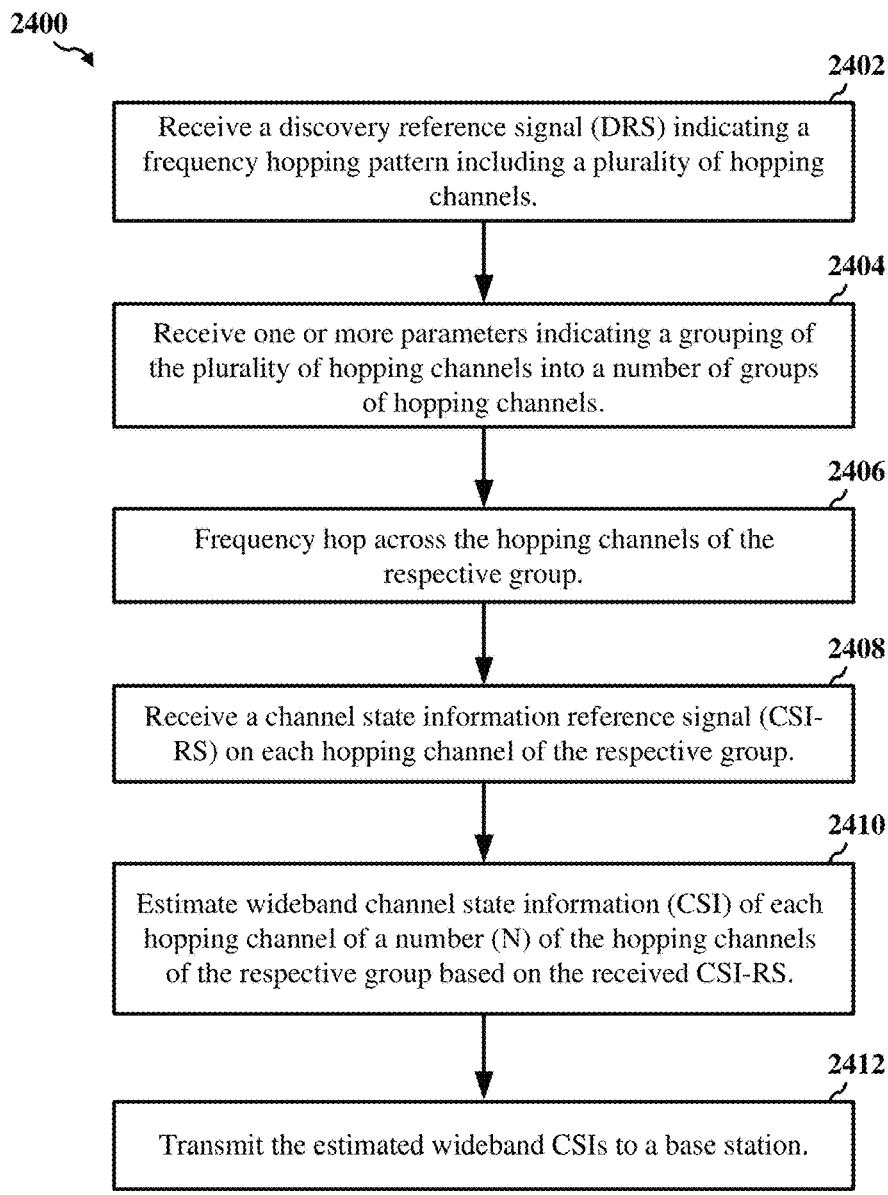
FIG. 24 shows a flowchart depicting another example operation for wireless communication that supports frequency hopping between a base station and a UE.

FIG. 24 shows a flowchart depicting an example operation 2400 for wireless communication that supports frequency hopping between a BS and a UE. The operation 2400 may be performed by an apparatus of a wireless communication device such as the UE 104 of FIG. 1, the UE 350 of FIG. 3, or the UE 704 of FIG. 7C. At block 2402, the UE receives a DRS indicating a frequency hopping pattern including a plurality of hopping channels. At block 2404, the UE receives one or more parameters indicating a grouping of the plurality of hopping channels into a number of groups of hopping channels. At block 2406, the UE frequency hops across the hopping channels of the respective group. At block 2408, the UE receives a CSI-RS on each hopping channel of the respective group. At block 2410, the UE estimates wideband channel state information (CSI) of each hopping channel of a number (N) of the hopping channels of the respective group based on the received CSI-RS, where N is an integer greater than zero. At block 2412, the UE transmits the estimated wideband CSIs to the BS.

The one or more parameters may indicate at least one of the number of groups of hopping channels, a starting frequency of each group of hopping channels, and a frequency range of each group of hopping channels. In some implementations, the one or more parameters may be included in the DRS. In some other implementations, the one or more parameters may be received in an RRC configuration.

The estimated wideband CSI of any one or more hopping channels of the respective group of hopping channels may indicate channel conditions of a wideband channel corresponding to the respective group of hopping channels. In some implementations, the estimated wideband CSIs may be transmitted to the BS on the $N^{th}$ hopping channel of the respective group of hopping channels. In some other implementations, each of a number N of the estimated wideband CSIs may be separately transmitted on a corresponding hopping channel of the first number N of hopping channels of the respective group.

In some implementations, the hopping channels of at least one group of hopping channels may be adjacent narrowband channels that at least partially overlap a channel of a wireless network (such as a WLAN). In some other implementations, the BWP hopping frequencies of the hopping channels of the respective group of hopping channels may collectively span a frequency bandwidth of a channel of a wireless network (such as a WLAN). In some other implementations, the BWP hopping frequencies of the hopping channels of the respective group of hopping channels may collectively span a frequency bandwidth of a Wi-Fi channel in one or more UNIT radio bands.

Figure 25:
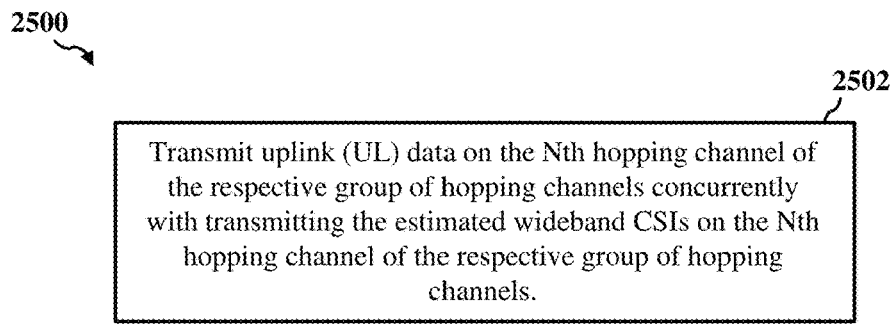
FIG. 25 shows a flowchart depicting another example operation for wireless communication that supports frequency hopping between a base station and a UE.

FIG. 25 shows a flowchart depicting an example operation 2500 for wireless communication that supports frequency hopping between a BS and a UE. The operation 2500 may be performed by an apparatus of a wireless communication device such as the UE 104 of FIG. 1, the UE 350 of FIG. 3, or the UE 704 of FIG. 7C. In some implementations, the operation 2500 may be performed concurrently with the UE transmitting the estimated wideband CSIs in block 2412 of FIG. 24. For example, at block 2502, the UE transmits UL data on the $N^{th}$ hopping channel of the respective group of hopping channels concurrently with transmitting the estimated wideband CSIs on the Nth hopping channel of the respective group of hopping channels.

Figure 26:
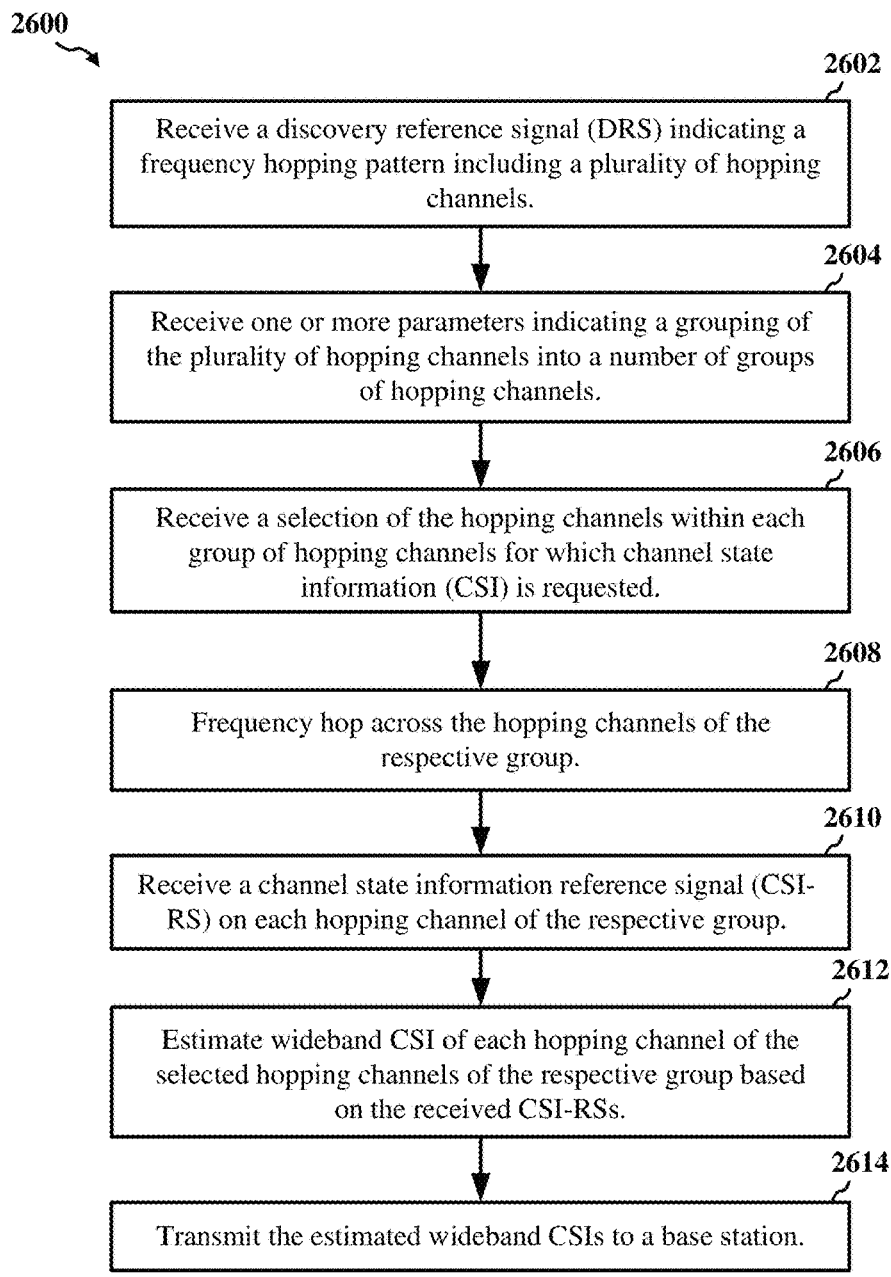
FIG. 26 shows a flowchart depicting another example operation for wireless communication that supports frequency hopping between a base station and a UE.

FIG. 26 shows a flowchart depicting an example operation 2600 for wireless communication that supports frequency hopping between a BS and a UE. The operation 2600 may be performed by an apparatus of a wireless communication device such as the UE 104 of FIG. 1, the UE 350 of FIG. 3, or the UE 704 of FIG. 7C. At block 2602, the UE receives a DRS indicating a frequency hopping pattern including a plurality of hopping channels. At block 2604, the UE receives one or more parameters indicating a grouping of the plurality of hopping channels into a number of groups of hopping channels. At block 2606, the UE receives a selection of the hopping channels within each group of hopping channels for which channel state information (CSI) is requested. At block 2608, the UE frequency hops across the hopping channels of the respective group. At block 2610, the UE receives a channel state information reference signal (CSI-RS) on each hopping channel of the respective group. At block 2612, the UE estimates wideband CSI of each hopping channel of the selected hopping channels of the respective group based on the received CSI-RSs. At block 2614, the UE transmits the estimated wideband CSIs to the BS.

The one or more parameters may indicate at least one of the number of groups of hopping channels, a starting frequency of each group of hopping channels, and a frequency range of each group of hopping channels. In some implementations, the one or more parameters may be included in the DRS. In some other implementations, the one or more parameters may be received in a radio resource control (RRC) configuration.

The estimated wideband CSI of any one or more of the selected hopping channels of the respective group may indicate channel conditions of a wideband channel corresponding to the respective group of hopping channels. In some implementations, the estimated wideband CSIs may be transmitted to the BS on a last hopping channel of the selected hopping channels of the respective group. The estimated wideband CSIs may be transmitted on the PUCCH while the UE is on the first hopping channel, and may be transmitted on the PUSCH when the UE has buffered UL data for transmission to the BS. In some implementations, the UE may transmit the estimated wideband CSIs on the PUSCH concurrently with transmitting UL data on the PUSCH.

In some implementations, the hopping channels of at least one group of hopping channels may be adjacent narrowband channels that at least partially overlap a channel of a wireless network (such as a WLAN). In some other implementations, the BWP hopping frequencies of the hopping channels of the respective group of hopping channels may collectively span a frequency bandwidth of a channel of a wireless network (such as a WLAN). In some other implementations, the BWP hopping frequencies of the hopping channels of the respective group of hopping channels may collectively span a frequency bandwidth of a Wi-Fi channel in one or more UNIT radio bands.

Figure 27:
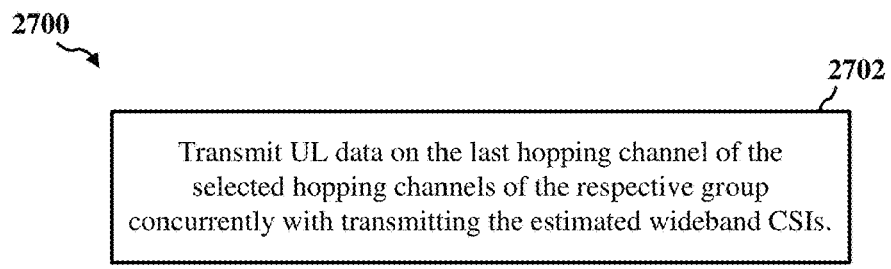
FIG. 27 shows a flowchart depicting another example operation for wireless communication that supports frequency hopping between a base station and a UE.

FIG. 27 shows a flowchart depicting an example operation 2700 for wireless communication that supports frequency hopping between a BS and a UE. The operation 2700 may be performed by an apparatus of a wireless communication device such as the UE 104 of FIG. 1, the UE 350 of FIG. 3, or the UE 704 of FIG. 7C. In some implementations, the operation 2700 may be performed concurrently with the UE transmitting the estimated wideband CSIs to the BS in block 2614 of FIG. 26. For example, at block 2702, the UE transmits UL data on the last hopping channel of the selected hopping channels of the respective group concurrently with transmitting the estimated wideband CSIs on the last hopping channel of the selected hopping channels of the respective group.

Implementation examples are described in the following numbered clauses:

1. A method for wireless communication performed by an apparatus of a user equipment (UE), including:
receiving, over an anchor channel, a signal indicating a frequency hopping pattern;
receiving an indication of a grouping of a plurality of hopping channels of the frequency hopping pattern into a number of groups of hopping channels;
receiving a channel state information reference signal (CSI-RS) on a first hopping channel of the frequency hopping pattern;
determining channel state information (CSI) of the first hopping channel based on the received CSI-RS; and
transmitting the CSI of the first hopping channel to a base station.
2. The method of clause 1, where the signal includes a discovery reference signal (DRS).
3. The method of clause 2, where the DRS is transmitted on an anchor channel, and the method further includes:
determining a level of interference on the anchor channel based at least in part on the DRS; and
transmitting the determined level of interference to the base station.
4. The method of any of clauses 1-3, where the grouping indication is received in at least one of a discovery reference signal (DRS) or a radio resource control (RRC) configuration.
5. The method of any of clauses 1-4, where the grouping indication indicates at least one of the number of groups of hopping channels, a starting frequency of each group of hopping channels, or a frequency range of each group of hopping channels.
6. The method of any of clauses 1-5, where the hopping channels within each group of hopping channels include adjacent bandwidth part (BWP) hopping frequencies that collectively span a frequency bandwidth of at least one channel of a wireless network.
7. The method of clause 6, where the BWP hopping frequencies associated with a first group of hopping channels span a primary 20 MHz channel of the wireless network, and the BWP hopping frequencies associated with a second group of hopping channels span a secondary 20 MHz channel of the wireless network.
8. The method of any of clauses 1-7, where the grouping of the plurality of hopping channels into the number of groups is based at least in part on channel conditions on one or more wireless channels of a wireless local area network (WLAN).
9. The method of any of clauses 1-8, where the frequency hopping pattern is based at least in part on channel conditions on one or more wireless channels of a wireless local area network (WLAN).
10. The method of any of clauses 1-9, further including:
receiving a measurement request from the base station;
identifying the one or more channels of the WLAN in response to the measurement request;
estimating the channel conditions on each of the one or more identified channels of the WLAN; and
transmitting the estimated channel conditions to the base station.
11. The method of any of clauses 1-10, further including, for each group of hopping channels:
frequency hopping across the hopping channels of the respective group;
receiving a CSI-RS on each of the hopping channels of the respective group;
determining CSI of each of the hopping channels of the respective group based on the CSI-RS received on the hopping channel;
determining a group CSI for the respective group based at least in part on the determined CSIs of each of the hopping channels of the respective group; and
transmitting the group CSI for the respective group of hopping channels to a base station.
12. The method of clause 11, where the group CSI includes a moving average of the CSIs determined for a last number (N) of the hopping channels of the respective group.

13. The method of any of clauses 11-12, further including:
receiving a CSI trigger on a last hopping channel of the respective group of hopping channels; and
transmitting the group CSI on the last hopping channel of the respective group based on the CSI trigger.

14. The method of any of clauses 1-10, further including, for each hopping channel of a respective group of hopping channels:
receiving a CSI-RS on the hopping channel;
estimating a wideband CSI of the hopping channel based on the received CSI-RS, where the estimated wideband CSI indicates channel conditions of a wideband channel corresponding to the respective group of hopping channels;
combining the estimated wideband CSIs to form a group wideband CSI for the respective group of hopping channels; and
transmitting an indication of the group wideband CSI to a base station.

15. The method of any of clauses 1-10, further including, for each respective group of hopping channels:
frequency hopping across the hopping channels of the respective group;
receiving a CSI-RS on each hopping channel of the respective group;
estimating a wideband CSI of each hopping channel of a number (N) of the hopping channels of the respective group based on the received CSI-RS, where N is an integer greater than zero; and
transmitting the estimated wideband CSIs of the respective group to a base station.

16. The method of clause 15, where the estimated wideband CSI of any one or more hopping channels of the respective group of hopping channels is indicative of channel conditions of a wideband channel corresponding to the respective group of hopping channels.

17. The method of any of clauses 1-10, further including:
receiving a selection of the hopping channels within each group of hopping channels for which CSI is requested; and
for each respective group of hopping channels:
frequency hopping across the hopping channels of the respective group;
receiving a CSI-RS on each hopping channel of the respective group;
estimating wideband CSI of each of the selected hopping channels based on the received CSI-RSs; and
transmitting the estimated wideband CSIs to a base station.

18. A wireless communication device, including:
an interface configured to:
obtain a signal indicating a frequency hopping pattern;
obtain an indication of a grouping of a plurality of hopping channels of the frequency hopping pattern into a number of groups of hopping channels; and
obtain a channel state information reference signal (CSI-RS) on a first hopping channel of the frequency hopping pattern; and
a processing system configured to:
determine channel state information (CSI) of the first hopping channel based on the received CSI-RS; and
the interface is further configured to:
output the CSI of the first hopping channel for transmission to a base station.

19. The wireless communication device of clause 18, where the signal includes a discovery reference signal (DRS).

20. The wireless communication device of any of clauses 18-19, where the hopping channels within each group of hopping channels include adjacent bandwidth part (BWP) hopping frequencies that collectively span a frequency bandwidth of a corresponding channel of a wireless network.

21. The wireless communication device of clause 20, where the BWP hopping frequencies associated with a first group of hopping channels span a primary 20 MHz channel of the wireless network, and the BWP hopping frequencies associated with a second group of hopping channels span a secondary 20 MHz channel of the wireless network.

22. The wireless communication device of any of clauses 18-21, where the grouping of the plurality of hopping channels is based at least in part on channel conditions on one or more wireless channels of a wireless local area network (WLAN).

23. The wireless communication device of any of clauses 18-22, where the frequency hopping pattern is based at least in part on channel conditions on one or more wireless channels of a wireless local area network (WLAN).

24. A method for wireless communication performed by an apparatus of a base station, including:
grouping a plurality of hopping channels of a frequency hopping pattern into a number of groups based on a bandwidth part (BWP) hopping frequency of each hopping channel of the plurality of hopping channels;
transmitting an indication of the frequency hopping pattern and an indication of the grouping of the plurality of hopping channels;
transmitting a channel state information reference signal (CSI-RS) on a first hopping channel of the frequency hopping pattern; and
receiving channel state information (CSI) of the first hopping channel, where the CSI is based at least in part on the transmitted CSI-RS.

25. The method of clause 24, where the indications are transmitted over an anchor channel in a discovery reference signal (DRS).

26. The method of any of clauses 24-25, where the hopping channels within each group of hopping channels include adjacent bandwidth part (BWP) hopping frequencies that collectively span a frequency bandwidth of a channel of a wireless network.

27. The method of any of clauses 24-26, where the grouping of the plurality of hopping channels is based at least in part on channel conditions on one or more wireless channels of a wireless local area network (WLAN).

28. The method of any of clauses 24-27, where the frequency hopping pattern is based at least in part on channel conditions of one or more wireless channels of a wireless local area network (WLAN).

29. A wireless communication device including:
a processing system configured to:
group a plurality of hopping channels of a frequency hopping pattern into a number of groups based on a bandwidth part (BWP) hopping frequency of each hopping channel of the plurality of hopping channels; and
an interface configured to:
output an indication of the frequency hopping pattern and an indication of the grouping of the plurality of hopping channels;

output a channel state information reference signal (CSI-RS) for transmission on a first hopping channel of the frequency hopping pattern; and obtain channel state information (CSI) of the first hopping channel, where the CSI is based at least in part on the transmitted CSI-RS.

30. The wireless communication device of clause 29, where the hopping channels within each group of hopping channels include adjacent bandwidth part (BWP) hopping frequencies that collectively span a frequency bandwidth of a corresponding channel of a wireless network.

31. A method for wireless communication performed by an apparatus of a user equipment (UE), including:

receiving a discovery reference signal (DRS) indicating a frequency hopping pattern including a plurality of hopping channels;

receiving one or more parameters indicating a division of the plurality of hopping channels into a number of groups of hopping channels;

receiving a channel state information reference signal (CSI-RS) on a first hopping channel of the frequency hopping pattern;

determining channel state information (CSI) of the first hopping channel based on the received CSI-RS; and transmitting the CSI of the first hopping channel to a base station.

32. The method of clause 31, where the CSI is transmitted on a physical uplink control channel (PUCCH) while the UE is on the first hopping channel.

33. The method of any of clauses 31-32, where the one or more parameters are included in the DRS.

34. The method of any of clauses 31-33, where the one or more parameters are received in a radio resource control (RRC) configuration.

35. The method of any of clauses 31-34, where the one or more parameters indicate at least one of the number of groups of hopping channels, a starting frequency of each group of hopping channels, and a frequency range of each group of hopping channels.

36. The method of any of clauses 31-35, further including:

receiving downlink (DL) data on the first hopping channel concurrently with receiving the CSI-RS on the first hopping channel.

37. The method of any of clauses 31-36, where the DRS is transmitted on an anchor channel, and the method further includes:

determining a level of interference on the anchor channel based on the DRS; and transmitting the determined level of interference to the base station.

38. The method of any of clauses 31-37, where the first hopping channel includes a narrowband channel that at least partially overlaps a channel of a wireless network, and the CSI is indicative of channel conditions or interference on the channel of the wireless network.

39. The method of clause 38, where the first hopping channel belongs to a first group of hopping channels having frequency bands that at least partially overlap the channel of the wireless network.

40. The method of any of clauses 31-39, where the hopping channels within each group of hopping channels have adjacent bandwidth part (BWP) hopping frequencies.

41. The method of clause 40, where the BWP hopping frequencies associated with each group of hopping channels collectively span a frequency bandwidth of a corresponding channel of a wireless network.

42. The method of any of clauses 40-41, where the BWP hopping frequencies associated with a first group of hopping channels span a primary 20 MHz channel of the wireless network, and the BWP hopping frequencies associated with a second group of hopping channels span a secondary 20 MHz channel of the wireless network.

43. The method of clause 40, where the BWP hopping frequencies associated with at least one group of hopping channels collectively span a frequency bandwidth of a wireless channel in one or more Unlicensed National Information Infrastructure (UNIT) radio bands.

44. The method of clause 43, where the one or more UNIT radio bands includes one or more of the UNII-1 radio band, the UNII-2A radio band, the UNII-2B radio band, or the UNII-3 radio band.

45. The method of clause 43, where the wireless channel includes one of a 20 MHz channel, a 40 MHz channel, an 80 MHz channel, a 160 MHz channel, or a 320 MHz channel.

46. The method of any of clauses 31-45, where the division of the plurality of hopping channels into the number of groups is based at least in part on channel conditions of a wireless local area network (WLAN).

47. The method of any of clauses 31-46, where the frequency hopping pattern is based at least in part on channel conditions of a wireless local area network (WLAN).

48. The method of clause 47, further including:

receiving a measurement request from the base station;

identifying the one or more channels of the WLAN in response to the measurement request;

estimating the channel conditions on each of the one or more identified channels of the WLAN; and transmitting the estimated channel conditions to the base station.

49. The method of clause 48, where identifying the one or more channels of the WLAN includes receiving at least one beacon frame from an access point (AP) associated with the WLAN.

50. A user equipment (UE), including:

one or more processors; and a memory coupled to the one or more processors and storing instructions that, when executed by the one or more processors, cause the UE to perform the operations of any one or more of clauses 31-49.

51. A user equipment (UE) including means for performing the operations of any one or more of clauses 31-49.

52. A non-transitory computer-readable memory including instructions that, when executed by one or more processors of a user equipment (UE), cause the UE to perform the operations of any one or more of clauses 31-49.

53. A method for wireless communication performed by an apparatus of a base station, including:

identifying a frequency hopping pattern including a plurality of hopping channels;

grouping the plurality of hopping channels into a number of groups based on a bandwidth part (BWP) hopping frequency of each respective hopping channel of the plurality of hopping channels;

transmitting, to at least one user equipment (UE), an indication of the frequency hopping pattern and one or more parameters indicating the division of the plurality of hopping channels into the number of groups;

transmitting a channel state information reference signal (CSI-RS) on a first hopping channel of the frequency hopping pattern; and receiving channel state information (CSI) of the first hopping channel from the at least one UE, where the CSI is based at least in part on the transmitted CSI-RS.

54. The method of clause 53, where the indication of the frequency hopping pattern and the one or more parameters are transmitted in a discovery reference signal (DRS).

55. The method of clause 53, where the indication of the frequency hopping pattern is transmitted in a discovery reference signal (DRS), and the one or more parameters are transmitted in a radio resource control (RCC) message.

56. The method of any of clauses 53-55, where the CSI is received on a physical uplink control channel (PUCCH).

57. The method of any of clauses 53-56, where the one or more parameters include at least one of the number of groups of hopping channels, a starting frequency of each group of hopping channels, and a frequency range of each group of hopping channels.

58. The method of any of clauses 53-57, further including: transmitting downlink (DL) data on the first hopping channel concurrently with transmitting the CSI-RS on the first hopping channel.

59. The method of any of clauses 53-58, where the first hopping channel includes a narrowband channel that at least partially overlaps a primary channel of a wireless network, and the CSI is indicative of channel conditions or interference on the channel of the wireless network.

60. The method of clause 59, where a first group of hopping channels includes the first hopping channel and one or more other hopping channels having narrow frequency bands that at least partially overlap the primary channel of the wireless network.

61. The method of any of clauses 53-60, where the hopping channels within each group of hopping channels have adjacent bandwidth part (BWP) hopping frequencies.

62. The method of clause 61, where the BWP hopping frequencies associated with each group of hopping channels collectively span a frequency bandwidth of a corresponding channel of a wireless network.

63. The method of any of clauses 61-62, where the BWP hopping frequencies associated with a first group of hopping channels span a primary 20 MHz channel of the wireless network, and the BWP hopping frequencies associated with a second group of hopping channels span a secondary 20 MHz channel of the wireless network.

64. The method of clause 61, where the BWP hopping frequencies associated with at least one group of hopping channels collectively span a frequency bandwidth of a wireless channel in one or more Unlicensed National Information Infrastructure (UNIT) radio bands.

65. The method of clause 64, where the one or more UNIT radio bands includes one or more of the UNII-1 radio band, the UNII-2A radio band, the UNII-2B radio band, or the UNII-3 radio band.

66. The method of clause 64, where the wireless channel includes one of a 20 MHz channel, a 40 MHz channel, an 80 MHz channel, a 160 MHz channel, or a 320 MHz channel.

67. The method of any of clauses 53-66, where the division of the plurality of hopping channels into the number of groups is based at least in part on channel conditions of a wireless local area network (WLAN).

68. The method of any of clauses 53-67, where the frequency hopping pattern is based at least in part on channel conditions of a wireless local area network (WLAN).

69. The method of any of clauses 67-68, further including: transmitting a Wi-Fi measurement request to the at least one UE;

receiving, from the at least one UE, estimated channel conditions of one or more channels of the WLAN; and configuring the one or more parameters based at least in part on the estimated channel conditions of the WLAN.

70. A base station, including:

one or more processors; and a memory coupled to the one or more processors and storing instructions that, when executed by the one or more processors, cause the base station to perform the operations of any one or more of clauses 53-69.

71. A base station including means for performing the operations of any one or more of clauses 53-69.

72. A non-transitory computer-readable memory including instructions that, when executed by one or more processors of a base station, cause the base station to perform the operations of any one or more of clauses 53-69.

73. A method for wireless communication performed by an apparatus of a user equipment (UE), including:

receiving a discovery reference signal (DRS) indicating a frequency hopping pattern including a plurality of hopping channels;

receiving one or more parameters indicating a division of the plurality of hopping channels into a number of groups of hopping channels; and for each respective group of hopping channels:

frequency hopping across the hopping channels of the respective group;

receiving a channel state information reference signal (CSI-RS) on each of the hopping channels of the respective group;

determining channel state information (CSI) of each of the hopping channels of the respective group based on the CSI-RS received on the hopping channel;

determining a group CSI for the respective group based at least in part on the determined CSIs of each of the hopping channels of the respective group; and transmitting the group CSI for the respective group of hopping channels to a base station.

74. The method of clause 73, where the group CSI is transmitted on a physical uplink control channel (PUCCH) or a physical uplink shared channel (PUSCH).

75. The method of any of clauses 73-74, where the one or more parameters are included in the DRS.

76. The method of any of clauses 73-74, where the one or more parameters are received in a radio resource control (RRC) configuration.

77. The method of any of clauses 73-76, where the one or more parameters indicate at least one of the number of groups of hopping channels, a starting frequency of each group of hopping channels, and a frequency range of each group of hopping channels.

78. The method of any of clauses 73-77, further including: receiving downlink (DL) data on the first hopping channel concurrently with receiving the CSI-RS on the first hopping channel.

79. The method of any of clauses 73-77, where the group CSI includes a moving average of the CSIs determined for a last number (N) of the hopping channels of the respective group.

80. The method of clause 79, where the moving average is transmitted to the base station on each hopping channel of the last number N of the hopping channels of the respective group.

81. The method of any of clauses 79-80, where a value indicative of the number N is received from the base station.

82. The method of any of clauses 79-81, where the group CSI is expressed as:

$$\sum_{i=0}^{N-1} \alpha_i f(10 \cdot \log_{10}(SINR_i)),$$

where $$\sum_{i}^{N-1} \alpha_i = 1,$$

f is the average constraint capacity, $\alpha_i$ is the weighting factor for the $i^{th}$ hopping channel of the number N of most recently visited hopping channels, and $f(10 \cdot \log_{10}(SINR_i))$ is the constraint capacity for the $i^{th}$ hopping channel of the number N of most recently visited hopping channels.

83. The method of any of clauses 73-82, where the group CSI includes an average of the CSIs determined for each of the hopping channels of the respective group.

84. The method of clause 83, where the average CSI is transmitted to the base station on each hopping channel of the respective group.

85. The method of clause 83, where the group CSI is expressed as:

$$\alpha \cdot f_j(10 \cdot \log_{10}(SINR(n))) + (1-\alpha) \cdot f_j(10 \cdot \log_{10}(\overline{SINR(n-1)})),$$

where f is the average constraint capacity, $\alpha_i$ is the weighting factor for the $i^{th}$ hopping channel within the respective group of hopping channels, $f(10 \cdot \log_{10}(SINR_i))$ is the constraint capacity for the $i^{th}$ hopping channel within the respective group of hopping channels, and f(SINR(i)) is the CSI estimated for the $i^{th}$ hopping channel.

86. The method of any of clauses 73-85, where the group CSI is transmitted to the base station on a last hopping channel of the respective group of hopping channels.

87. The method of any of clauses 73-86, further including: receiving a CSI trigger on a last hopping channel of each group of hopping channels; and transmitting the group CSIs on the last hopping channels of respective groups of hopping channels based on the CSI triggers.

88. The method of clause 87, where the CSI trigger is received in a downlink control information (DCI) message.

89. A user equipment (UE), including:
one or more processors; and
a memory coupled to the one or more processors and storing instructions that, when executed by the one or more processors, cause the UE to perform the operations of any one or more of clauses 73-88.

90. A user equipment (UE) including means for performing the operations of any one or more of clauses 73-88.

91. A non-transitory computer-readable memory including instructions that, when executed by one or more processors of a user equipment (UE), cause the UE to perform the operations of any one or more of clauses 73-88.

92. A method for wireless communication performed by an apparatus of a user equipment (UE), including:
receiving a discovery reference signal (DRS) indicating a frequency hopping pattern including a plurality of hopping channels;
receiving one or more parameters indicating a division of the plurality of hopping channels into a number of groups of hopping channels; and
for each hopping channel of a respective group of hopping channels:
receiving a channel state information reference signal (CSI-RS) on the hopping channel; and
estimating wideband channel state information (CSI) of the hopping channel based on the received CSI-RS, where the estimated wideband CSI indicates channel conditions of a wideband channel corresponding to the respective group of hopping channels;
combining the estimated wideband CSIs to form a group wideband CSI for the respective group of hopping channels; and
transmitting an indication of the group wideband CSI to a base station.

93. The method of clause 92, where the indication of the group wideband CSI is transmitted on a last hopping channel of the respective group of hopping channels.

94. The method of any of clauses 92-93, where the indication of the group wideband CSI is transmitted on a hopping channel of another group of hopping channels.

95. The method of any of clauses 92-93, where the indication of the group wideband CSI is transmitted on CSI resources of a physical uplink control channel (PUCCH).

96. The method of any of clauses 92-95, further including: transmitting uplink (UL) data on the last hopping channel of the respective group of hopping channels concurrently with transmitting the indication of the group wideband CSI on the last hopping channel of the respective group of hopping channels.

97. The method of any of clauses 92-96, further including determining a CSI difference value between the group wideband CSI of the respective group and each of the estimated CSIs of the hopping channels of the respective group, where the indication of the group wideband CSI includes one or more of the CSI difference values.

98. The method of clause 97, where transmitting the indication includes transmitting the one or more CSI difference values in one or more uplink control information (UCI) messages on a last hopping channel of the respective group of hopping channels.

99. The method of clause 97, where transmitting the indication includes transmitting the one or more CSI difference values in one or more uplink control information (UCI) messages on a hopping channel of another group of hopping channels.
100. The method of any of clauses 92-99, where the one or more parameters are included in the DRS.
101. The method of any of clauses 92-99, where the one or more parameters are received in a radio resource control (RRC) configuration.
102. The method of any of clauses 92-101, where the one or more parameters indicate at least one of the number of groups of hopping channels, a starting frequency of each group of hopping channels, and a frequency range of each group of hopping channels.
103. The method of any of clauses 92-102, further including:
receiving downlink (DL) data on a respective hopping channel concurrently with receiving the CSI-RS on the respective hopping channel.
104. The method of any of clauses 92-103, where the hopping channels of at least one group of hopping channels include adjacent narrowband channels that at least partially overlap a channel of a wireless network.
105. The method of any of clauses 92-104, where the bandwidth part (BWP) hopping frequencies of the hopping channels of the respective group of hopping channels collectively span a frequency bandwidth of a channel of a wireless network.
106. The method of any of clauses 92-105, where the bandwidth part (BWP) hopping frequencies of the hopping channels of the respective group of hopping channels collectively span a frequency bandwidth of a Wi-Fi channel in one or more Unlicensed National Information Infrastructure (UNIT) radio bands.
107. The method of clause 106, where the one or more UNIT radio bands includes one or more of the UNII-1 radio band, the UNII-2A radio band, the UNII-2B radio band, or the UNII-3 radio band.
108. The method of clause 106, where the Wi-Fi channel includes one of a 20 MHz channel, a 40 MHz channel, an 80 MHz channel, a 160 MHz channel, or a 320 MHz channel.
109. The method of any of clauses 92-108, where the division of the plurality of hopping channels into the number of groups is based at least in part on channel conditions of a wireless local area network (WLAN).
110. The method of any of clauses 92-109, where the frequency hopping pattern is based at least in part on channel conditions of a wireless local area network (WLAN).
111. A user equipment (UE), including:
one or more processors; and
a memory coupled to the one or more processors and storing instructions that, when executed by the one or more processors, cause the UE to perform the operations of any one or more of clauses 92-110.
112. A user equipment (UE) including means for performing the operations of any one or more of clauses 92-110.
113. A non-transitory computer-readable memory including instructions that, when executed by one or more processors of a user equipment (UE), cause the UE to perform the operations of any one or more of clauses 92-110.
114. A method for wireless communication performed by an apparatus of a user equipment (UE), including:
receiving a discovery reference signal (DRS) indicating a frequency hopping pattern including a plurality of hopping channels;
receiving one or more parameters indicating a division of the plurality of hopping channels into a number of groups of hopping channels; and
for each respective group of hopping channels:
frequency hopping across the hopping channels of the respective group;
receiving a channel state information reference signal (CSI-RS) on each hopping channel of the respective group;
estimating wideband channel state information (CSI) of each hopping channel of a number (N) of the hopping channels of the respective group based on the received CSI-RS, where N is an integer greater than zero; and
transmitting the estimated wideband CSIs of the respective group to a base station.
115. The method of clause 114, where the estimated wideband CSI of any one or more hopping channels of the respective group of hopping channels indicates channel conditions of a wideband channel corresponding to the respective group of hopping channels.
116. The method of any of clauses 114-115, where the number N of hopping channels includes the first N hopping channels of the respective group of hopping channels.
117. The method of any of clauses 114-116, where the estimated wideband CSIs are transmitted to the base station on the Nth hopping channel of the respective group of hopping channels.
118. The method of clause 117, further including:
transmitting uplink (UL) data on the Nth hopping channel of the respective group of hopping channels concurrently with transmitting the estimated wideband CSIs on the Nth hopping channel of the respective group of hopping channels.
119. The method of any of clauses 114-118, where each of a number N of the estimated wideband CSIs is separately transmitted on a corresponding hopping channel of the first number N of hopping channels of the respective group.
120. The method of any of clauses 114-119, where the estimated wideband CSIs are transmitted on a physical uplink control channel (PUCCH) or a physical uplink shared channel (PUSCH).
121. The method of any of clauses 114-120, where a value of the number N is received from the base station.
122. The method of any of clauses 114-121, where the one or more parameters are included in the DRS.
123. The method of any of clauses 114-121, where the one or more parameters are received in a radio resource control (RRC) configuration.
124. The method of any of clauses 114-123, where the one or more parameters indicate at least one of the number of groups of hopping channels, a starting frequency of each group of hopping channels, and a frequency range of each group of hopping channels.
125. The method of any of clauses 114-124, where the hopping channels of at least one group of hopping channels include adjacent narrowband channels that at least partially overlap a primary channel of a wireless network.
126. The method of any of clauses 114-125, where the bandwidth part (BWP) hopping frequencies of the hopping channels of the respective group of hopping channels collectively span a frequency bandwidth of a channel of a wireless network.
127. The method of any of clauses 114-125, where the bandwidth part (BWP) hopping frequencies of the hopping channels of the respective group of hopping channels collectively span a frequency bandwidth of a Wi-Fi channel in one or more Unlicensed National Information Infrastructure (UNIT) radio bands.

128. The method of clause 127, where the one or more UNIT radio bands includes one or more of the UNII-1 radio band, the UNII-2A radio band, the UNII-2B radio band, or the UNII-3 radio band.

129. The method of clause 127, where the Wi-Fi channel includes one of a 20 MHz channel, a 40 MHz channel, an 80 MHz channel, a 160 MHz channel, or a 320 MHz channel.

130. The method of any of clauses 114-129, where the division of the plurality of hopping channels into the number of groups is based at least in part on channel conditions of a wireless local area network (WLAN).

131. The method of any of clauses 114-130, where the frequency hopping pattern is based at least in part on channel conditions of a wireless local area network (WLAN).

132. A user equipment (UE), including:
one or more processors; and
a memory coupled to the one or more processors and storing instructions that, when executed by the one or more processors, cause the UE to perform the operations of any one or more of clauses 114-131.

133. A user equipment (UE) including means for performing the operations of any one or more of clauses 114-131.

134. A non-transitory computer-readable memory including instructions that, when executed by one or more processors of a user equipment (UE), cause the UE to perform the operations of any one or more of clauses 114-131.

135. A method for wireless communication performed by an apparatus of a user equipment (UE), including:
receiving a discovery reference signal (DRS) indicating a frequency hopping pattern including a plurality of hopping channels;
receiving one or more parameters indicating a division of the plurality of hopping channels into a number of groups of hopping channels;
receiving a selection of the hopping channels within each group of hopping channels for which channel state information (CSI) is requested; and
for each respective group of hopping channels:
frequency hopping across the hopping channels of the respective group;
receiving a channel state information reference signal (CSI-RS) on each hopping channel of the respective group;
estimating wideband CSI of each hopping channel of the selected hopping channels of the respective group based on the received CSI-RSs; and
transmitting the estimated wideband CSIs to a base station.

136. The method of clause 135, where the estimated wideband CSI of any one or more of the selected hopping channels of the respective group indicates channel conditions of a wideband channel corresponding to the respective group of hopping channels.

137. The method of any of clauses 135-136, where the estimated wideband CSIs are transmitted to the base station on a last hopping channel of the selected hopping channels of the respective group.

138. The method of clause 137, further including:

transmitting uplink (UL) data on the last hopping channel of the selected hopping channels of the respective group concurrently with transmitting the estimated wideband CSIs on the last hopping channel of the selected hopping channels of the respective group.

139. The method of clause 135, where each of the estimated wideband CSIs is separately transmitted on a corresponding hopping channel of the selected hopping channels of the respective group.

140. The method of clause 135, where the estimated wideband CSIs are transmitted on a physical uplink control channel (PUCCH) or a physical uplink shared channel (PUSCH).

141. The method of any of clauses 135-140, where the selection of the hopping channels includes a bitmap received in a radio resource control (RRC) message.

142. The method of any of clauses 135-141, where the one or more parameters are included in the DRS.

143. The method of any of clauses 135-141, where the one or more parameters are received in a radio resource control (RRC) configuration.

144. The method of any of clauses 135-143, where the one or more parameters indicate at least one of the number of groups of hopping channels, a starting frequency of each group of hopping channels, and a frequency range of each group of hopping channels.

145. The method of clause 135, where the hopping channels of at least one group of hopping channels include adjacent narrowband channels that at least partially overlap a primary channel of a wireless network.

146. The method of any of clauses 135-145, where the bandwidth part (BWP) hopping frequencies of the hopping channels of the respective group of hopping channels collectively span a frequency bandwidth of a channel of a wireless network.

147. The method of any of clauses 135-146, where the bandwidth part (BWP) hopping frequencies of the hopping channels of the respective group of hopping channels collectively span a frequency bandwidth of a Wi-Fi channel in one or more Unlicensed National Information Infrastructure (UNIT) radio bands.

148. The method of clause 147, where the one or more UNIT radio bands includes one or more of the UNII-1 radio band, the UNII-2A radio band, the UNII-2B radio band, or the UNII-3 radio band.

149. The method of clause 147, where the Wi-Fi channel includes one of a 20 MHz channel, a 40 MHz channel, an 80 MHz channel, a 160 MHz channel, or a 320 MHz channel.

150. The method of any of clauses 135-149, where the division of the plurality of hopping channels into the number of groups is based at least in part on channel conditions of a wireless local area network (WLAN).

151. The method of any of clauses 135-150, where the frequency hopping pattern is based at least in part on channel conditions of a wireless local area network (WLAN).

152. A user equipment (UE), including:
one or more processors; and
a memory coupled to the one or more processors and storing instructions that, when executed by the one or more processors, cause the UE to perform the operations of any one or more of clauses 135-151.

153. A user equipment (UE) including means for performing the operations of any one or more of clauses 135-151.

154. A non-transitory computer-readable memory including instructions that, when executed by one or more processors of a user equipment (UE), cause the UE to perform the operations of any one or more of clauses 135-151.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication performed by an apparatus of a user equipment (UE), comprising:
    receiving a signal indicating a frequency hopping pattern, the frequency hopping pattern indicating an ordering of a plurality of hopping channels associated with the frequency hopping pattern;
    receiving an indication of a plurality of groups, each group of the plurality of groups comprising one or more hopping channels of the plurality of hopping channels, the one or more hopping channels being grouped such that a combined bandwidth part (BWP) hopping frequency of the one or more hopping channels spans a continuous frequency range;
    receiving a channel state information reference signal (CSI-RS) via a hopping channel of the plurality of hopping channels according to the ordering; and
    transmitting channel state information (CSI) of the hopping channel to a network node based at least in part on the CSI-RS.

2. The method of claim 1, wherein the signal comprises a discovery reference signal (DRS).

3. The method of claim 2, wherein the DRS is received via an anchor channel, and the method further comprises:
    determining a level of interference of the anchor channel based at least in part on the DRS; and
    transmitting the determined level of interference to the network node.

4. The method of claim 1, wherein the indication of the plurality of groups is received via at least one of a discovery reference signal (DRS) or a radio resource control (RRC) configuration.

5. The method of claim 1, wherein the indication of the plurality of groups indicates at least one group of the plurality of groups, a starting frequency of each group of the plurality of groups, a frequency range of each group of the plurality of groups, or any combination thereof.

6. The method of claim 1, wherein the one or more hopping channels within each group of the plurality of groups include adjacent BWP hopping frequencies that collectively span a frequency bandwidth of at least one channel of a wireless network.

7. The method of claim 6, wherein the adjacent BWP hopping frequencies associated with a first group of the plurality of groups span a primary 20 MHz channel of the wireless network, and the adjacent BWP hopping frequencies associated with a second group of hopping channels span a secondary 20 MHz channel of the wireless network.

8. The method of claim 1, wherein the plurality of groups is based at least in part on channel conditions of one or more wireless channels of a wireless local area network (WLAN).

9. The method of claim 1, wherein the frequency hopping pattern is based at least in part on channel conditions of one or more wireless channels of a wireless local area network (WLAN).

10. The method of claim 9, further comprising:
receiving a measurement request from the network node;
identifying the one or more wireless channels of the WLAN in response to the measurement request;
estimating the channel conditions of each of the one or more identified wireless channels of the WLAN; and
transmitting the estimated channel conditions to the network node.

11. The method of claim 1, further comprising, for a respective group of the plurality of groups:
frequency hopping across the one or more hopping channels of the respective group;
receiving a respective CSI-RS via each of the one or more hopping channels;
determining CSI of each of the one or more hopping channels based on the respective CSI-RS received on each hopping channel of the one or more hopping channels;
determining a group CSI for the respective group based at least in part on the determined CSIs of each hopping channel of the one or more hopping channels; and
transmitting the group CSI for the respective group of the plurality of groups to the network node.

12. The method of claim 11, wherein the group CSI comprises a moving average of the CSIs determined for a last number (N) of the one or more hopping channels of the respective group.

13. The method of claim 11, further comprising:
receiving a CSI trigger via a last hopping channel of the respective group of the plurality of groups; and
transmitting the group CSI via the last hopping channel of the respective group based on the CSI trigger.

14. The method of claim 1, further comprising, for a respective group of hopping channels:
receiving a respective CSI-RS via a first hopping channel of the respective group of hopping channels;
estimating a wideband CSI of the first hopping channel based at least in part on the received respective CSI-RS, wherein the estimated wideband CSI indicates channel conditions of a wideband channel corresponding to the respective group of hopping channels;
combining the estimated wideband CSI of the first hopping channel with one or more estimated wideband CSIs of one or more other hopping channels of the respective group of hopping channels to form a group wideband CSI for the respective group of hopping channels; and
transmitting an indication of the group wideband CSI to the network node.

15. The method of claim 1, further comprising, for a respective group of the plurality of groups:
frequency hopping across the one or more hopping channels of the respective group;
receiving a respective CSI-RS via each of the one or more hopping channels;
estimating a wideband CSI of each hopping channel of a number (N) of the one or more hopping channels of the respective group based at least in part on the received respective CSI-RS, wherein N is an integer greater than zero; and
transmitting the estimated wideband CSIs of the one or more hopping channels to the network node.

16. The method of claim 15, wherein the estimated wideband CSI of any one or more hopping channels of the respective group of the plurality of groups is indicative of channel conditions of a wideband channel corresponding to the respective group of hopping channels.

17. The method of claim 1, further comprising:
receiving a selection of the one or more hopping channels within each group of the plurality of groups for which CSI is requested; and
for a respective group of the plurality of groups:
frequency hopping across the one or more hopping channels of the respective group;
receiving a respective CSI-RS via each hopping channel of the respective group;
estimating wideband CSI of each of the selection of the one or more hopping channels based at least in part on one or more received respective CSI-RSs; and
transmitting the estimated wideband CSI to the network node.

18. A wireless communication device, comprising:
an interface configured to:
obtain a signal indicating a frequency hopping pattern, the frequency hopping pattern indicating an ordering of a plurality of hopping channels associated with the frequency hopping pattern;
obtain an indication of a plurality of groups, each group of the plurality of groups comprising one or more hopping channels of the plurality of hopping channels, the one or more hopping channels being grouped such that a combined bandwidth part (BWP) hopping frequency of the one or more hopping channels spans a continuous frequency range; and
obtain a channel state information reference signal (CSI-RS) via a hopping channel of the plurality of hopping channels according to the ordering;
a processing system configured to:
determine channel state information (CSI) of the hopping channel based on the CSI-RS; and
the interface is further configured to:
output the CSI of the hopping channel for transmission to a network node.

19. The wireless communication device of claim 18, wherein the signal comprises a discovery reference signal (DRS).

20. The wireless communication device of claim 18, wherein the one or more hopping channels within each group of the plurality of groups include adjacent BWP hopping frequencies that collectively span a frequency bandwidth of a corresponding channel of a wireless network.

21. The wireless communication device of claim 20, wherein the adjacent BWP hopping frequencies associated with a first group of the plurality of groups span a primary 20 MHz channel of the wireless network, and the adjacent BWP hopping frequencies associated with a second group of hopping channels span a secondary 20 MHz channel of the wireless network.

22. The wireless communication device of claim 18, wherein the plurality of groups is based at least in part on channel conditions of one or more wireless channels of a wireless local area network (WLAN).

23. The wireless communication device of claim 18, wherein the frequency hopping pattern is based at least in part on channel conditions of one or more wireless channels of a wireless local area network (WLAN).

24. A method for wireless communication performed by an apparatus of a network node, comprising:
- grouping a plurality of hopping channels associated with a frequency hopping pattern into a plurality of groups, each group of the plurality of groups comprising one or more hopping channels of the plurality of hopping channels, the one or more hopping channels being grouped such that a combined bandwidth part (BWP) hopping frequency of the one or more hopping channels spans a continuous frequency range;
- transmitting an indication of the frequency hopping pattern and an indication of the plurality of groups;
- transmitting a channel state information reference signal (CSI-RS) via a hopping channel of the plurality of hopping channels according to an ordering of the plurality of hopping channels associated with the frequency hopping pattern; and
- receiving channel state information (CSI) of the hopping channel, wherein the CSI is based at least in part on the transmitted CSI-RS.

25. The method of claim 24, wherein the indications are transmitted via an anchor channel in a discovery reference signal (DRS).

26. The method of claim 24, wherein the one or more hopping channels within each group of the plurality of groups include adjacent BWP hopping frequencies that collectively span a frequency bandwidth of a channel of a wireless network.

27. The method of claim 24, wherein the plurality of groups is based at least in part on channel conditions of one or more wireless channels of a wireless local area network (WLAN).

28. The method of claim 24, wherein the frequency hopping pattern is based at least in part on channel conditions of one or more wireless channels of a wireless local area network (WLAN).

29. A wireless communication device comprising:
- a processing system configured to:
  - group a plurality of hopping channels associated with a frequency hopping pattern into a plurality of groups, each group of the plurality of groups comprising one or more hopping channels of the plurality of hopping channels, the one or more hopping channels being grouped such that a combined bandwidth part (BWP) hopping frequency of the one or more hopping channels spans a continuous frequency range; and
- an interface configured to:
  - output an indication of the frequency hopping pattern and an indication of the plurality of groups;
  - output a channel state information reference signal (CSI-RS) for transmission of a hopping channel of the plurality of hopping channels according to an ordering of the plurality of hopping channels associated with the frequency hopping pattern; and
  - obtain channel state information (CSI) of the hopping channel, wherein the CSI is based at least in part on the CSI-RS.

30. The wireless communication device of claim 29, wherein the one or more hopping channels within each group of the plurality of groups include adjacent BWP hopping frequencies that collectively span a frequency bandwidth of a corresponding channel of a wireless network.

* * * * *